US012746574B2

(12) United States Patent
Tadaki et al.

(10) Patent No.: US 12,746,574 B2
(45) Date of Patent: Sep. 29, 2026

(54) ACOUSTIC ELEMENT AND ACOUSTIC ELEMENT INTEGRATED CIRCUIT

(71) Applicant: SILICON & SYSTEM CO., LIMITED, Hong Kong (CN)

(72) Inventors: Yoshitaka Tadaki, Tokyo (JP); Shin-ichiro Umemura, Sendai (JP); Kaoru Ogaya, Tokyo (JP)

(73) Assignee: SILICON & SYSTEM CO., LIMITED, Hong Kong (CN)

( * ) Notice: Subject to any disclaimer, the term of this patent is extended or adjusted under 35 U.S.C. 154(b) by 216 days.

(21) Appl. No.: 18/793,419

(22) Filed: Aug. 2, 2024

(65) Prior Publication Data

US 2024/0390938 A1 Nov. 28, 2024

Related U.S. Application Data

(63) Continuation of application No. PCT/JP2023/003550, filed on Feb. 3, 2023.

(30) Foreign Application Priority Data

Feb. 4, 2022 (JP) ................................ 2022-016403

(51) Int. Cl.
*B60B 1/02* (2006.01)
*B06B 1/02* (2006.01)

(52) U.S. Cl.
CPC .................................. *B06B 1/0292* (2013.01)

(58) Field of Classification Search
CPC .................................................. B06B 1/0292
(Continued)

(56) References Cited

U.S. PATENT DOCUMENTS 8,581,470 B2 * 11/2013 Pirk ...................... H02N 1/008 310/309
9,712,086 B2 * 7/2017 Denes ...................... H02N 1/08
(Continued)

FOREIGN PATENT DOCUMENTS

JP 2008259061 A * 10/2008

OTHER PUBLICATIONS

International Search Report of PCT/JP2023/003550.
Written Opinion of PCT/JP2023/003550.

*Primary Examiner* — Maged M Almawri

(57) ABSTRACT

This acoustic element includes: a first electrode base (12); a second electrode base (11) facing the first electrode base; first electrode-side protrusions (12$a_{q-1}$, 12$a_q$, 12$a_{q+1}$, . . . ) provided on the first electrode base and having a first stepped side wall inclined at an angle of 45° or less with respect to a vibration direction; and second-electrode-side protrusions (11$a_{p-1}$, 11$a_p$, 11$a_{p+1}$, . . . ) provided on the second electrode base and facing the first electrode-side protrusions so as to at least partially intersect, and having a second stepped The voltage applied between the first electrode base and the second The voltage applied between the first electrode base and the second electrode base causes the first electrode base or the second electrode base to vibrate in the vibration direction.

10 Claims, 32 Drawing Sheets

(58) Field of Classification Search
USPC .................................................. 310/306–309
See application file for complete search history.

(56) References Cited

U.S. PATENT DOCUMENTS

| | | | | |
|---|---|---|---|---|
| 10,224,164 | B2 * | 3/2019 | Van Kampen | B81B 3/0097 |
| 11,540,048 | B2 * | 12/2022 | Loeppert | H04R 19/04 |
| 11,791,142 | B2 * | 10/2023 | Campbell | H10D 64/021 310/306 |
| 12,330,933 | B2 * | 6/2025 | Ren | H04R 19/005 |
| 2015/0110309 | A1 * | 4/2015 | Park | B81B 3/0086 381/190 |
| 2016/0045935 | A1 * | 2/2016 | Yoon | B06B 1/0292 310/309 |
| 2018/0194615 | A1 * | 7/2018 | Nawaz | B81B 3/0027 |
| 2020/0107136 | A1 * | 4/2020 | Wu | H04R 7/04 |
| 2021/0365151 | A1 * | 11/2021 | Zhang | G06F 3/0448 |
| 2022/0139687 | A1 * | 5/2022 | Campbell | H01J 45/00 310/306 |

* cited by examiner

ACOUSTIC ELEMENT AND ACOUSTIC ELEMENT INTEGRATED CIRCUIT

CROSS-REFERENCE TO RELATED APPLICATIONS

This application is a bypass continuation application of PCT application no.: PCT/JP2023/003550. This application claims priorities from PCT Application PCT/JP2023/003550, filed Feb. 3, 2023, and from the Japanese patent application 2022-016403, filed Feb. 4, 2022, the contents of which is incorporated herein in the entirety by reference.

TECHNICAL FIELD

This present disclosure relates to a capacitive acoustic element and an acoustic element integrated circuit comprising an array of a plurality of such acoustic elements, and particularly to the structure of a transmitting acoustic element.

BACKGROUND

Recently, a capacitive acoustic element with a vibrating cavity has been developed using micro-electro-mechanical systems (MEMS) technology. This capacitive acoustic element is called a "capacitive micromachine ultrasonic transducer (cMUT)". The acoustic impedance with the human body is close, and the application to medical use is expected. cMUT has a vibrating membrane that can vibrate through a vibrating cavity that is depressurized to near vacuum. When transmitting ultrasound signals, a high voltage is required to vibrate the vibrating membrane. Currently, there is a limit to the high output power of cMUTs.

In view of these circumstances, one of the inventors proposed a structure in which a plurality of protrusions protruding toward the vibration cavity are provided on the underside of the vibration film already provided under the upper electrode (vibration electrode), and furthermore, an opening is provided in the lower electrode (counter electrode) below the protrusions in accordance with the arrangement of the pattern of protrusions to enable large voltage to be applied (see FIGS. 14 and 15 of Patent Document 1: Japanese Patent Publication No. 2007-74263). According to the present disclosure described in Document 1, even when a voltage is applied to the top and bottom electrodes to the extent that the bottom surface of the vibrating film contacts the bottom insulating film covering the top surface of the counter electrode, the protrusions act as pillars and prevent the entire bottom surface of the vibrating film from contacting the bottom insulating film covering the bottom electrode, thus enabling the application of large voltages.

However, the present disclosure described in Document 1 relates to technology for the purpose of providing a structure that prevents contact between the upper electrode (vibrating electrode) and the lower electrode (counter electrode) and prevents charge from being injected into the insulating film even when the lower surface of the membrane contacts the lower electrode, and a manufacturing method for such a structure, without collapsing and transmitting the No consideration is given to the technology to increase the output power of the acoustic element for transmission without collapsing it.

SUMMARY

In view of the above-mentioned problems, the purpose of the present disclosure is to provide an acoustic element capable of increasing the transmission output power without applying a large voltage, and an acoustic element integrated circuit comprising an array of a plurality of such acoustic elements.

To achieve the above object, the acoustic element of the first embodiment of the present disclosure comprises (a) a plate-shaped first electrode base, (b) a plate-shaped second electrode base parallel to and opposite to the first electrode base, (c) a first electrode side convex portion provided on the first electrode base and having a first step side wall formed by a plane having an inclination angle inclined within 45° with respect to a vibration direction, (d) a second electrode side convex portion provided on the second electrode base, at least a part of the second electrode side convex portion being opposed to the first electrode side convex portion so as to intersect with the first electrode side convex portion, the second electrode side convex portion having a second step side wall formed by a plane inclined at the same inclination angle as the first step side wall. In the acoustic element according to the first aspect, the first electrode base or the second electrode base vibrates in the vibration direction by a voltage applied between the first electrode base and the second electrode base to generate a capacitor at least a part of which depends on an electric line of force between the first step side wall and the second step side wall, and electrostatic energy in a vibration cavity sandwiched by the first electrode base and the second electrode base is increased.

The second aspect of the present disclosure relates to an acoustic element integrated circuit in which a plurality of cells in which a plurality of capacitive acoustic elements are each distributed by a number of units are arranged in two dimensions on the same curved surface.

According to the second aspect each of the plurality of cells distributed by a specific number of units is a transmission cell including: (a) a plate-shaped first electrode base, (b) a plate-shaped second electrode base parallel to and opposite to the first electrode base, (c) a first electrode side convex portion provided on the first electrode base and having a first step side wall formed by a plane having an inclination angle inclined within 45° with respect to a vibration direction. (d) a second electrode side convex portion provided on the second electrode base, at least a part of the second electrode side convex portion being opposed to the first electrode side convex portion so as to intersect with the first electrode side convex portion, the second electrode side convex portion having a second step side wall formed by a plane inclined at the same inclination angle as the first step side wall. In each of the transmission cells, the first electrode base or the second electrode base vibrates in the vibration direction by a voltage applied between the first electrode base and the second electrode base. According to the second aspect of the present disclosure, in an acoustic element integrated circuit, in each of the transmission cells, a capacitor at least a part of which depends on an electric line of force between the first step side wall and the second step side wall is generated, and electrostatic energy in a vibration cavity sandwiched by the first electrode base and the second electrode base is increased.

According to the present disclosure, it is possible to provide an acoustic element capable of increasing the transmitting output power without applying a large voltage, and an acoustic element integrated circuit comprising an array of a plurality of these acoustic elements.

FORMS FOR CARRYING OUT THE PRESENT DISCLOSURE (Basic Concepts of the Present Disclosure)

In the following, the first through sixth embodiments of the present disclosure will be described. Before that, the basic concept of the present disclosure will be explained in a model manner by approximate calculations. In explaining the basic concept, we will first consider the structure shown in FIG. 22(*a*), in which a stepped counter electrode 1*a* with a vertical side wall and a stepped vibrating electrode 2*a* with a vertical side wall at an inclination angle θ=0° are opposite each other. However, we will consider a small-signal model in which the capacitance of the structure shown in FIG. 22(*a*) can be approximated as constant with respect to the applied voltage V. In the structure shown in FIG. 22(*a*), the convex part of the conductor protruding upward from the stepped counter electrode 1*a* is defined as the "convex part on the opposite side (convex part on the second electrode side)," and the convex part of the conductor protruding downward from the stepped vibration electrode 2*a* and crossing the convex part on the opposite side in a nested (nested) manner is defined as the "convex part on the vibration side (convex part on the first electrode side).

Figure 22A:
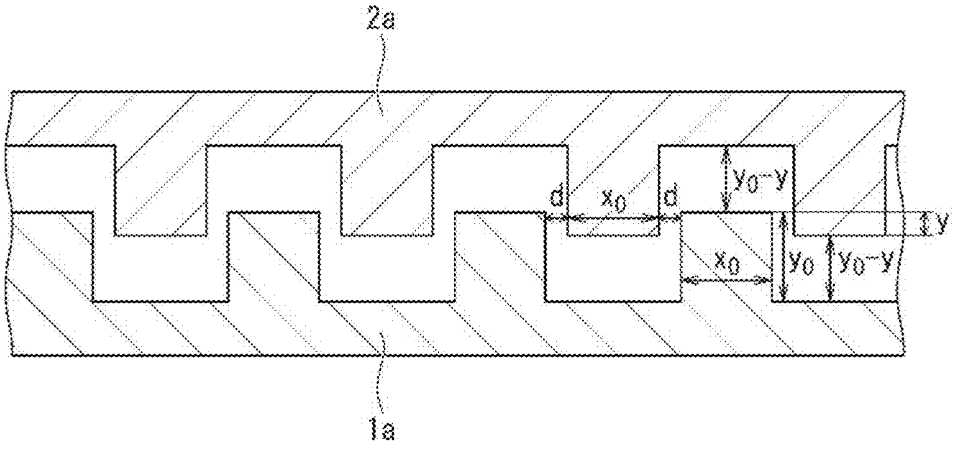
FIGS. 22A-B are schematic cross-sectional views illustrating the features of the acoustic element pertaining to the basic concept of the present disclosure.
Figure 22B:
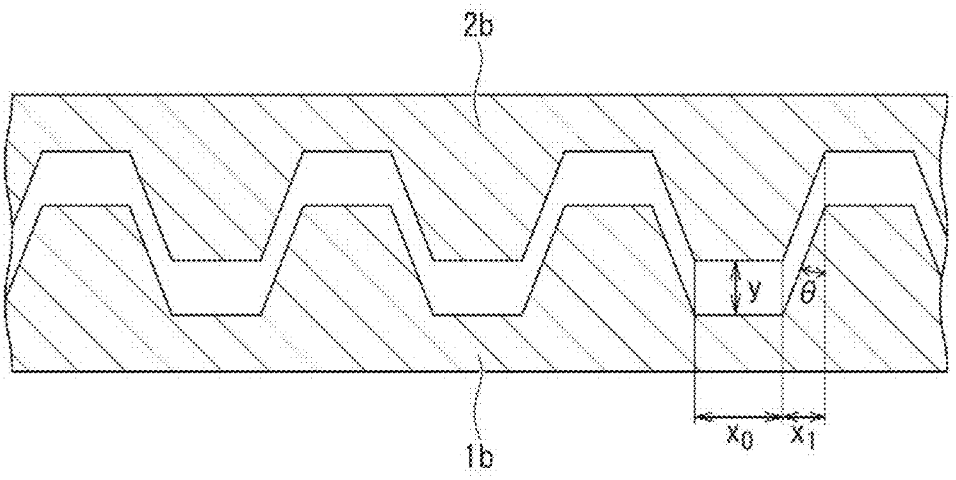

In FIG. 22(*a*), the horizontal direction (horizontal direction) is the x-axis, and the width of the opposing side convexity of the stepped type opposing electrode 1*a* and the width of the vibrating side convexity of the stepped type vibrating electrode 2*a* are $x_0$ respectively. In FIG. 22(*a*), let the vertical (perpendicular) direction be the y-axis, and let the width of the opposing side convexity and the height of the vibrating side convexity be $y_0$. Then, as shown in FIG. 22(*a*), let $y_0$−y be the vertical gap between the stepped counter electrode 1*a* and the stepped vibrating electrode 2*a* interlocked in a nested manner, and let d be the horizontal (horizontal) gap of the nested interlock. Furthermore, assume that the width of the opposing convexity and the vibrating convexity extend in the direction perpendicular to the paper surface (z-direction) with a total extension L. In FIG. 22(*a*), the dielectric constant of the dielectric (air) between one opposing convexity and one vibrating convexity is ε. The electrical capacitance per unit length (C/εL) normalized by the dielectric constant ε of the pair of the opposing convexity, which is one conductor, and the vibrating convexity, which is one conductor, can be approximated by Equation (1) by neglecting disturbances in the electric force lines at the edge of the convexity.

[Number 1]

$$\frac{C}{\varepsilon L} \cong \frac{x_0}{y_0 - y} + \frac{y}{d} \tag{1}$$

Let us now consider the electrostatic electrical energy E in the nested intermeshing of the step-type counter electrode 1*a* and the step-type vibrating electrode 2*a*. The value of the longitudinal gap $y_0$−y shown in FIG. 22(*a*) depends on the voltage V applied between the step-type counter electrode 1*a* and the step-type vibrating electrode 2*a*, so the capacitance C also changes. However, when a voltage V is applied between the step-type counter electrode 1*a* and the step-type vibrating electrode 2*a*, the electrostatic electric energy E can be approximated by equation (2a) by integrating with respect to the voltage V, with the capacitance C constant between the step-type counter electrode 1*a* and the step-type vibrating electrode 2*a*. If the capacitance C is linearly proportional to the voltage V, then from Equation (2a), the electrical energy E takes the form that depends on $V^3$. On the other hand, considering equation (1), the electrostatic electrical energy E stored in the pair of one opposing side convexity of the stepped counter electrode 1*a* and one vibrating side convexity of the stepped vibrating electrode 2*a* can be approximated by equation (2b) under the condition that equation (2a) is approximately satisfied.

[Number 2]

$$E = \frac{V^2 C}{2} \tag{2a}$$

$$\cong \frac{\varepsilon L V^2}{2}\left(\frac{x_0}{y_0 - y} + \frac{y}{d}\right) \tag{2b}$$

That is, in the structure shown in FIG. 22(*a*), a voltage V is applied between the step-type counter electrode 1*a* and the step-type vibrating electrode 2*a*, and the electrostatic electric energy E accumulated in the width of the counter side convexity and in the pair of vibrating side convexities of the step-type vibrating electrode 2*a* is approximated by equation (2b). The force F acting between the pair of opposing and vibrating side convexities when electrical energy E is accumulated is approximated by Equation (3) by differentiating Equation (2b) by the longitudinal displacement y.

[Number 3]

$$F = \frac{\partial E}{\partial y} \cong \frac{\varepsilon L V^2}{2}\left[\frac{x_0}{(y_0 - y)^2} + \frac{1}{d}\right] \tag{3}$$

Therefore, the pressure P in the unit area defined by the portion of width ($x_0$+d) between the pair of opposing and vibrating side convexities is approximated by Equation (4).

[Number 4]

$$P \cong \frac{F}{L(x_0 + d)} \cong \frac{\varepsilon V^2}{2}\left[\frac{x_0}{x_0 + d} \cdot \frac{1}{(y_0 - y)^2} + \frac{1}{(x_0 + d)d}\right] \tag{4}$$

Here, the voltage V applied between the stepped type counter electrode 1*a* and the stepped type oscillation electrode 2*a* is simplified to a condition which can be assumed that the capacitance C between the stepped type counter electrode 1*a* and the stepped type oscillation electrode 2*a* is not directly dependent (an independent variable). In this simplification, if the pressure P in the unit area defined by the portion of width ($x_0$+d) between the pair of opposing and vibrating convexities changes by ΔP when the voltage V changes by −ΔV, then ignoring the term $\Delta V^2$, equation (4) can be expressed as in equation (5), so the pressure change ΔP is given by Equation (6), which can be approximated by.

[Number 5]

$$P \equiv P_0 + \Delta P \cong -\frac{\varepsilon}{2}\left[\frac{x_0}{(y_0 - y)^2} + \frac{1}{d}\right]\frac{(V_0 - \Delta V)^2}{x_0 + d} \tag{5}$$

-continued $$\therefore \Delta P \cong \frac{\varepsilon V_0}{x_0 + d}\left[\frac{x_0}{(y_0 - y)^2} + \frac{1}{d}\right]\Delta V = \xi(d, y_0 - y)\Delta V \tag{6}$$

It should be noted that Equations (5) and (6) are approximations that are valid only when the value of the longitudinal gap $y_0-y$ between the step-type counter electrode 1*a* and the step-type vibrating electrode 2*a* is an independent variable for the voltage V applied between the step-type counter electrode 1*a* and the step-type vibrating electrode 2*a*. $y_0-y$ is small independent of voltage V In the signal model, equation (6) shows that the transmission sensitivity $\xi(d, y_0-y)$ is a function of the vertical gap $y_0-y$ between the step-type counter electrode 1*a* and the step-type vibrating electrode 2*a* and the horizontal gap d. Therefore, the transmission sensitivity $\xi(d, y_0-y)$ is a function that increases almost monotonically as the longitudinal gap $y_0-y$ decreases. Equation (6) also shows that the transmission sensitivity $\xi(d, y_0-y)$ becomes an almost monotonically increasing function of the decrease in the horizontal gap d. For example, under the condition that the voltage V=100 V applied between the step-type counter electrode 1*a* and the step-type vibrating electrode 2*a*, the width of the vibrating side convexity $x_0$=50 nm, and the vertical gap $y_0-y$=100 nm of the intermeshing of the step-type counter electrode 1*a* and the step-type vibrating electrode 2*a*, when the horizontal gap d=50 nm, the transmission sensitivity $\xi(d, y_0-y)$=221 (kPa/V), and when the lateral gap d=20 nm, the transmission sensitivity $\xi(d, y_0-y)$=695 (kPa/V).

Similarly, consider the case of inclination angle θ≠0° shown in FIG. 22(*b*), i.e., a structure in which a step-type counter electrode 1*b* having a trapezoidal opposite-side convex part with a specific inclination angle θ that is not a vertical sidewall and a step-type vibrating electrode 2*b* having a trapezoidal vibrating side convex part with an inclination angle θ are opposite each other. In the structure shown in FIG. 22(*b*), the trapezoidal convex part, which is a conductor protruding upward from the step-type counter electrode 1*b*, is defined as the "opposite side convex part," and the trapezoidal convex part, which is a conductor protruding downward from the step-type vibrating electrode 2*b* and intersecting the opposite side convex part in a nested manner, is defined as the "vibration side convex part". In FIG. 22(*b*), the dielectric constant of the dielectric (air) between the trapezoidal opposite-side convexity and the trapezoidal vibrating-side convexity is ε. In the model diagram shown in FIG. 22(*b*), the small-signal model, which is the case where the capacitance between the step-type counter electrode 1*b* and the step-type vibrating electrode 2*b* can be approximated as constant for the voltage V applied between the step-type counter electrode 1*b* and the step-type vibrating electrode 2*b*, is also considered for approximation. The horizontal direction of FIG. 22(*b*) is the x-axis, and the width of the convexity on the opposite side of the step-type counter electrode 1*b* and the width of the convexity on the vibration side of the step-type vibrating electrode 2*b* are $x_0$, respectively.

As in FIG. 22(*a*), the longitudinal (vertical) direction in FIG. 22(*b*) is the y-axis, and the longitudinal gap between the interlocking of the step-type counter electrode 1*b* and the step-type vibrating electrode 2*b* is y. Furthermore, as in FIG. 22(*a*), assume that the width of the opposing convexity and the vibrating convexity extend in the direction perpendicular to the paper surface (z direction) with a total extension L. In this case, focusing on a pair of one trapezoidal opposite-side convexity and one trapezoidal vibrating-side convexity, the electrical capacitance per unit length (C/εL) normalized by the dielectric constant ε of this pair is approximately given by Equation (7).

[Number 6]

$$\frac{C}{\varepsilon L} \cong \frac{x_0}{y} + \frac{\frac{x_1}{\sin\theta} - y\cos\theta}{y\sin\theta} = \frac{x_0 + \frac{x_1}{\sin^2\theta}}{y} - \tan\theta \tag{7}$$

The value of the longitudinal gap y between the step-type counter electrode 1*b* and the step-type vibrating electrode 2*b* depends on the voltage V applied between the step-type counter electrode 1*b* and the step-type vibrating electrode 2*b*. However, if the capacitance C between the step-type counter electrode 1*b* and the step-type vibrating electrode 2*b* can be approximated as constant when a voltage V is applied between the step-type counter electrode 1*b* and the step-type vibrating electrode 2*b*, equation (8a) can be established by integrating with respect to voltage V with capacitance C constant. Therefore, under the condition that equation (8a) can be approximated, the electrostatic electric energy E stored in the pair of one opposite-side convexity of the step-type counter electrode 1*b* and one vibration-side convexity of the step-type vibrating electrode 2*b* can be approximated by equation (8b).

[Number 7]

$$E = \frac{V^2 C}{2} \tag{8a}$$

$$\cong \frac{\varepsilon L V^2}{2}\left(\frac{x_0 + \frac{x_1}{\sin^2\theta}}{y} - \tan\theta\right) \tag{8b}$$

A voltage V is applied between the step-type counter electrode 1*b* and the step-type vibrating electrode 2*b*, and the width of the counter side convexity and the pair of vibrating side convexities of the step-type vibrating electrode 2*b* are approximated by Eq. (8b). When electrical energy E is stored, the force F acting between the opposing convexity and the pair of vibrating side convexities is approximated by Equation (9) by differentiating Equation (8b) by the longitudinal displacement y.

[Number 8]

$$F = \frac{\partial E}{\partial y} \cong \frac{\varepsilon L V^2}{2} \cdot \frac{x_0 + \frac{x_1}{\sin^2\theta}}{y} \tag{9}$$

Therefore, the pressure P in the unit area defined by the width $(x_0+x_1)$ shown in FIG. 22(*b*) between the opposing convex and vibrating convex pairs is approximated by Equation (10).

[Number 9]

$$P \cong -\frac{F}{L(x_0 + x_1)} \cong \frac{\varepsilon V^2}{2} \cdot \frac{x_0 + \frac{x_1}{\sin^2\theta}}{y^2} \tag{10}$$

If the pressure P in the unit area defined by the width $(x_0+x_1)$ between the pair of opposing and vibrating convexities changes by ΔP when the voltage V applied between the step-type opposing electrode 1*b* and the step-type vibrating electrode 2*b* changes by ΔV, then equation (10) can be expressed as in equation (11), and the pressure change ΔP is given approximately by Equation (12).

[Number 10]

$$P \equiv P_0 + \Delta P \cong -\frac{\varepsilon}{2} \cdot \frac{x_0 + \frac{x_1}{\sin^2\theta}}{y^2} \cdot (V_0 - \Delta V)^2 \tag{11}$$

$$\therefore \Delta P \cong \varepsilon V_0 \cdot \frac{x_0 + \frac{x_1}{\sin^2\theta}}{y^2} \cdot \Delta V \tag{12a}$$

$$= \eta(\theta, y)\,\Delta V \tag{12b}$$

It should be noted that Equations (11), (12a) and (12b) are approximations that are valid only when the value of the longitudinal gap y between the step-type counter electrode 1*b* and the step-type vibrating electrode 2*b* is an independent variable with respect to the voltage V applied between the step-type counter electrode 1*b* and the step-type vibrating electrode 2*b*. y is independent of voltage V in the small-signal model where the value of y does not depend on the voltage V, Equations (12a) and (12b) show that the transmission sensitivity η(θ, y) is a function of the tilt angle θ and the longitudinal gap y between the step-type counter electrode 1*b* and the step-type vibrating electrode 2*b*. Therefore, η(θ, y) is a monotonically decreasing function as the longitudinal gap y increases. For example, if $x_0 << x_{01}$, and the inclination angle θ=π/6, the transmission sensitivity η(θ, y) can be increased by a factor of 4.

The value of $x/\sin_1^2\theta$ in the second term of the numerator on the right side of equation (12a), if the height of the trapezoidal convexity on the opposite side of the stepped counter electrode 1*b* is h, $$x_1 / \sin^2\theta = h / \sin\theta\cos\theta = 2h / \sin 2\theta \tag{13}$$

can be expressed as follows. Therefore, it can be seen that the smaller the inclination angle θ of the first and second step sidewalls, the larger the transmission sensitivity η(θ, y) in Equation (12b), which is preferable. However, as can be seen from equation (7), 8=0° corresponds to the case where $x_1=0$ in FIG. 22(*b*) and the step-type counter electrode 1*b* and the step-type vibrating electrode 2*b* are in contact, and is outside the scope of the approximate formula indicating the transmission sensitivity η(θ, y) in equations (12a) and (12b). θ=0° is the case where the transmission sensitivity ξ(d, y) in equation (6) (0–y) in equation (6) should be used. sin 2θ=1, i.e., θ=45°, the value in equation (13) is the minimum value.

Figure 2A:
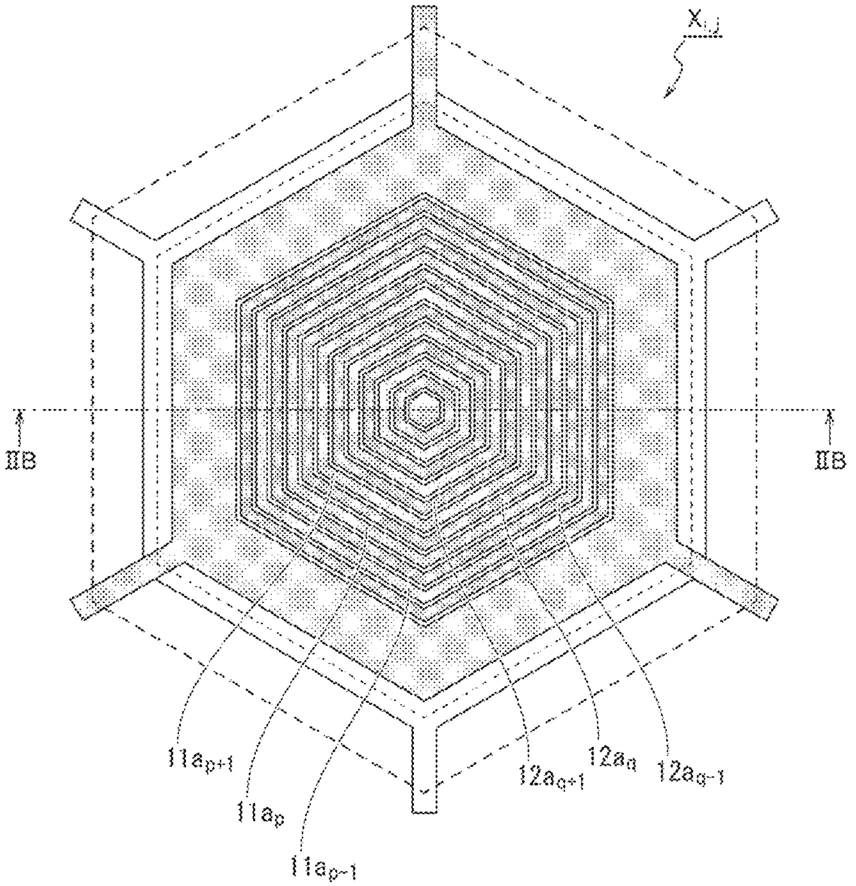
FIG. 2A is a plan view showing a schematic of the planar pattern of the basic cell comprising the element array of FIG. 1.
Figure 2B:
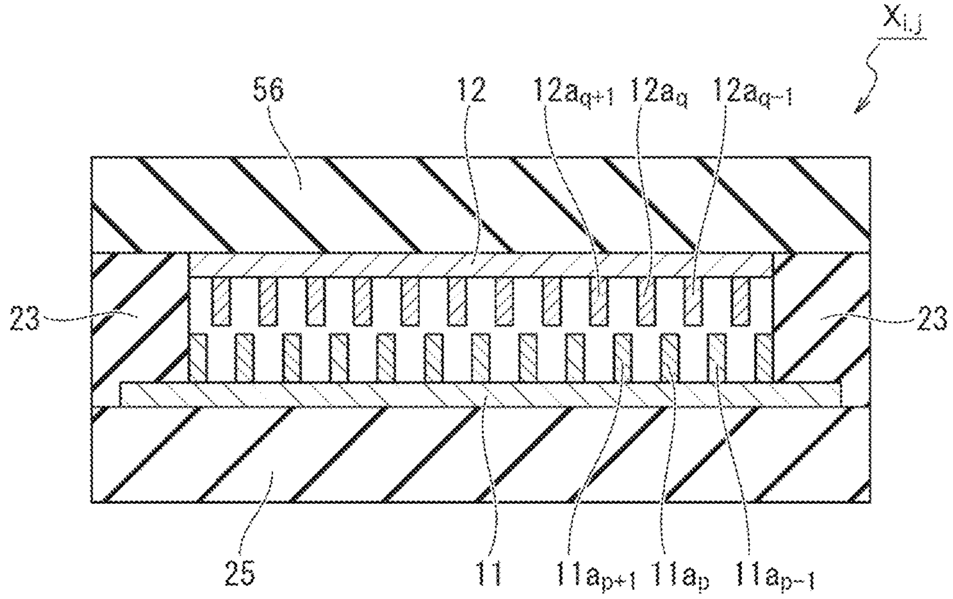
FIG. 2B is a cross-sectional view showing a schematic of the structure viewed from the IIB-IIB direction of FIG. 2A.
Figure 2C:
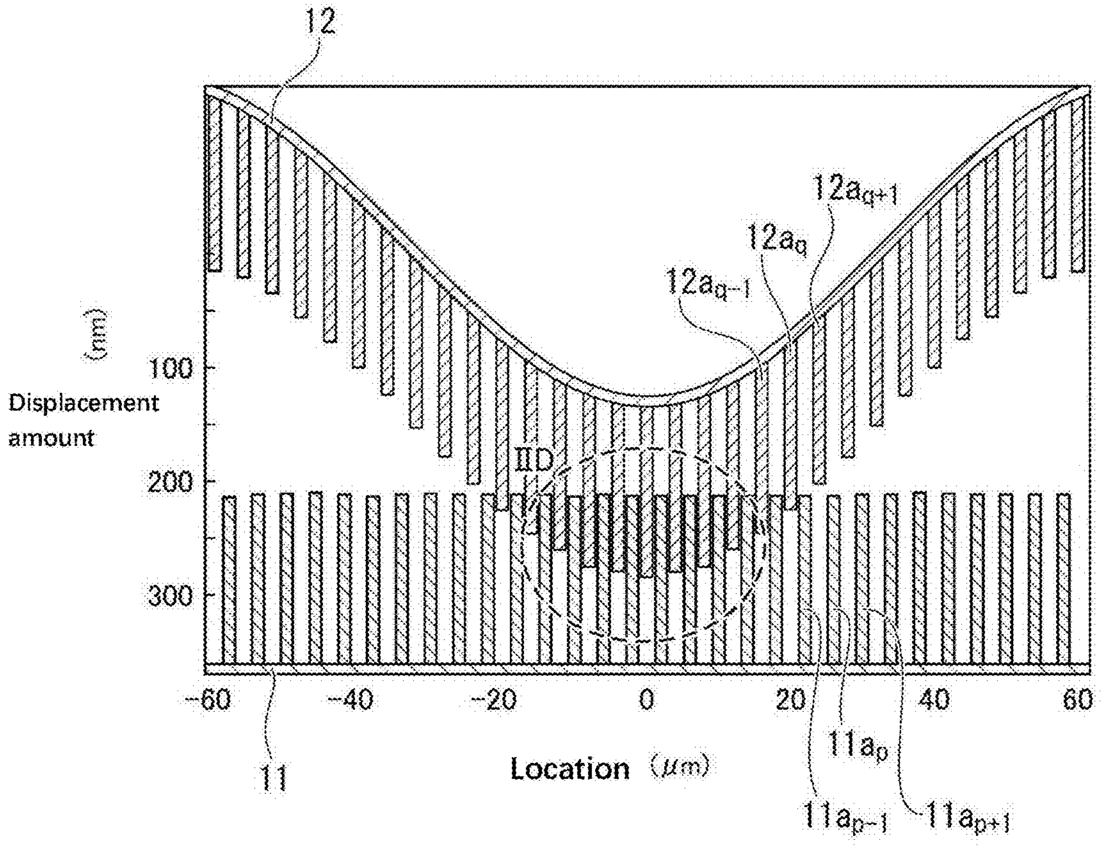
FIG. 2C is a schematic cross-sectional view showing a schematic profile of the deflection shape of the stepped vibration electrode in the vibration direction.
Figure 2D:
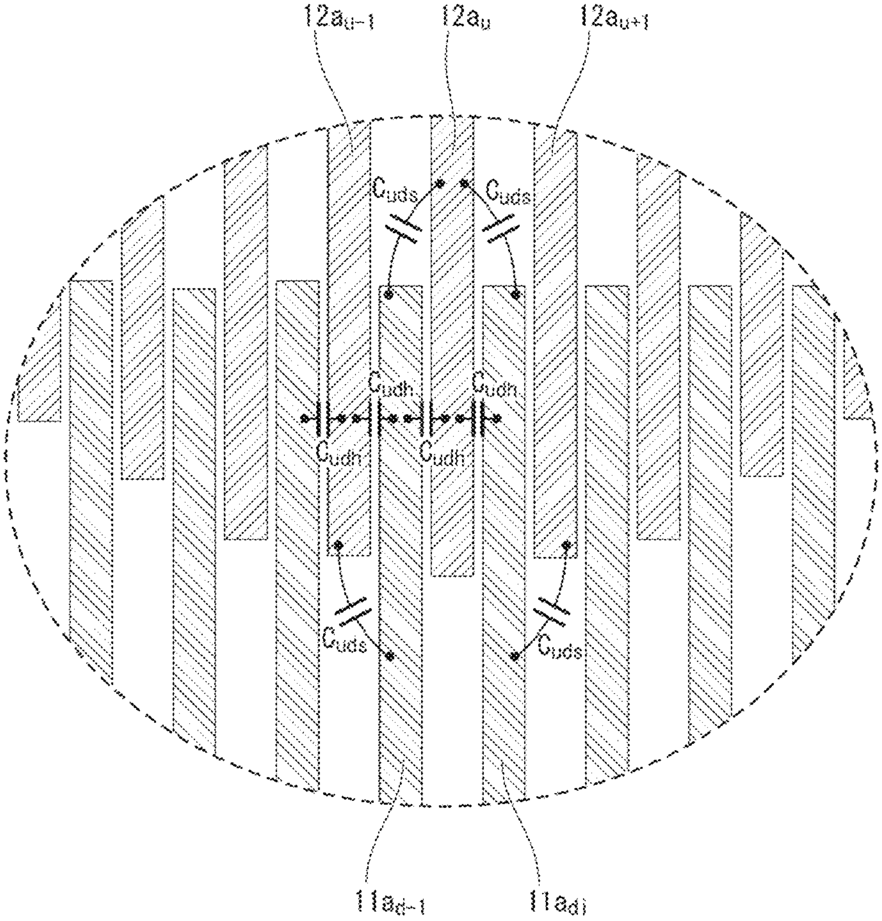
FIG. 2D is a schematic cross-sectional view illustrating the topology of the intersection (nesting) of the step-type vibrating electrode and the step-type counter electrode in the vicinity of the center of FIG. 2C.
Figure 2E:
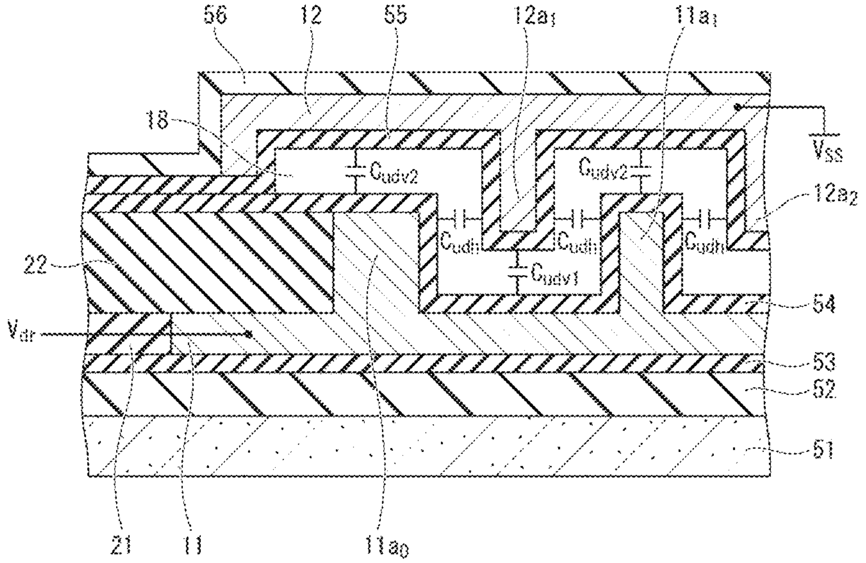
FIG. 2E is a schematic cross-sectional view illustrating the schematic of the acoustic element of the first embodiment, focusing on the structure on the peripheral side of the vibrating cavity.

FIG. 2E, which will be explained in the acoustic element of the first embodiment of the present disclosure, shows the structure corresponding to the case in which the opposite side convex part (second electrode side convex part) of the step-type counter electrode 1*a* and the vibration side convex part (first electrode side convex part) of the step-type vibrating electrode 2*a* in FIG. 22(*a*) are both conductive bodies. That is, a longitudinal capacitor $C_{udv1}$ is configured between the concave portion of the step-type counter electrode 1*a* and the first vibration-side convex portion 12*a*$_1$ of the conductor, and a longitudinal capacitor $C_{udv1}$ is configured between the concave portion of the step-type vibration electrode 2*a* and the opposite step-side wall 11*a*$_0$ of the conductor and the first counter-side convex portion 11*a*$_{11}$ of the conductor, respectively C are configured. Furthermore, a transverse capacitor $C_{udh}$ is configured horizontally between the first vibrating side convex part 12*a*$_1$ of the conductor and the first vibrating side convex part 12*a*$_1$ of the conductor, and a transverse capacitor $C_{udh}$ is configured horizontally between the first vibrating side convex part 12*a*$_1$ of the conductor and the first opposite side convex part 11*a*$_{11}$ of the conductor. The transverse capacitor $C_{udh}$ means that the lines of electric force extend in the horizontal direction.

Figure 23:
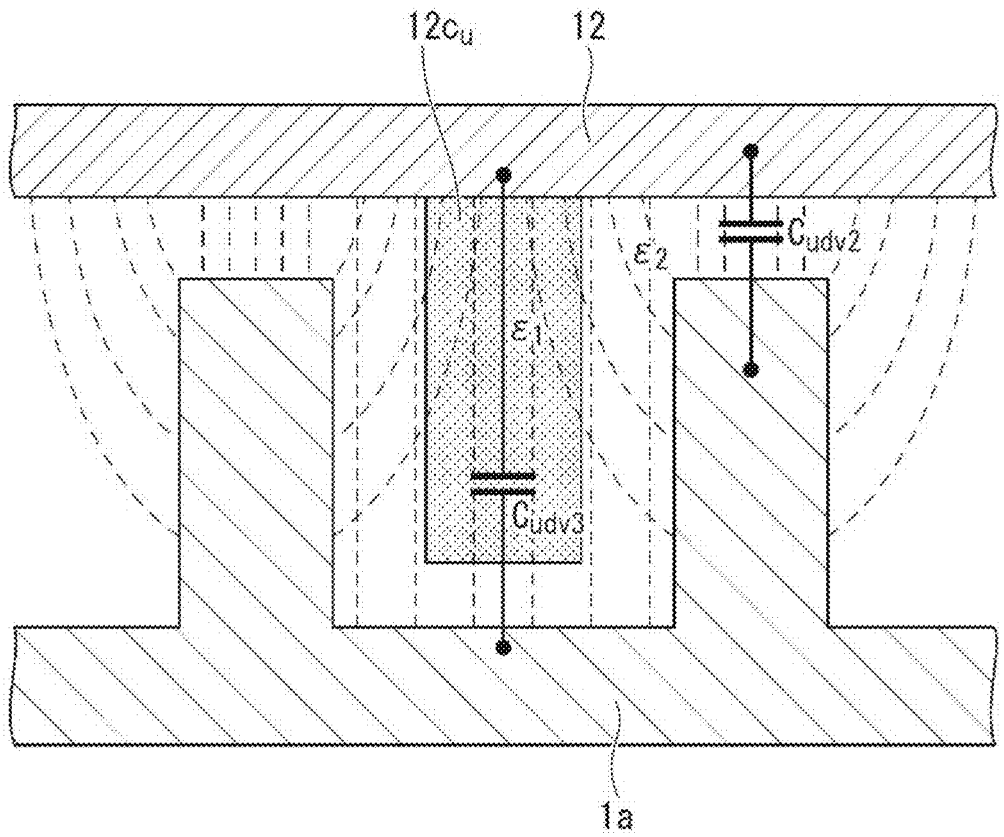
FIG. 23 is a schematic cross-sectional view illustrating the direction of electric lines of force and electric flux when an insulator with a small dielectric constant is used as a convex part, as a comparative example of illustrating an acoustic element according to the basic concept.
Figure 26:
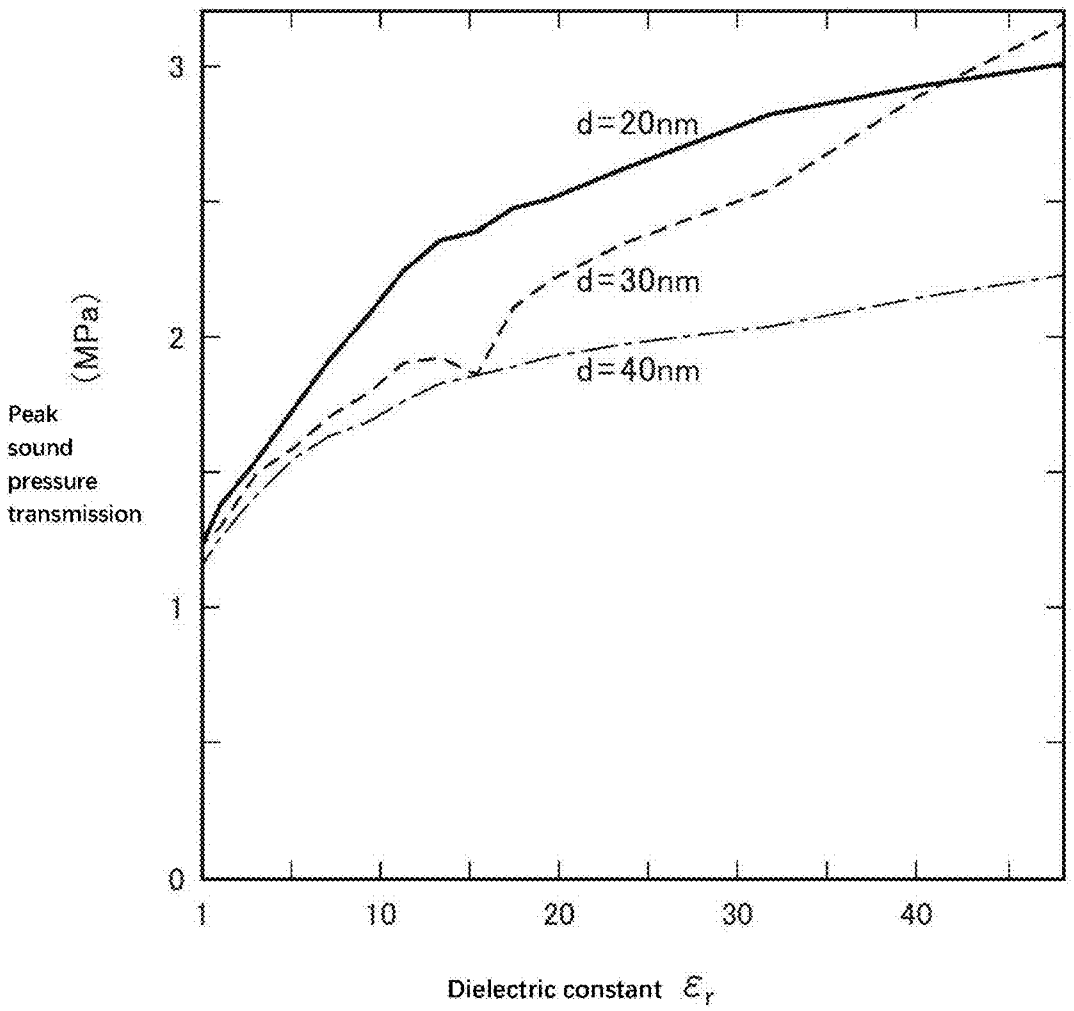
FIG. 26 illustrates the results of simulating the relationship between the transmitted peak sound pressure and the relative permittivity constituting the cross groove in the case where the applied voltage V=180 V between the counter electrode and the vibrating electrode and the distance d between the electrodes in the horizontal direction is changed.

In contrast to FIG. 2E, FIG. 23 is a schematic diagram showing the electric flux distribution in a comparative example when the vibrating side convex part 12*c*$_{ij}$ is composed of a solid dielectric with relative permittivity $\varepsilon_1$ ($\approx\varepsilon_2$). Here, the relative dielectric constant of the vacuum or gas dielectric existing in the cross space between the step-type counter electrode 1*a* and the vibrating side convexity 12*c*$_{ij}$ is $\varepsilon_2$ compared to the relative dielectric constant $\varepsilon_1$ of the vibrating side convexity 12*c*$_{ij}$. That is, FIG. 23 shows a comparative structure in which the vibrating side convex part 12*c*$_{ij}$ of a dielectric with a small relative permittivity $\varepsilon_1$ close to the relative permittivity $\varepsilon_2=1$ of a vacuum is inserted in the recess (cross slot) of the stepped counter electrode 1*a* of a conductor (FIG. 26 shows no effect for a relative permittivity $\varepsilon_r=1$). In the comparative example shown in FIG. 23, when the stepped vibrating electrode 2*a* in FIG. 22(*a*) is replaced by a composite structure with a conductive vibrating electrode base 12 and a dielectric vibrating side convex part 12*c*$_{ij}$ mounted on the base 12, when a voltage is applied between the base 12 and the stepped counter electrode 1*a*, the electric flux D=εE is shown as a dashed line. The stepped counter electrode 1*a* shown on the lower side of the comparative example in FIG. 23 is composed of a conductor as in FIG. 22(*a*). The electric flux is schematically shown when the dielectric constant of the vacuum or gas dielectric existing in the cross space between the step-type counter electrode 1*a* and the vibrating side convexity 12*c*$_{ij}$ is $\varepsilon_2$ and $\varepsilon_1\approx\varepsilon_2$, compared to the dielectric constant $\varepsilon_1$ of the vibrating side convexity 12*c*$_{ij}$. That is, FIG. 23 shows the structure of a comparative example in which the vibrating side convex part 12*c*$_{ij}$ of a dielectric with a small relative permittivity $\varepsilon_1$ is inserted in a nested manner in the recess (crossing groove) of the stepped counter electrode 1*a* of the conductor. If the angle of the electric flux on the crossed groove side is $\theta_2$ and the angle of the electric flux on the vibrating side convex part 12*c*$_{ij}$ side is $\theta_1$ with respect to the normal direction of the boundary surface between the crossed groove with relative permittivity $\varepsilon_2$ and the vibrating side convex part 12*c*$_{ij}$ with relative permittivity $\varepsilon_1$, the relationship $\tan\theta_1/\tan\theta_2=\varepsilon_1/\varepsilon_2$ is valid by the law of refraction (Snell's law). The law of refraction is derived from the condition that the normal component of the electric flux D is continuous and the component parallel to the boundary of the electric field E is continuous. Therefore, as shown in FIG. 24B, etc., when $\varepsilon_2<\varepsilon_1$, the angle $\theta_1$ formed by the electric flux inside the vibrating side convexity 12*c*$_{ij}$ side gradually increases and moves away from the normal direction.

Unlike the case shown in FIG. 22(*a*), where the convex part constituting the crossed groove is formed by a conductive material, in the comparative example shown in FIG. 23, The vibration side protrusion 12*c*$_{ij}$ is a convex portion formed by a solid dielectric, which allows the electric flux to pass from the convex side wall of the stepped counter electrode 1*a* through the interior of the vibration side protrusion 12$c_{ij}$ and reach the vibration electrode base 12. The electric flux inside the vibrating side convexity 12$c_{ij}$ leads to internal forces inside the vibrating side convexity 12$c_{ij}$ but not between the vibrating electrode base 12 and the stepped counter electrode 1*a*. The force between the vibrating electrode base 12 and the stepped counter electrode 1*a* is guided by the electric flux in the gap, which is composed of a gas or vacuum dielectric with a relative permittivity of $\varepsilon_2$. FIG. 23 shows the electric flux as a comparative example for $\varepsilon_1 \approx \varepsilon_2$, so the longitudinal capacitor $C_{udv1}$ between the base 12 of the vibrating electrode of the conductor and the top of the convex of the stepped counter electrode 1*a* and the longitudinal capacitor $C_{udv2}$ via the vibrating side convex 12$c_{ij}$ between the concave of the stepped counter electrode 1*a* and the vibrating electrode base 12 of the conductor constitute the main capacitance The following is a brief description of the capacitance of the longitudinal capacitor C.

However, even in the case of the comparative example of $\varepsilon_1 \approx \varepsilon_2$ in FIG. 23, the electric flux reaching the base 12 of the vibrating electrode through the vibrating side convexity 12$c_{ij}$ from the convex side wall of the stepped counter electrode 1*a* is recognized. In contrast to the comparative case $\varepsilon_2 << \varepsilon_1$ subject to the present disclosure, the absolute value of the electric field vector inside the vibrating side convexity 12$c_{ij}$ is weakened by $\varepsilon_1/\varepsilon_2$, resulting in sparse equipotential lines inside the vibrating side convexity 12$c_{ij}$ being stretched in the vertical direction. When the equipotential lines inside the vibrating side convexity 12$c_{ij}$ become sparse, the distribution profile of the equipotential lines is distorted and the electric flux reaching the vibrating electrode base 12 from the convex side wall of the stepped counter electrode 1*a* through the vibrating side convexity 12$c_{ij}$ increases. Also, under the conditions of normal direction continuity of electric flux D and parallel direction continuity of electric field E, the slope of the electric flux between the gaps of dielectric constant $\varepsilon_2$ of the electric flux reaching the base 12 of the vibrating electrode via the vibrating side convex 12$c_{ij}$ from the side wall of the convex part of the stepped counter electrode 1*a* becomes close to horizontal and is almost equivalent to that when the convex part is formed by a conductive material.

Figure 24A:
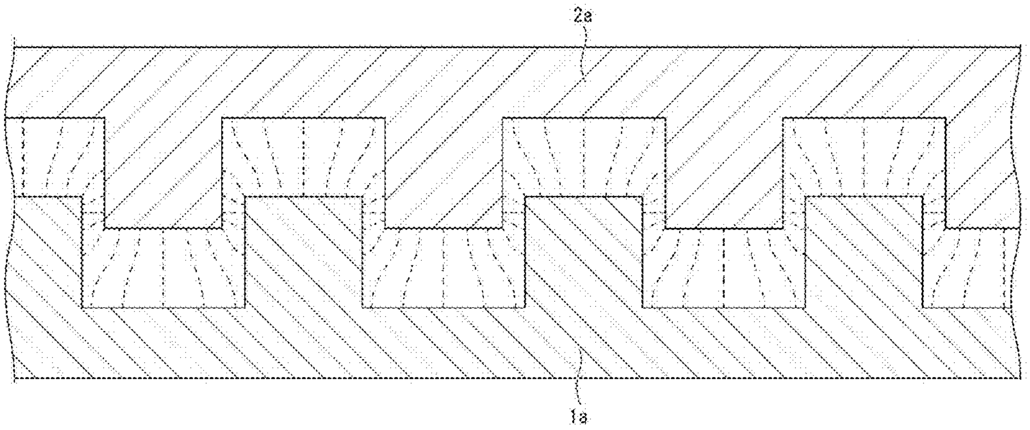
FIG. 24A is a schematic cross-sectional diagram conceptually illustrating the direction of electric lines of force and electric flux when a conductive body is used as a convex part to explain the acoustic element pertaining to the basic concept.
Figure 24B:
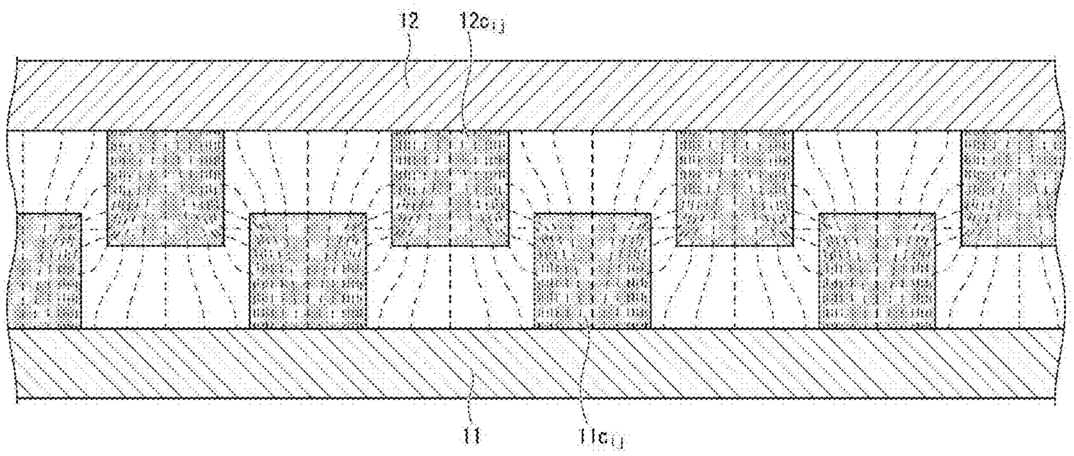
FIG. 24B is a schematic cross-sectional diagram showing, as a conceptual image, the direction of the electric flux when an insulator with a large dielectric constant is used as a convex part in an acoustic element pertaining to the basic concept.

FIG. 24A conceptually illustrates the distribution of lines of electric force when a conductor is used as a convexity, in contrast to the comparative example shown in FIG. 23. Since the electric lines of force are normal to the conductor surface, FIG. 24A shows that the electric lines of force are near horizontal between the vertical side of the vibrating side convexity 12$c_{ij}$ and the vertical side of the opposing side convexity 11$c_{ij}$. On the other hand, FIG. 24B schematically shows the electric flux distribution when the relative permittivity $\varepsilon_1$ of the vibrating side convexity 12$c_{ij}$ is a large dielectric with $\varepsilon_2 << \varepsilon_1$, in contrast to the comparative example in FIG. 23. Furthermore, in FIG. 24B, the electric flux distribution is schematically shown when, in addition to the vibrating side convexity 12$c_{ij}$, the convexity of the stepped counter electrode 1*a* is made into a dielectric with a large relative dielectric constant $\varepsilon_1$ that is $\varepsilon_2 << \varepsilon_1$, and the convexities of the solid dielectrics on both electrodes intersect. $\varepsilon_2 <<< \varepsilon_1$, so from the law of refraction, it is more than the case shown in FIG. 23 It can be seen that the angle 91 between the electric fluxes inside the vibrating side convex hull is greatly inclined. As shown in FIG. 24B, the convexity on the opposite electrode side 11$c_{ij}$ (as defined in FIG. 22, hereafter referred to as "opposite side convexity 11$c_{ij}$") The electric flux transmitted through the interior of the opposing convexity 11$c_{ij}$ passes through the interior of the vibrating side convexity 12$c_{ij}$ via the side near the point where it intersects the opposing convexity 11$c_{ij}$ and reaches the vibrating electrode base 12, using the side wall near the tip side of the opposing convexity 11*c* as a relay point. Also, using the side wall near the tip of the vibrating side convexity 12$c_{ij}$ as a relay point, the electric flux transmitted through the interior of the vibrating side convexity 12$c_{ij}$ passes through the interior of the opposing side convexity 11$c_{ij}$ via the side near the point where it crosses the vibrating side convexity 12$c_{ij}$ to the opposing electrode base 12 (hereinafter, the flat plate electrode with the opposing side convexity 11$c_{ij}$ on the opposite electrode side is called the counter electrode base 11"). The opposite side convexity on the opposite electrode side is referred to as "opposite electrode base 11"). Therefore, the charges induced on the surfaces of the vibrating electrode base 12 and the counter electrode base 11 attract each other by Coulomb force. The electric flux inside the vibrating side convexity 12$c_{ij}$ leads to an internal force inside the vibrating side convexity 12$c_{ij}$ but not between the vibrating electrode base 12 and the counter electrode base 11. Similarly, the electric flux inside the opposing side convexity 11$c_{ij}$ leads to internal forces inside the opposing side convexity 11$c_{ij}$ but not between the vibrating electrode base 12 and the opposing electrode base 11.

Figure 25:
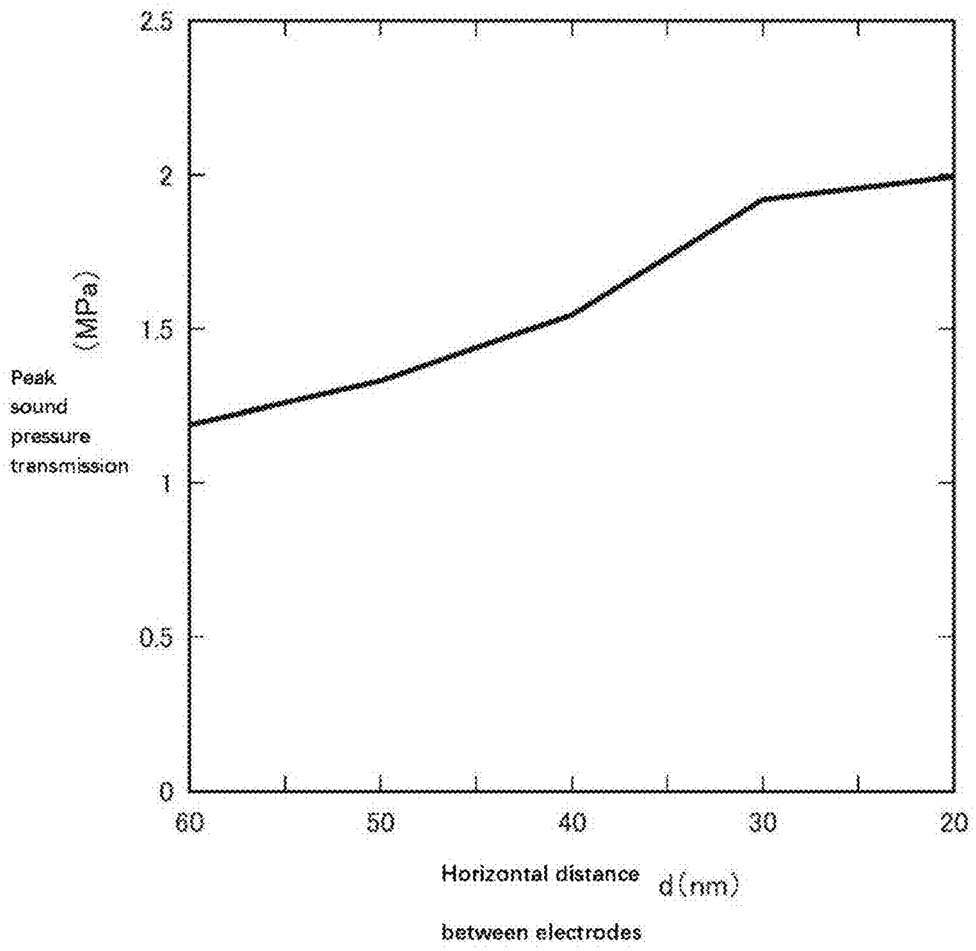
FIG. 25 illustrates the results of a simulation of the relationship between the distance d between the electrodes and the transmitted peak sound pressure when the applied voltage V=180 V between the counter electrode and the vibrating electrode.

As can be seen from Equation (3) and other equations, the force F between the vibrating electrode base 12 and the counter electrode base 11 is obtained by the derivative of the displacement y between the vibrating electrode base 12 and the counter electrode base 11 with respect to the electrostatic electric energy E stored by the electric flux between the gaps with a relative permittivity of $\varepsilon_2$. The force F in equation (3) is due to the Coulomb force induced on the surfaces of the vibrating electrode base 12 and the counter electrode base 11 in FIG. 24B from the electric field between the vibrating electrode base 12 and the counter electrode base 11. When $\varepsilon_1 \approx \varepsilon_2$ as in the comparative case of FIG. 23, the longitudinal capacitor $C_{udv1}$ constitutes the main capacitance between the conductor vibrating electrode base 12 and the conductor counter electrode base 11. When a dielectric with a large dielectric constant $\varepsilon_1$, which is $\varepsilon_2 << \varepsilon_1$, is used, the electric field vector in the interior of the dielectric vibrating side convex part 12$c_{ij}$ and counter side convex part 11$c_{ij}$. The absolute value of the electric field vector is weakened by $\varepsilon_1/\varepsilon_2$ and the electric flux is tilted longitudinally by the law of refraction, resulting in sparse equipotential lines inside the vibrating convex hull 12$c_{ij}$ and the opposing convex hull 11$c_{ij}$, which are vertically stretched. The equipotential lines inside the vibrating side convexity 12$c_{ij}$ are continuous to the equipotential lines inside the opposing side convexity 11$c_{ij}$ through a gap made of a vacuum or gas dielectric with relative permittivity 82, distorting the distribution profile of the equipotential lines. FIG. 25 shows that the transmitted peak sound pressure increases almost monotonically as the horizontal electrode-to-electrode distance d decreases. In FIG. 24B, the equipotential lines are not shown, but if $\varepsilon_2 << \varepsilon_1$ and the horizontal gap d between the vertical side of the vibrating side convexity 12$c_{ij}$ and the vertical side of the opposing side convexity 11$c_{ij}$ is narrow, the slope of the equipotential lines at the horizontal gap with relative permittivity $\varepsilon_2$ is steep, almost vertical. Since the electric flux is normal to the equipotential line, a near-horizontal electric flux and electric lines of force are generated between the vertical side of the vibrating side convexity 12$c_{ij}$ and the vertical side of the opposing side convexity 11$c_{ij}$ as shown in FIG. 24B. Therefore, if $\varepsilon_2 \ll \varepsilon_1$ and the horizontal gap d between the vibrating side convexity 12$c_{ij}$ and the opposing side convexity 11$c_{ij}$ is narrow, a capacitor is formed between the vibrating side convexity 12$c_{ij}$ and the opposing side convexity 11$c_{ij}$ that is at least partially dependent on bent electric force lines, including some laterally inclined electric force lines. Thus, the profile of the electric flux D=εE shown in FIG. 24B indicates that even a perfect insulator will have a flux profile almost similar to that of the convexity of the conductor shown in FIG. 24A.

The essence of the electrical-mechanical energy conversion (electrical-mechanical coupling) is illustrated in equations (3) and (9). The change in electrical capacitance C in response to a change in distance y, a variable of the mechanical system, leads to a change in the variable V of the electrical system. In other words, the fact that the electrical capacitance C is configured to change in response to changes in distance y is the essence of the acoustic element for the basic concept. FIGS. 22(*a*) and 22(*b*) show examples of structures of acoustic elements pertaining to the basic concept in which the crossing grooves are formed by conductive materials. However, even if the crossing grooves are made of insulators, high dielectrics, ferroelectrics, semiconductors, or semimetals, the electric capacity C can be made to change in accordance with changes in distance y. Even if these high dielectrics, ferroelectrics, semiconductors, half metals, etc. are insulators whose specific resistance ρ can be approximated as infinite, if the dielectric constant ε is sufficiently larger than 1, the electric capacitance C can be made to vary according to the change in distance y even if the crossed grooves similar to those in FIGS. 22(*a*) and (*b*) are constructed. FIG. 25 shows the results of a simulation of the relationship between the distance d between the horizontal electrodes and the transmitted peak sound pressure in the case of an applied voltage V=180 V between the stepped counter electrode 1*a* and the stepped vibrating electrode 2*a*. The simulations were performed using "Piezoelectric Wave Analysis Software PZFlex" developed by Weidlinger Associates, Inc. In the simulation, a 5-μm-thick protective film 56 on the top surface of the vibrating electrode consisting of a silicon oxide film was placed over the vibrating electrode 2*a*, and a structure in which the vibrating side convexity and the opposite side convexity were arranged in a 120-μm-wide cavity measured in the horizontal direction, with a pitch of 400 nm was targeted. The vibrating side convex part and the opposite side convex part were assumed to be composed of polycrystalline silicon with a relative permittivity of $\varepsilon_r$=11.9. As shown in FIG. 25, it can be seen that as the distance d between the horizontal electrodes decreases, the peak transmit sound pressure shows a similar trend as in Equation (6), where the peak transmit sound pressure increases almost monotonically.

FIG. 26 shows the results of a simulation using the piezoelectric wave analysis software PZFlex of the relationship between the transmitted peak sound pressure and the relative permittivity $\varepsilon_r$ constituting the crossed grooves at the applied voltage V=180 V between the stepped counter electrode 1*a* and the stepped vibrating electrode 2*a*. The simulation in FIG. 26 was also performed for the same structure as in FIG. 25, with the same protective film 56 on the top surface of the vibrating electrode, the same cavity width, and the same pitch, but the parameters were changed as the distance between the horizontal electrodes d=20 nm, 30 nm, and 40 nm. FIG. 26 shows that increasing the relative permittivity $\varepsilon_r$=1 (comparative case) shown in FIG. 23 has no effect, but increasing the relative permittivity $\varepsilon_r$ increases the transmitted peak sound pressure. Therefore, as a dielectric that constitutes the cross groove, a high dielectric material with a large relative dielectric constant $\varepsilon_r$ (hereinafter referred to as "high dielectric") is preferable to increase the transmission peak sound pressure. The relative dielectric constant of silicon oxide film ($SiO_2$ film) $\varepsilon_r$=3.8 to 4, while that of silicon nitride ($Si_3N_4$) film $\varepsilon_r$=7. The relative permittivity $\varepsilon_r$=5 to 5.5 obtained with the ONO film, which is a three-layer layered film of silicon oxide film/silicon nitride film ($Si_3N_4$ film)/silicon oxide film, is about the same. Further dielectrics with large relative permittivity $\varepsilon_r$ include, for example, strontium oxide (SrO) films with $\varepsilon_r$=6, aluminum oxide ($Al_2O_3$) films with $\varepsilon_r$=8 to 9, magnesium oxide (MgO) films with $\varepsilon_r$=10, yttrium oxide ($Y_2O_3$) films with $\varepsilon_r$=16 to 17, oxide with relative permittivity $\varepsilon_r$=about 21 Lanthanum oxide ($La_2O_3$), hafnium oxide ($HfO_2$) film with $\varepsilon_r$=22 to 26, zirconium oxide ($ZrO_2$) film with $\varepsilon_r$=22 to 25, tantalum oxide ($Ta_2O_5$) film with $\varepsilon_r$=25 to 27, bismuth oxide ($Bi_2O_3$) film with $\varepsilon_r$=40, or composite film with multiple layers of any one of them. A composite film can be used. However, according to FIG. 26, when the distance d=30 nm between electrodes in the horizontal direction, the relative permittivity $\varepsilon_r$=16.2 shows a dip where the peak transmit sound pressure drops, so care must be taken when employing $Y_2O_3$ films.

It can also be a dielectric consisting of a ternary compound such as a hafnium aluminate ($HfAlO_x$) film with a relative permittivity of about $\varepsilon_r$=11 or a hafnium silicate (HfSixOy) with a relative permittivity of about $\varepsilon_r$=11. That is, an oxide containing at least one of the elements strontium (Sr), aluminum (Al), magnesium (Mg), yttrium (Y), hafnium (Hf), zirconium (Zr), tantalum (Ta), or bismuth (Bi), or a silicon nitride containing these elements, is used as the cross groove can be used as the "dielectric" that constitutes the The "ferroelectrics" that make up the intersection groove include strontium titanate ($SrTiO_3$), magnesium titanate ($MgTiO_3$), calcium titanate ($CaTiO_3$), bismuth titanate ($Bi_4Ti_3O_{12}$), lead titanate ($PbTiO_3$), lead zirconate ($PbZrO_3$), barium titanate Perovskite oxides such as strontium strontium ($BaSrTiO_3$), strontium bismuth tantalate ($SrBi_2Ta_2O_9$), and lead zirconate titanate ($PbZr_xTi_{1-x}O_3$) and their mixed crystals can also be used, such as $MgTiO_3$ and $CaTiO_3$ with dielectric constants $\varepsilon_r$=150 to 300 and relatively Although large, they are "normal dielectrics". Therefore, as dielectrics constituting the crossed grooves, it is acceptable to use a normal dielectric with a large relative dielectric constant $\varepsilon_r$.

The relative permittivity of silicon (Si) $\varepsilon_r$=about 11.2 to 11.9. Also, the relative permittivity of germanium (Ge) $\varepsilon_r$=about 16.2 and that of gallium arsenide (GaAs) $\varepsilon_r$=about 12.9. Therefore, even if these semiconductors have semi-insulating properties with a specific resistance ρ of 1 kΩ·cm or more, the relative dielectric constant $\varepsilon_r$ is large, so that changes in electric capacitance C in response to changes in distance y can be realized when cross grooves similar to those in FIGS. 22(*a*) and (*b*) are constructed. Also, if these semiconductors have a low specific resistance ρ of 1 Ω·cm or less, it is of course possible to realize a change in electric capacitance C in response to a change in distance y by configuring a cross slot similar to FIGS. 22(*a*) and 22(*b*) as a conductor. Similarly, conductive dielectrics such as tin oxide ($SnO_2$), tin oxide (ITO) with indium (In), tin oxide (ZTO) with zinc (Zn), tin oxide (GTO) with gallium (Ca), and tin oxide (ATO) with aluminum (Al) can also be used as conductors in FIGS. 22(*a*) and (*b*) In the case of configuring cross grooves similar to those in FIGS. 22(*a*) and (*b*), changes in electrical capacitance C in response to changes in distance y can be achieved. For example, a dielectric constant of ITO at low frequencies of about $\varepsilon_r$=9 has been reported, although it depends on the composition and manufacturing method. When "dielectric film" is used in the following description, it shall mean a film made of these high dielectrics, ferroelectrics, paraelectrics, semiconductors. etc.

(Simulation of Transmission Capability)

Figure 3A:
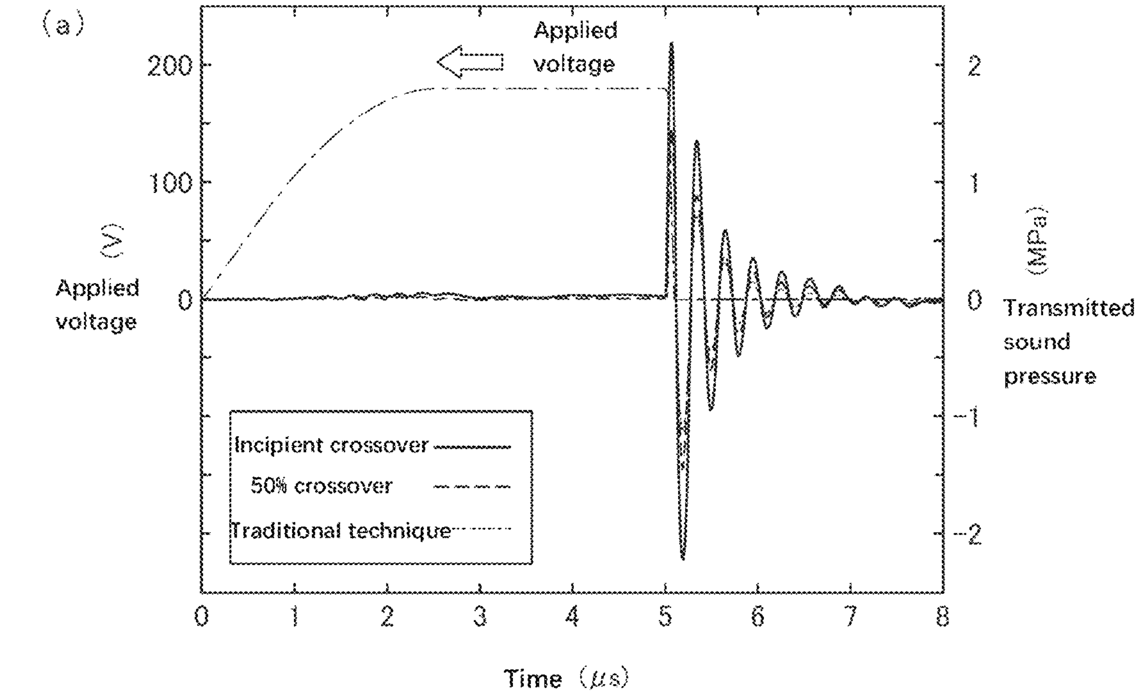
FIGS. 3A-B shows the results of a simulation of the transient response of the transmitted sound pressure when the same applied voltage is applied in steps, comparing the acoustic element pertaining to the basic concept of the present disclosure with that of the conventional technology.
Figure 3B:
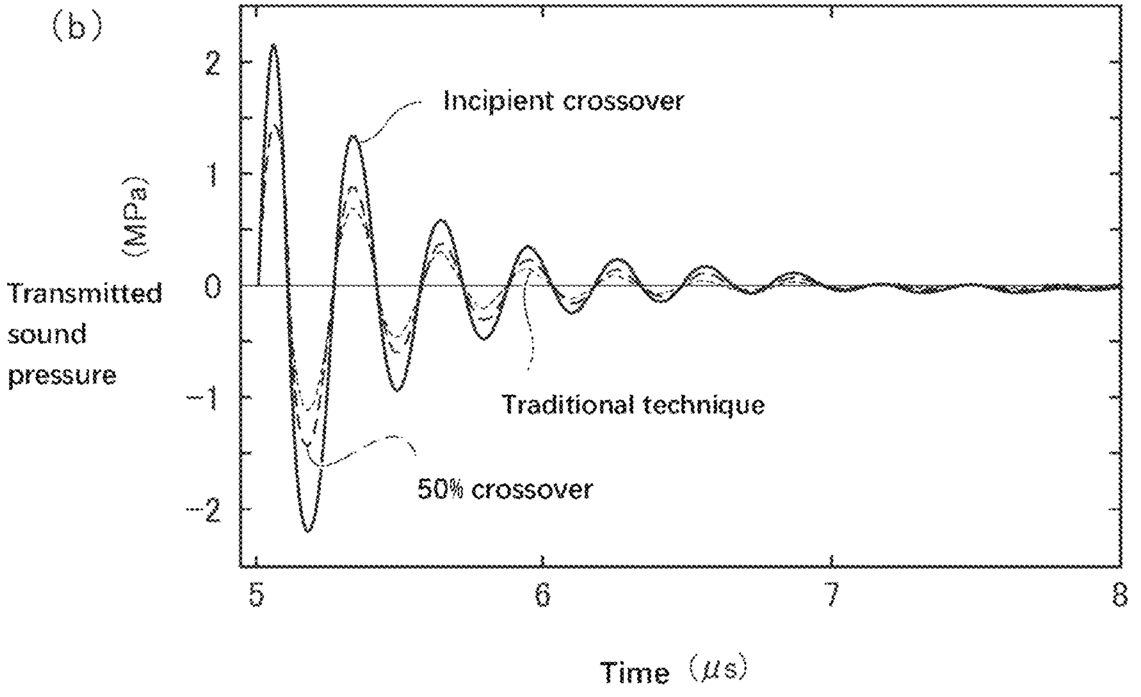
Figure 4:
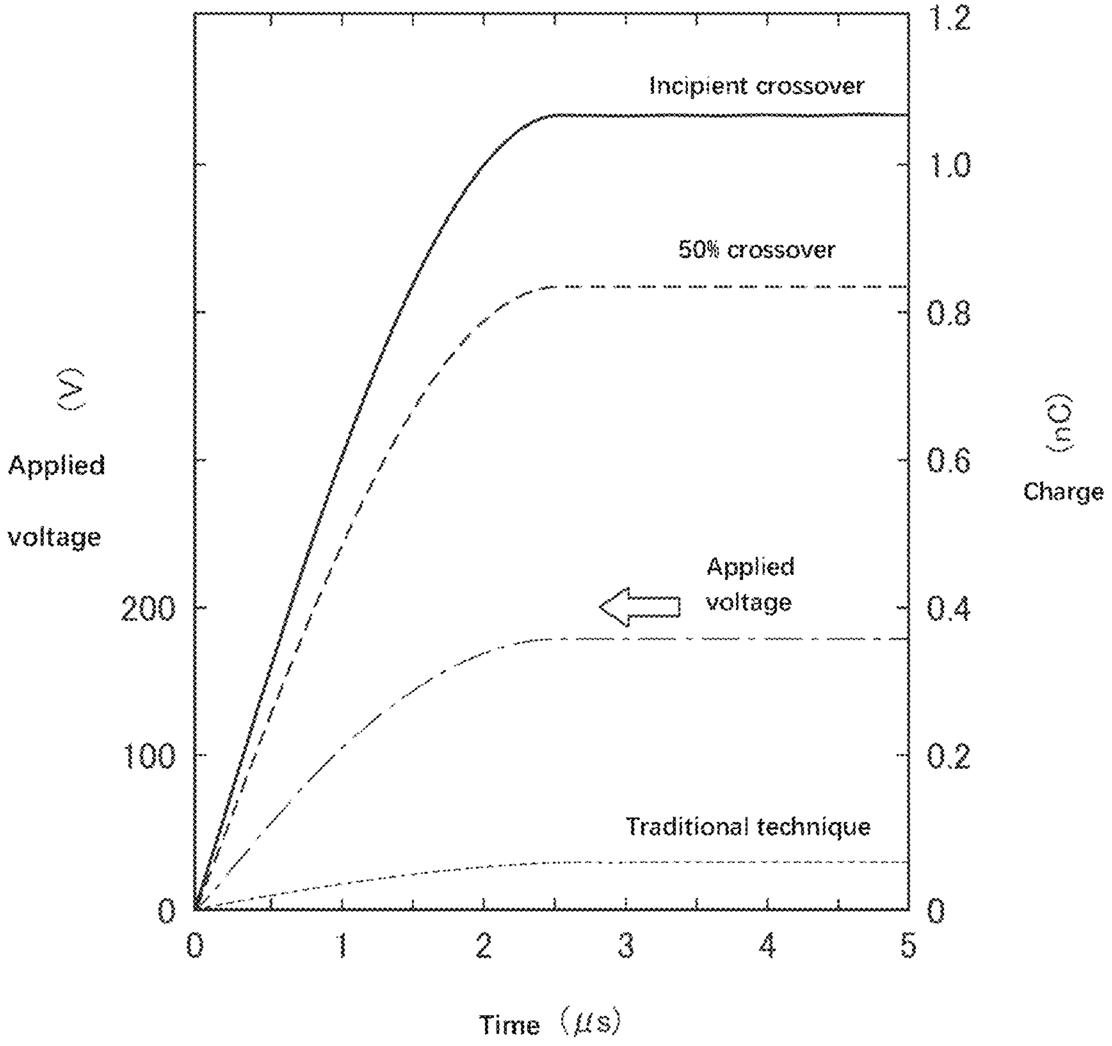
FIG. 4 shows the results of simulating the amount of charge accumulated between the base of the counter electrode and the base of the vibrating electrode when the same applied voltage is stepped input, comparing the acoustic element pertaining to the basic concept of the present disclosure with the acoustic element pertaining to conventional technology.
Figure 5:
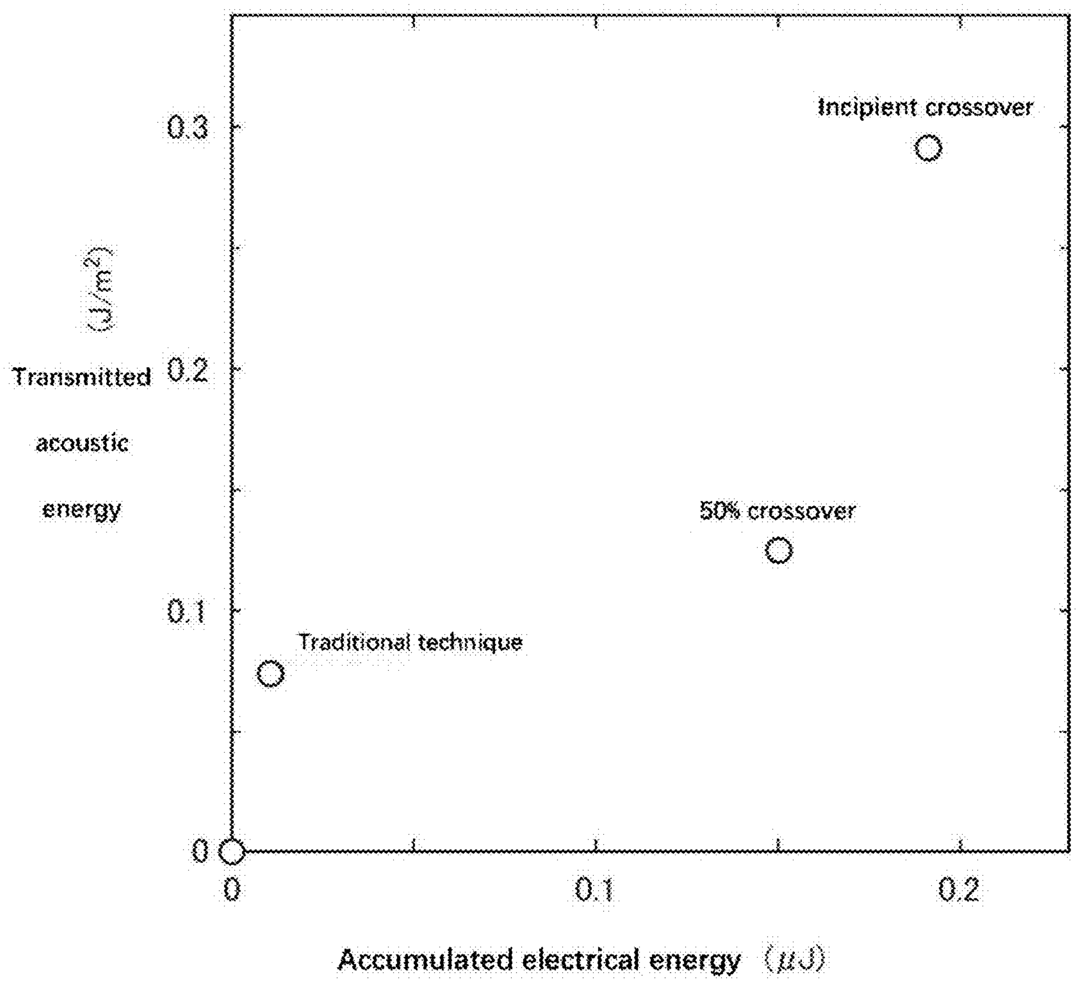
FIG. 5 shows the relationship between the stored electrical energy and the transmitted acoustic energy based on the results of FIGS. 3 and 4, comparing the acoustic element pertaining to the basic concept of the present disclosure with the acoustic element pertaining to the conventional technology.

For the case where the convex hull is formed by a solid dielectric that is almost a perfect insulator, the approximate analysis shown in Equations (1) through (13), etc., is more difficult than for the case where it is formed by a conductive material. Therefore, a quantitative study shall be conducted by numerical simulation. In the case where the convex hull is formed of a solid dielectric that is almost a perfect insulator, the results of simulations using the piezoelectric wave analysis software PZFlex are shown in FIGS. 3 to 5 regarding the improvement of transmission capability. The "acoustic element in accordance with the conventional technology," which is the subject of comparison for the simulations shown in FIGS. 3 to 5, has only the planar counter electrode base 11 and vibrating electrode base 12 of the structure illustrated in FIG. 2B, and the counter electrode convex part 11$a_{p-1}$, 11$a_p$, 11$a_{p+1}$, . . . and the vibrating electrode It means a structure without convex part of 12$a_{q-1}$, 12$a_q$, 12$a_{q+1}$, . . . . For the acoustic elements of conventional technology shown by dotted lines in FIGS. 3(*a*), 3(*b*), and 4, the distance between the counter electrode base 11 and the vibrating electrode base 12, that is, the height measured in the vertical direction (cavity height) of the vibrating cavity 18 in the initial state, is 360 nm, and the width measured in the horizontal direction (cavity width) of the vibrating cavity is 120 μm.

Two types of acoustic elements for the basic concept of the present disclosure were prepared with different initial intersections of solid dielectrics whose convex hulls are almost perfect insulators ($\rho \approx \infty$). The acoustic elements with mutually intersecting dielectric convexities, indicated by dashed lines in FIGS. 3(*a*), 3(*b*), and 4, have a vibrating electrode base 12, which is flat when not vibrating, with vibrating side convexities 12$a_{q-1}$, 12$a_q$, 12$a_{q+1}$, . . . in the vibration direction, as shown in FIG. 2B It is a structure added as a solid dielectric projection with a first stepped sidewall consisting of parallel planes. On the other hand, the planar counter electrode base 11, which faces parallel to the vibrating electrode base 12, has counter side convex portions 11$a_{p-1}$, 11$a_p$, 11$a_{p+1}$, . . . added as solid dielectric protrusions with a second stepped sidewall consisting of a plane parallel to the vibration direction. We have already As explained above, in the simulation, the vibrating side convex hulls 12$a_{q-1}$, 12$a_q$, 12$a_{q+1}$, . . . and the opposing side convex hulls 11$a_{p-1}$, 11$a_p$, 11$a_{p+1}$, . . . are polycrystalline silicon (polysilicon) with high specific resistance. The relative permittivity εr of silicon is assumed. The height of the vibrating cavity measured in the vertical direction (cavity height) was set to 900 nm, and the cavity width defined in the left-right direction of the vibrating cavity in FIG. 2B was set to 120 μm, similar to the acoustic elements in the conventional technology. The dashed lines in FIGS. 3(*a*), 3(*b*) and 4 show the opposite side convexities 11$a_{p-1}$, 11$a_p$, 11$a_{p+1}$, . . . and the vibration side convexities 12$a_{q-1}$, 12$a_q$, 12$a_{q+1}$, . . . with a pitch of 400 nm in this 120 μm cavity width . . . are nested alternating structures with a gap of 20 nm.

For acoustic elements with convex portions of dielectrics that intersect each other, indicated by dashed lines in FIGS. 3(*a*), 3(*b*), and 4, the amount of vertical intersection (initial intersection) between the counter electrode base 11 and vibrating electrode base 12 in the initial state before application of drive voltage is 50%. The 50% initial crossing in FIG. 5 has the same meaning. However, the ideal state in which the base 12 of the vibrating electrode is uniformly displaced as a parallel plate is assumed. The 50% initial intersection means that in the cross-sectional structure showing the intersection state, the upper end of the counter electrode base 11 and the lower end of the vibrating electrode base 12 are interlocked with each other as the initial setting by half of the protrusion of the protruding parts. In an acoustic element with intersecting dielectric convexities, the facing area defined between the vibrating and stepped side convexities that are intermeshing with each other varies with the voltage applied between the vibrating electrode base 12 and the opposing electrode base 11.

The acoustic element shown in solid lines in FIGS. 3(*a*), 3(*b*), and 4 is the case where the horizontal level on the cross-sectional view of the upper end of the opposite side convexity and the horizontal level on the cross-sectional view of the lower end of the vibrating side convexity are identical. The target structure, whose results are shown in solid lines in FIGS. 3(*a*), 3(*b*), and 4, also assumes an ideal situation where the vibrating electrode base 12 is uniformly displaced as a parallel plate. In FIGS. 3 through 5, the case where the opposing electrode base 11 has the same horizontal level on the cross-sectional view of the upper end of the opposing convexity and the lower end of the vibrating convexity is defined as "no initial crossing". The cavity height in the case of 50% initial crossing shown by the dashed line was 900 nm, whereas the acoustic element with no initial crossing shown by the solid line in FIGS. 3(*a*), 3(*b*) and 4 has a cavity height of 700 nm. The cavity width is 120 μm as in the conventional acoustic elements and the acoustic element with 50% initial crossing. The cavity width of 120 μm is the same as that of the 50% initial crossing, with a pitch of 400 nm and a gap of 20 nm between the opposing convex hull and the vibrating convex hull.

As shown in the transient response waveforms in FIGS. 3(*a*) and 3(*b*), with respect to damped vibration (under braking). which is the transient response characteristic of the transmitted sound pressure generated by the same applied voltage step input of 180 V, acoustic elements with dielectric convexities that cross each other can achieve better results than those of the conventional technology. The results of this study show that the horizontal axis in FIG. 3(*a*) shows the time variation of the transient response. The left vertical axis of FIG. 3(*a*) shows the applied voltage to be stepped input, and the right vertical axis of FIG. 3(*a*) shows the transmitted sound pressure generated by the stepped input. The single-dotted line in FIG. 3(*a*) shows the transient response waveform of the applied voltage that is step-input between the base of the counter electrode and the base of the vibrating electrode 12 up to time 5 μs. The applied voltage rises with a predetermined time constant from time 0 μs to a constant voltage of 180V at time 2 μs. Then, when the step-input applied voltage is dropped to 0 V at time 5 μs, the three types of capacitive acoustic elements each generate damped vibration (under braking) by ringing after the base 12 of the vibrating electrode overshoots, as shown by the solid, dashed. and dotted lines. Similar to what is known in the RLC series resonant circuit of an electric circuit, the "damped vibration" of the three types of acoustic elements is an exponentially decaying vibration of the envelope of the sine wave vibration peak (amplitude).

To allow differentiation, the falling waveform of the applied voltage shown by the single-dotted line in FIG. 3(*a*) is set to suddenly become 0 V with a time constant of ¼ of a sine wave. As shown in FIG. 3(*a*), the transient response waveform of the transmitted sound pressure generated after 5 μs of time due to the damped vibration of the base 12 of the vibrating electrode as the step-input applied voltage suddenly becomes 0V, can be obtained even when an almost perfect insulator (ρ≈∞) is used as the dielectric, by making the structure of the convex part of the dielectric cross each other. It is shown that the acoustic elements of the conventional technology exhibit different transmitted sound pressures. FIG. 3(*b*) shows an enlarged time axis of the transient response waveform after time 5 μs in FIG. 3(*a*), and the left vertical axis in FIG. 3(*b*) shows the change in transmitted sound pressure generated by the acoustic element.

As is well known in transient response theory in electric circuits, the natural angular frequency ($\omega_0=2\pi f$) of a sinusoidal wave exhibiting damped oscillation in an RLC series resonant circuit depends on the capacitance C. In capacitive acoustic elements, the natural angular frequency of the sinusoidal wave exhibiting damped oscillations also depends a little on the electrical capacitance between the counter electrode base 11 and the vibrating electrode base 12. However, the contribution of the electrical capacitance to the natural angular frequency is negligible because the electromechanical coupling is small. Therefore, in FIGS. 3(*a*) and 3(*b*), the frequency f of the acoustic elements of conventional technology, shown by dotted lines, and the acoustic elements with dielectric convexities in two different crossing configurations, shown by dashed and solid lines, are both simulated as if f=3 MHz (constant). As can be seen from FIG. 3(*b*), the peak value of the damped vibration of the transmitted sound pressure of the acoustic element with no initial crossing shown by the solid line is larger than the peak value of the damped vibration of the transmitted sound pressure of the acoustic element with 50% initial crossing shown by the dashed line. This is because the change in the amount of crossing (crossing area) during actual operation is greater for no initial crossing than for 50% initial crossing. The simulation condition is that the vibration side convexity crosses to a depth of ⅔ of the opposing side convexity during actual operation. Compared to the acoustic element of the conventional technology shown in the dotted line, the peak value of the damped vibration of the transmitted sound pressure of the acoustic element without initial crossing shown in the solid line means that the simulation was able to obtain a nearly twofold increase in transmitted sound pressure even when an almost perfect insulator (ρ≈∞) was used as the dielectric.

As shown in FIG. 4, with respect to the amount of charge accumulated between the counter electrode base and the vibrating electrode base 12, for the same applied voltage of 180 V, the acoustic element with the dielectric convexity in two different crossing modes obtained better simulation results than the acoustic element with the conventional technology. The horizontal axis in FIG. 4 shows the time variation of the transient response, the left vertical axis in FIG. 4 shows the applied voltage that is stepped input, and the right vertical axis in FIG. 4 shows the amount of charge accumulated between the counter electrode base and the vibrating electrode base 12 by the stepped input. That is, similar to the simulation results for transmitted sound pressure, the amount of charge accumulated in the acoustic element with dielectric convexity without initial crossing is larger than the amount of charge accumulated in the acoustic element with dielectric convexity with 50% initial crossing. Compared with the acoustic element with dielectric convexity without initial crossing shown by the solid line, the acoustic element with dielectric convexity without initial crossing shown by the dotted line is more than 2.5 times larger than the acoustic element of the conventional technology, even when an almost perfect insulator (ρ≈∞) is used as the dielectric. In addition, the acoustic element with a dielectric convexity of 50% of the initial crossing shown by the dashed line has more than twice the amount of charge accumulation compared to the acoustic element of the conventional technology.

Furthermore, the horizontal axis in FIG. 5 shows the electrical energy stored between the counter electrode base 11 and the vibrating electrode base 12, and the vertical axis in FIG. 5 shows the transmitted acoustic energy. As shown in FIG. 5, with regard to the amount of transmitted acoustic energy, the acoustic element with 50% initial crossing shown on the right side of the middle row of FIG. 5 has a larger stored electric energy than the acoustic element with conventional technology shown on the lower left side of FIG. 5, and as a result, even when an almost perfect insulator (ρ≈∞) is used as the dielectric, the transmitted acoustic energy is also larger than that of the conventional acoustic element. In addition, the acoustic element without initial crossing shown in the upper right of FIG. 5 has a larger change in the facing area between the side wall of the vibrating side convexity and the side wall of the facing side convexity, resulting in a larger stored electric energy compared to the acoustic element with 50% initial crossing shown on the right side of the middle panel of FIG. 5. As a result, the simulation confirmed that the acoustic element with no initial crossing also has a larger transmitted acoustic energy than the acoustic element with 50% initial crossing.

Based on the above description of the basic concept of the present disclosure and the accompanying simulations, the present disclosure will now be illustrated exemplarily by describing the first through sixth embodiments of the present disclosure. The first through fourth embodiments of the present disclosure will be illustrative of the main explanation for the case where the opposite side convexity and the vibrating side convexity are conductors. On the other hand, the fifth embodiment of the present disclosure is illustrative of the case where the opposite convexity and the vibrating convexity are almost perfect insulators (specific resistance ρ≈∞), and the sixth embodiment is illustrative of the case where either the opposite convexity or the vibrating convexity is almost a perfect insulator or equivalent to a perfect insulator. However, as explained in the basic concept of the present disclosure, it should be noted that the opposing convexity and the vibrating convexity can be conductors with low specific resistance ρ, almost perfect insulators (ρ≈∞), or situations equivalent to perfect insulators.

In the following drawings, identical or similar parts are marked with identical or similar symbols. However, it should be noted that the drawings are schematic, and the relationship between thickness and plane dimensions, the ratio of the size of each component, etc., may differ from those in reality. Therefore, the specific thickness, dimensions, size, etc. should be judged in a more diverse manner, taking into consideration the purpose of the technical concept that can be understood from the following explanation. Also, it is of course the case that there are parts where the relationship and ratio of dimensions differ among the drawings.

The first through sixth embodiments shown below are examples of a method for embodying the technical concept of the present disclosure and devices, etc. used in the method, and the technical concept of the present disclosure does not specify the material, shape, structure, arrangement, etc. of the constituent parts or the procedure, etc. of the method as described below. The technical concept of the present disclosure is not limited to the contents described in the first through sixth embodiments, and various changes can be made within the technical scope defined by the present disclosure-specific matters in the claims.

First Embodiment

Figure 1:
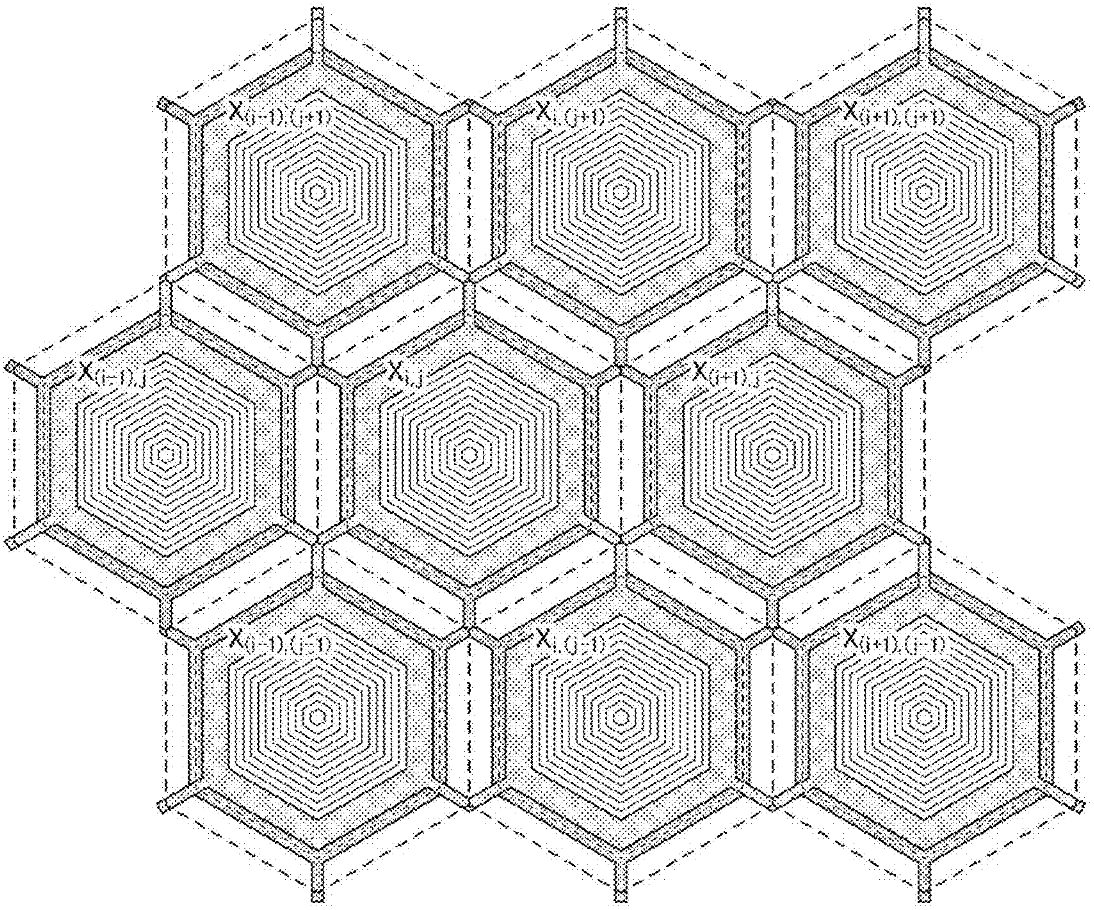
FIG. 1 is a plan view showing a schematic of an acoustic element integrated circuit according to the first embodiment of the present disclosure.

As shown in FIG. 1, the acoustic element integrated circuit of the first embodiment of the present disclosure consists of a device array section with regular hexagonal unit cells $X_{(i-1),(j+1)}$, $X_{i,(j+1)}$, $X_{(i+1),(j+1)}$, . . . , $X_{(i-1),j}$, $X_{i,j}$, $X_{(i+1),j}$, . . . , $X_{(i-1),(j-1)}$, $X_{i,(j-1)}$, $X_{(i+1),(j-1)}$, . . . , etc. are arranged on the same plane (on the same surface) to form a two-dimensional matrix. The array of cells constituting the two-dimensional matrix defined on the same plane as shown in FIG. 1 is distributed as a set of acoustic elements, each of which has n units (n is a positive integer greater than or equal to 1), and these n units of acoustic elements can be driven collectively by the drive circuits provided for each set respectively. In other words, in the acoustic element integrated circuit of the first embodiment, one set of n acoustic elements constitutes one cell, a drive circuit is provided for each set, and the n acoustic elements constituted by a set of unit number n can be driven collectively by each drive circuit. However, for the sake of simplicity, the case where the number of units n=1 is illustrated exemplarily in the following. And, as illustrated exemplarily in FIG. 2A and FIG. 2B, in many of the following explanations, we will focus on a single unit cell $X_{i,j}$ to represent and comprehensively represent multiple unit cells arranged in a two-dimensional matrix. The unit cell $X_{i,j}$ shown in FIGS. 2A and 2$b$, etc., is a capacitive acoustic element with a vibrating cavity whose new structure is introduced herein. The unit cell $X_{i,j}$ is a transmitting acoustic element that outputs ultrasonic signals, and a large output acoustic element integrated circuit is composed of a plurality of transmitting acoustic elements shown in FIGS. 2A and 2$b$, etc., arranged in a matrix as shown in FIG. 1.

As illustrated exemplarily in FIG. 2A, the acoustic element of the first embodiment consists of a plurality of vibration-side convexities (first electrode-side convexities) 12$a_{q-1}$, 12$a_q$, 12$a_{q+1}$, . . . consisting of a plurality of wall-shaped conductors forming a group of multiple concentric hexagonal rings inside a cavity whose planar pattern is a regular hexagon, with equal The first electrode side convex hull is made up of a plurality of vibrating side convex hulls 12$a$ Each of the plurality of vibration side convex hulls 12$a_{q-1}$, 12$a_q$, 12$a_{q+1}$, . . . has a first stepped sidewall (vertical sidewall) consisting of a plane parallel to the vibration direction as shown in FIG. 2B. The "vibration direction" is the direction that defines the maximum amplitude when each of the plurality of vibrating side convexities 12$a_{q-1}$, 12$a_q$, 12$a_{q+1}$, . . . flexes like a drum belly to form a convex downward curved surface, as illustrated in FIGS. 2C and 2D. Wall-like opposing side convexities (second electrode side convexities) 11$a_{p-1}$, 11$a_p$, 11$a$, 11$a$, 11$a$, 11$a$, 12$a_{p+1q}$, 12$a_{q+1}$, . . . made of multiple conductors forming another group of multiple concentric hexagonal rings so that it is possible to be trapped in the gap between each of the multiple vibrating side convexities 12$a_{q-1}$, 12$a$, 12$a$, . . . are arranged at a constant pitch with equally spaced gaps. Each of the plurality of vibrating side convexities 12$a_{q-1}$, 12$a_q$, 12$a_{q+1}$, . . . and each of the plurality of wall-like opposing side convexities 11$a_{p-1}$, 11$a_p$, 11$a_{p+1}$, . . . is a cross-sectional structure, as illustrated in FIGS. 2C and 2$d$ The cross structure in FIGS. 2C and 2D is configured in such a way that the cross structure in FIGS. 2C and 2D is possible.

Each of the plurality of opposing side convexities 11$a_{p-1}$, 11$a_p$, 11$a_{p+1}$, . . . also has a second step sidewall (vertical sidewall) consisting of a plane parallel to the first step sidewall, as shown in the cross-sectional view in FIG. 2B. That is, in the cross-sectional structures illustrated in FIGS. 2C and 2D, the first and second step sidewalls face each other to form a parallel plate capacitor, which can induce positive and negative charges as true charges on their respective surfaces according to Gauss' law. However, FIG. 2A is a simplified schematic structure with a reduced number of concentric hexagonal rings for convenience of explanation. As a real structure, for example, in the 120 μm length between opposite sides of a regular hexagon measured in the direction defining the cross section IIB-IIB in FIG. 2A, there are about 150 concentric hexagonal rings with a pitch of 400 nm and a width of 180 nm, for example, 11$a_{p-1}$, 11$a_p$, 11$a_{p+1}$, . . . . However, if about 150 concentric hexagonal rings are drawn in FIG. 2A, they would not be visible, so they are thinned out in this figure.

In a real structure, assuming, for example, 151 opposing side convexities 11$a_{p-1}$, 11$a_p$, 11$a_{p+1}$, . . . , and 150 concentric hexagonal rings of 180 nm width forming oscillating side convexities 12$a_{q-1}$, 12$a_q$, 12$a_{q+1}$, . . . are arranged alternately facing each other with a gap of 20 nm to form 150 concave-convex pairs. That is, the opposing convex hull can have the outermost opposing stepped side wall 11$a_0$ as the side wall structure, and from this side wall structure to the inner circumference, multiple concentric hexagonal rings of the first opposing convex hull 11$a_1$, second opposing convex hull 11$a_2$, . . . , 149th opposing convex hull 11$a_{149}$ with width 180 nm can be arranged at pitch 400 nm. In this case, the 150th opposing convexity 11$a_{150}$ is placed as a hexagonal pillar at the center of the vibrating cavity of the regular hexagonal unit cell $X_{i,j}$. However, it is not always essential to construct a multiple concentric hexagonal ring with the same gap and pitch. By making the gap and pitch of the multiple concentric hexagonal rings non-uniform, it is possible to widen the frequency bandwidth of the acoustic element integrated circuit of the first embodiment. Therefore, the gap or pitch of the multiple concentric hexagonal rings may be varied for the purpose of widening the frequency bandwidth.

Corresponding to the first opposing convexity 11$a_1$, the second opposing convexity 11$a_2$, . . . , the 150th opposing convexity 11$a_{150}$, the 180 nm wide vibrating side convexities are arranged on the inner circumference starting from the outermost first vibrating side convexity 12$a_1$, the second vibrating side convexity 12$a_2$, the third vibrating side convexity 12$a_3$, . . . , the concentric hexagonal rings of the 150th vibrating side convexity 12$a_{150}$ are opposed to each other to form 150 concavo-convex pairs. The 150th vibrating side convexity 12$a_{150}$ is the innermost hexagonal ring that surrounds from the outside the 150th opposing side convexity 11$a_{150}$, which is a hexagonal pillar located in the center of the vibrating cavity. The hexagonal column at the center 150th opposing side convexity 11$a_{150}$ may be enlarged to a larger diameter to the location of the 150th vibrating side convexity 12$a_{150}$ and used as the opposing electrode side convexity of the insulator. In this case, the opposite 150th vibration side convexity 12$a_{150}$ is also not a hexagonal ring, but a hexagonal pillar as a vibration electrode side convexity composed of an insulator, and the tip of the opposite electrode side convexity and the tip of the vibration electrode side convexity can be configured to collide with each other, but at least one of the opposite electrode side convexity and vibration electrode side convexity, However, it is sufficient if at least one of the convexity on the opposite electrode side and the convexity on the vibration electrode side is composed of an insulator. That is, the tip of the opposite electrode side convexity and the tip of the vibrating electrode side convexity are made to collide with each other to act as a stopper to prevent contact between the other first opposite side convexity 11$a_1$-149th opposite side convexity 11$a_{149}$ and the other first vibrating side convexity 12$a_1$-149th vibrating side convexity 12$a_{150}$ that corresponds to these respectively.

To function as a stopper, the height of the tip of the opposing electrode side convex and the height of the vibrating electrode side convex should be adjusted so that the first opposing side convex 11$a_1$~149th opposing side convex 11$a_{149}$ and the first vibrating side convex 12$a_1$~149th vibrating side convex 12$a_{150}$ are nested to a sufficient depth to intersect each other and maximize their opposing area. When the central counter electrode side convex and the vibrating electrode side convex serve as stoppers, 149 concave-convex pairs consisting of concentric hexagonal rings of the first counter electrode side convex 11$a_1$~149th counter electrode side convex 11$a_{149}$ and the corresponding first vibrating electrode side convex 12$a_1$~149th vibrating electrode side convex 12$a_{149}$ respectively, serve as electrodes. 150 concave-convex In the case of a pair, the gap between the first vibrating side convexity 12$a_1$ surrounding the first opposing convexity 11$a_1$ from the outside, the gap between the second vibrating side convexity 12$a_2$ surrounding the second opposing convexity 11$a_2$ from the outside, . . . and the 150th vibrating side convexity 12$a_{150}$ surrounding the 150th opposing convexity 11$a_{150}$ from the outside The gap is configured as 20 nm each, with alternating vertical side walls facing each other. The 150th vibrating side convexity 12$a_{150}$ may be configured as a hexagonal column located at the center of the vibrating cavity, with the innermost 150th opposing side convexity 11$a_{150}$ surrounding the 150th vibrating side convexity 12$a_{150}$ from the outside to form 150 concave-convex pairs.

Figure 6A:
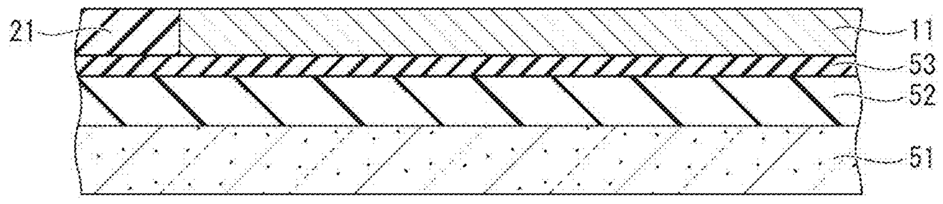
FIG. 6A shows a process cross-sectional view illustrating an example of the manufacturing method of an acoustic element according to the first embodiment (Part 1).
Figure 6B:
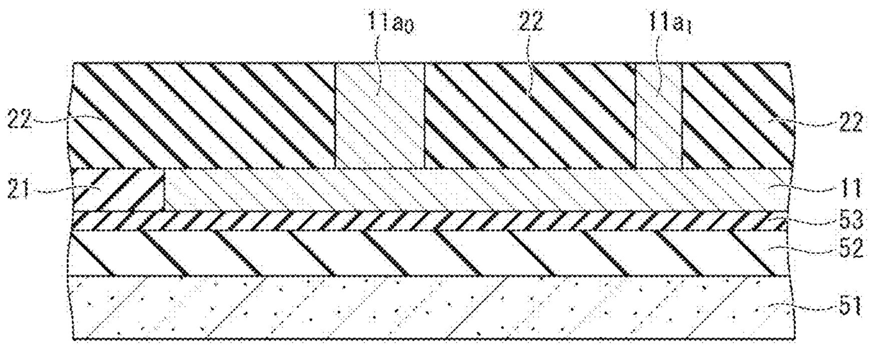
FIG. 6B is a cross-sectional process diagram illustrating the manufacturing method of the acoustic element of the first embodiment, focusing on the cross-sectional structure of the periphery of the vibration cavity to be formed, with respect to the process after the cross-sectional structure illustrated in FIG. 6A (Part 2).
Figure 6C:
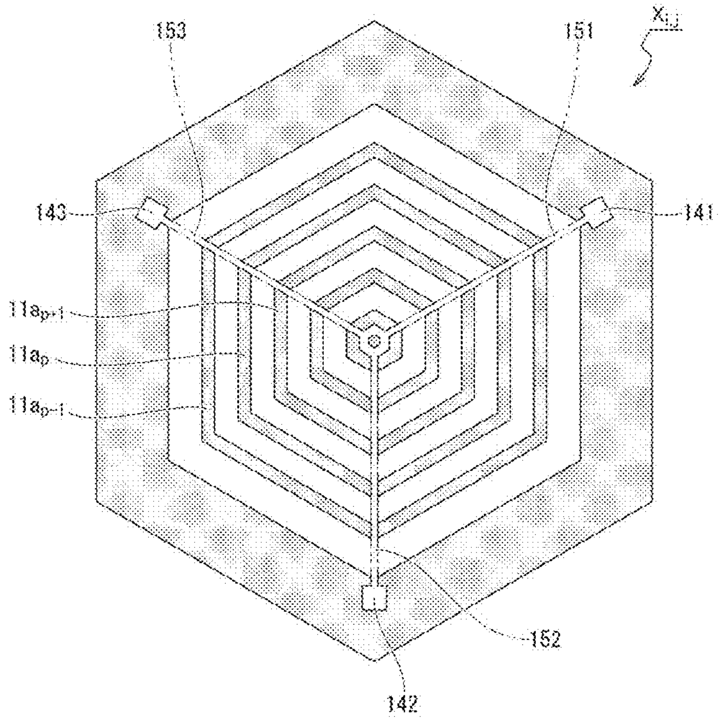
FIG. 6C is a plan view illustrating exemplarily the second damascene groove section in which the opposite side convex part is embedded, and the three corrosion medium flow channels (canals), etc.

In FIG. 1, FIG. 2A and FIG. 6C, etc., the case in which the planar pattern of unit cell $X_{i,j}$, etc. is a regular hexagon is illustrated, but the planar pattern of unit cell $X_{i,j}$, etc. is not limited to a regular hexagon. For example, various planar patterns can be employed, including a square or a regular pentagon, such as a regular octagon shown in FIG. 7A and a regular dodecagon shown in FIG. 8A, which are omitted from the planar pattern illustration. However, regular polygons with a small number of angles less than a regular pentagon are not preferred except for modes that actively use harmonics, since harmonics of ultrasonic vibration become more pronounced.

Each of the plurality of vibrating side convexes 12$a_{q-1}$, 12$a_q$, 12$a_{q+1}$, . . . shown in FIG. 2A is a rectangular convex in cross section on a flat vibrating electrode base (first electrode base) 12 that has a flat main surface when not vibrating (bottom side of the vibrating electrode base 12 in the representation in FIG. 2B) They are suspended and arranged as The cross-sectional shape of the vibrating side convexes 12$a_{q-1}$, 12$a_q$, 12$a_{q+1}$, . . . is not limited to a rectangle, but can be a trapezoid as shown in FIG. 22(*b*). The angle of the oblique side of the trapezoid should be inclined within 45° to the direction of vibration. The angle of inclination θ=45° is the case where sin 2θ=1 is the minimum value in equation (13). That is, the first step sidewalls presented by each of the vibration side convexities 12$a_{q-1}$, 12$a_q$, 12$a_{q+1}$, . . . should comprise a plane with an inclination angle θ inclined within 45° to the vibration direction, as can be understood from equations (12a), (12b) and (13) etc. A smaller inclination angle θ is preferable, and it is more preferable that the plane be inclined within 10°. And it can be understood from equation (12a), etc., that a topology in which the inclination angle θ is 0° with respect to the vibration direction, as shown in FIG. 2A, is most preferred. The vibrating electrode base 12 is composed of a conductive material such as metal.

Figure 13:
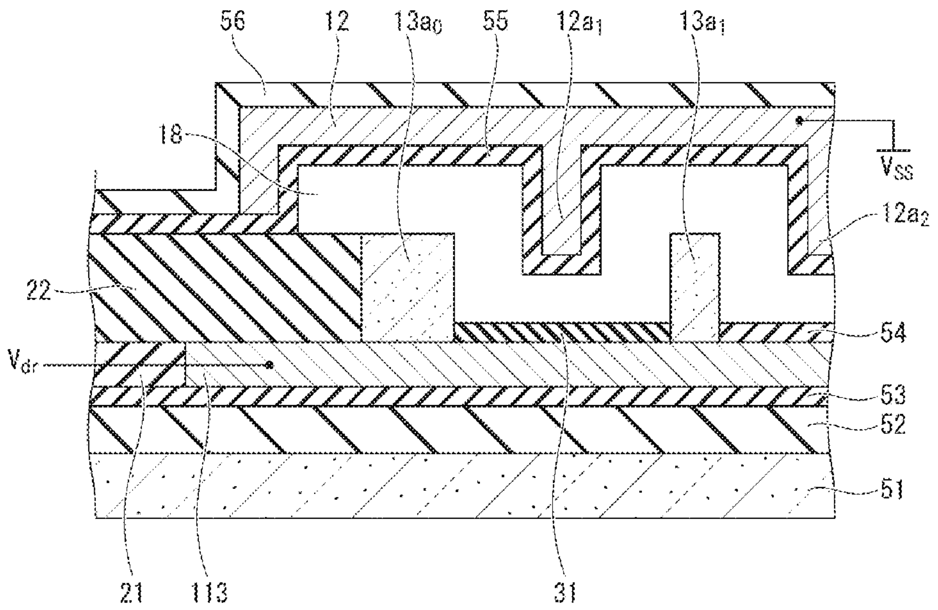
FIG. 13 is a schematic cross-sectional view illustrating a schematic of the acoustic element of the second embodiment, focusing on the structure of the peripheral side of the vibrating cavity.

For the material of the vibration side convex hull 12$a_{q-1}$, 12$a_q$, 12$a_{q+1}$, . . . , any conductive material with a low specific resistance of about ρ=3 Ω·cm or less, whether dielectric or non-dielectric, can be used as the structure of the acoustic element of the first embodiment. However, more generally, the vibration side convexity can be a dielectric with specific resistance ρ≈∞. For the vibration side convex hull 12$a_{q-1}$, 12$a_q$, 12$a_{q+1}$, . . . , for example, a metal, a semi-metal, a semiconductor doped with impurities that function as a conductor, an oxide doped with impurities that function as a conductor, etc. are among the materials used to construct the acoustic element pertaining to the first embodiment The materials can be used as one of the materials used in the construction of the acoustic element of the first embodiment. In FIG. 13, etc., described below, the case of a semiconductor of low specific resistance ρ with impurities added is shown as an example. Since a material that polarizes when voltage is applied is a "dielectric," a semiconductor without impurities is a dielectric, and a semiconductor with impurities is also a dielectric. A perfect conductor can also be regarded as a dielectric with relative permittivity $\varepsilon_r=\infty$. Therefore, by adding impurities to various semiconductor materials (dielectrics) and oxides to make them conductors with low specific resistance ρ, they can be used for the vibrating side convex hulls 12$a_{q-1}$, 12$a_q$, 12$a_{q+1}$, . . . . Polycrystalline semiconductors with impurities, such as polycrystalline silicon, i.e., doped polysilicon (DOPOS), can also be used for the vibrating side convolutions 12$a_{q-1}$, 12$a_q$, 12$a_{q+1}$, . . . . The metal part is usually referred to as the "electrode". In the present disclosure, for two opposing areas of different potentials, such as those constituting a capacitor, the part where positive and negative charges are induced on the surfaces of the opposing areas, respectively, shall be called an "electrode," even if it is a dielectric or other surface. Therefore, a member that forms a convex region of the same potential electrically connected to the vibrating electrode base 12, and for which a true charge (free charge) is induced on the surface of the region by Gauss's law, can be called a "vibrating side convex part" and defined as a part of an "electrode" even if it is a surface of a dielectric or the like.

Each of the plurality of vibrating side convexities 12$a_{q-1}$, 12$a_q$, 12$a_{q+1}$, . . . is arranged as a convex that is inserted into the interior space of the recess defined by the convexity of the opposing side convexities 11$a_{p-1}$, 11$a_p$, 11$a_{p+1}$, . . . . The convexes are arranged in the following manner The integral structure of the vibrating electrode base 12 and the vibrating side convexes 12$a_{q-1}$, 12$a_q$, 12$a_{q+1}$, . . . hanging from the underside of the vibrating electrode base 12 is referred to herein as a "stepped type vibrating electrode. The term "flat" means that both the first (upper) and second (lower) major surfaces of the base 12 of the vibrating electrode are flat and parallel to each other in the non-vibrating state. As illustrated in FIGS. 2C and 2D, during vibration (voltage bias), the base 12 of the vibrating electrode is a curved surface because it bends like a drum belly. On the other hand, the multiple concentric hexagonal ring structure shown in FIG. 2A is schematically shown as an array of multiple rectangles (rectangles) in the cross-sectional view in FIG. 2B. In FIG.

2B, each of the multiple opposing convexes $11a_{p-1}$, $11a_p$, $11a_{p+1}$, . . . shown in FIG. 2A is arranged as a convex with a rectangular cross section on the opposing electrode base (second electrode base) 11. The vibrating electrode base 12 is referred to as "first electrode base 12" and the counter electrode base 11 is referred to as "second electrode base 11" in the acoustic element of the first embodiment. Furthermore, the corresponding vibrating side convex part is referred to as "first electrode side convex part" and the opposite side convex part as "second electrode side convex part," but this is merely a selection for convenience of explanation. It is also possible to choose a name in which the vibrating electrode base defined in the acoustic element of the first embodiment is referred to as the "second electrode base," the opposing electrode base is referred to as the "first electrode base," the corresponding vibrating side convex is referred to as the "second electrode side convex" and the opposing side convex as the "first electrode side convex".

As long as the cross-sectional shape of the vibrating side convex hulls $12a_{q-1}$, $12a_q$, $12a_{q+1}$, . . . is trapezoidal, the cross-sectional shape of the opposing side convex hulls $11a_{p-1}$, $11a_p$, $11a_{p+1}$, . . . can be trapezoidal as in the structure illustrated in FIG. 22(*b*). The cross-sectional shape of the opposing convexity may be trapezoidal. That is, the second step side wall of the opposing convex hull $11a_{p-1}$, $11a_p$, $11a_{p+1}$, . . . should consist of a plane inclined at the same inclination angle θ as the first step side wall. Therefore, the oblique angles of the trapezoids of the opposite side convexities $11a_{p-1}$, $11a_p$, $11a_{p+1}$, . . . should also be inclined within 45° to the vibration direction, but the inclination angle θ should be smaller, as shown by Equations (12a), (12b) and (13) etc. If the inclination angle θ of the first step side wall is inclined within 10° to the vibration direction, the inclination angle θ of the second step side wall should also be inclined within 10° to the vibration direction. If the first and second step side walls are inclined more than 45° to the vibration direction, the density of nested intersections between the step-type vibration electrode and the step-type counter electrode becomes low, resulting in a decrease in area efficiency and a decrease in the effect of capacity increase. However, if the reduction in area efficiency is not a problem, an inclination angle θ exceeding 45° is acceptable. As shown in FIG. 2A, the case where the tilt angle θ is 0° relative to the vibration direction has the highest area efficiency and is expected to have the greatest effect of increasing capacitance.

Figure 16:
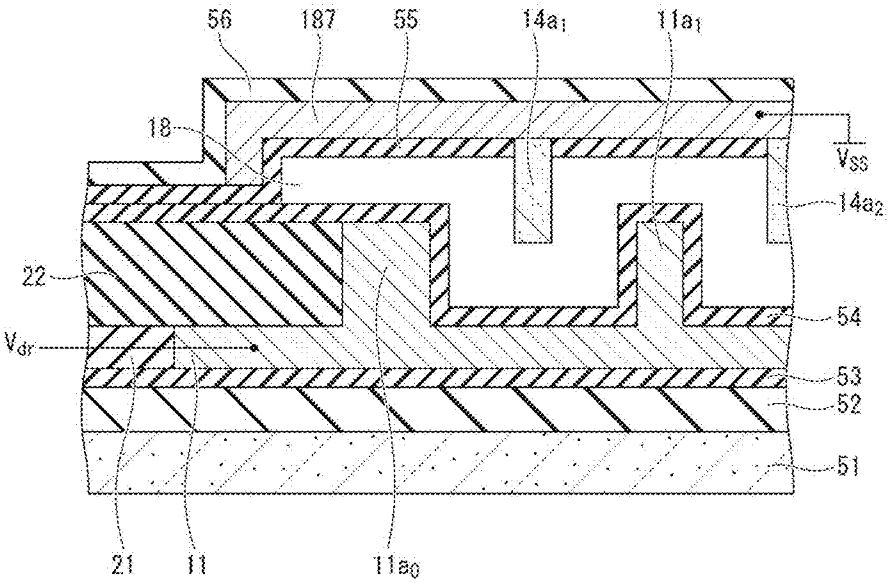
FIG. 16 is a schematic cross-sectional view illustrating a schematic of the acoustic element according to the third embodiment of the present disclosure, focusing on the structure of the peripheral side of the vibrating cavity.

The integral structure of a planar counter electrode base 11 having a flat main surface and a plurality of opposing side convex portions $11a_{p-1}$, $11a_p$, $11a_{p+1}$, . . . on this counter electrode base 11 is referred to herein as a "stepped counter electrode". For the counter electrode base 11, "flat" also means a structure in which both the first (upper) and second (lower) major surfaces of the counter electrode base 11 are flat and parallel to each other, as is the case with the vibrating electrode base 12. The counter electrode base 11 is composed of a conductive material such as metal. The opposing side convexes $11a_{p-1}$, $11a_p$, $11a_{p+1}$, . . . are also low specific resistance conductors, whether dielectric or non-dielectric, with specific resistance ρ=3 Ω·cm or less, and can be used as the structure of the acoustic element in the first embodiment. More generally, the opposite side convex part can be a dielectric with specific resistance ρ≈∞. For example, as shown in FIG. 16, etc., below, the opposing convex hulls $11a_{p-1}$, $11a_p$, $11a_{p+1}$, . . . can be composed of a semiconductor material with low specific resistance p that functions as a dielectric. As mentioned above, the present disclosure defines an "electrode" as a portion to which positive and negative charges are induced on the surfaces of opposing areas of different potentials so as to constitute a capacitor, respectively. Therefore, if a convex region of the same potential electrically connected to the opposite electrode base 11 and a true charge is induced on the surface of the convex region by Gauss's law, the convex region, the "opposite convex region" can be defined as a part of the electrode, even if the surface is a dielectric or other material.

Although it does not show as large a deflection as the vibrating electrode base 12 illustrated in FIGS. 2C and 2D, the counter electrode base 11 also deflects toward the vibrating electrode base 12 in the opposite direction of the deflection of the vibrating electrode base 12, so strictly speaking, it is also a flat plate shape when not vibrating with respect to the counter electrode base 11. If we focus on the representation on the cross-sectional view in FIG. 2B, the plurality of opposing side convex portions $11a_{p-1}$, $11a_p$, $11a_{p+1}$, . . . that constitute the stepped counter electrode and the plurality of vibrating side convex portions $12a_{q-1}$, $12a_q$, $12a_{q+1}$, . . . are opposed to each other in such a way that a crossed finger structure (nested structure) is possible, and the respective first stepped sidewalls and the corresponding respective second stepped sidewalls constitute a plurality of parallel plate capacitors to increase the capacitance.

The counter electrode base 11 is disposed on top of the counter electrode support layer 25, of which at least the top layer is an insulator, as shown in FIG. 2B. On the other hand, a protective film 56 on the top surface of the vibrating electrode base 12, which is made of an insulator, is placed over the vibrating electrode base 12. The cavity side wall 23 is arranged to enclose the space sandwiched between the vibrating electrode base 12 and the counter electrode base 11, defining a vibration cavity. That is, the vibration cavity is a sealed space surrounded by the counter electrode base 11, the vibrating electrode base 12, and the cavity side wall 23. The acoustic element of the first embodiment is a capacitive acoustic element in which an electric signal is applied between the counter electrode base 11 and the vibrating electrode base 12 inside the vibrating cavity shown in FIG. 2B. That is, ultrasonic signals can be transmitted by applying an electric signal between the counter electrode base 11 and the vibrating electrode base 12 to cause the vibrating electrode base 12 to flex inside the vibrating cavity.

As mentioned above, FIGS. 2A and 2B are schematic diagrams to make the structure easier to understand, so the opposing side convexities $11a_{p-1}$, $11a_p$, $11a_{p+1}$, . . . shown as 13 rectangles on the cross-sectional view and the vibrating side convexities $12a_{q-1}$, $12a_q$, $12a_{q+1}$, and . . . are shown as simplified structures with a reduced number of pieces. The central opposing convexity among the 13 opposing convexities $11a_{p-1}$, $11a_p$, $11a_{p+1}$, . . . on the cross-sectional view is hexagonal prismatic, as can be seen from the plan view in FIG. 2A. As shown in FIG. 2A, the opposing side convex portions $11a_{p-1}$, $11a_p$, $11a_{p+1}$, . . . indicated by the remaining twelve rectangles on the cross section are six wall like opposing side convex portions $11a_{p-1}$, $11a_p$, $11a_{p+1}$, . . . which form a multiple concentric hexagonal ring surrounding the central opposing convex portion. In other words, the opposing convexities $11a_{p-1}$, $11a_p$, $11a_{p+1}$, . . . represented as 13 rectangles on FIG. 2B are cross sections of six concentric hexagonal rings connected at the back of the paper and one hexagonal column in the center.

On the other hand, the 12 oscillating side convexities $12a_{q-1}$, $12a_q$, $12a_{q+1}$, . . . , shown as 12 rectangles on the cross-sectional view, are shown in the plan view in FIG. 2A between the convexities of the opposing side convexities $11a_{p-1}$, $11a_p$, $11a_{p+1}$, . . . . It can be seen that the ring is a multiple concentric hexagonal ring with six wall-like pieces with vertical side walls that have a thickness that allows insertion into the recesses. The nested structure is formed by the insertion of the vibrating side convexes $12a_{q-1}$, $12a_q$, $12a_{q+1}$, . . . between each of the opposing side convexes $11a_{p-1}$, $11a_p$, $11a_{p+1}$, . . . . In practice, the number of opposing side convex hulls $11a_{p-1}$, $11a_p$, $11a_{p+1}$, . . . and vibrating side convex hulls $12a_{q-1}$, $12a_q$, $12a_{q+1}$, . . . can be far more numerous than the numbers illustrated in FIGS. 2A and 2*b*, as described above. As described above, 151 opposing convexities $11a_{p-1}$, $11a_p$, $11a_{p+1}$, . . . and 150 vibrating convexities $12a_{q-1}$, $12a_q$, $12a_{q+1}$, . . . can be arranged alternately with a gap of 20 nm. It is possible to The acoustic element of the first embodiment transmits ultrasonic signals by applying an electric signal between the counter electrode base 11 and the vibrating electrode base 12 to flex the vibrating electrode base 12 in a capacitive type configuration as shown in FIG. 2B. FIG. 2C shows schematically the deflection of the vibrating electrode base 12 and the vibrating side convex part $12a_{q-1}$, $12a_q$, $12a_{q+1}$, . . . made of conductive material on the surface of the vibrating electrode base 12 during vibration. As already explained, in practice, in a regular hexagon with a length of 120 μm between opposing sides, for example, with a pitch of 400 nm, the opposing side convexities $11a_{p-1}$, $11a_p$, $11a_{p+1}$, . . . made of conductors and the vibrating side convexities $12a_{q-1}$, $12a_q$, $12a_{q+1}$, 12*a* . . . are nested alternately with a gap of 20 nm to form about 150 concavo-convex pairs. However, in FIG. 2C, the actual structure is thinned down to about 1/10 to represent 15 concavo-convex pairs, and the deflection of the vibrating electrode base 12 and the vibrating side convex $12a_{q-1}$, $12a_q$, $12a_{q+1}$, . . . during vibration is shown in its image in a simplified schematic manner. The unit of displacement shown on the vertical axis of FIG. 2C is nm, whereas the unit of position coordinates shown on the horizontal axis of FIG. 2C is μm. Therefore, it should be noted that the ratio of vertical to horizontal in FIG. 2C differs by a factor of about 100, and the amount of displacement on the vertical axis is more exaggerated than the actual ratio. For example, when the aspect ratio is 1:1, the vibration-side convexity of the periphery is tilted outward by about 7 to 8°, but with the aspect ratio shown in FIG. 2C, the outward tilt is not visible.

As can be seen from FIG. 2C, the displacement during vibration of the vibrating electrode base 12 is large in the center of the vibrating cavity and small in the periphery. Therefore, in FIG. 2C, the opposing side convexes $11a_{p-1}$, $11a_p$, $11a_{p+1}$, . . . and the vibrating side convexes $12a_{q-1}$, $12a_q$. $12a_{q+1}$, . . . intersect in the center of the vibrating cavity, but do not intersect in the peripheral area. The case in which they do not intersect at the periphery is illustrated. The example structure in FIG. 2C is a case where the height of the opposite side convex hilts $11a_{p-1}$, $11a_p$, $11a_{p+1}$, . . . and the vibration side convex hilts $12a_{q+1}$, $12a_q$, $12a_{q+1}$, . . . are set as low as 150 nm, so the periphery is not crossed. However, by increasing the height of the opposite side convex hilts $11a_{p-1}$, $11a_p$, $11a_{p+1}$, . . . and the vibration side convex hilts $12a_{q-1}$, $12a_q$, $12a_{q+1}$, . . . to 300 nm or more, respectively. crossing at the periphery becomes This is possible. FIG. 2D shows an enlarged view of a partial IID of the intersection circled in FIG. 2C. In FIG. 2D, opposing side convexities $11a_{d-1}$, 11*a*, . . . and oscillating side convexities $12a_{u-1}$, $12a_u$, $12a_{u+1}$, . . . intersect and between their respective first and opposing second step sidewalls, the transverse capacitor $C_{udh}$ is configured to increase the capacitor capacitance $C_{udh}$. The transverse capacitor $C_{udh}$ means that the electric lines of force extend in the horizontal direction. Furthermore, FIG. 2D shows that a diagonal capacitor $C_{uds}$ is formed between the top of the vibrating side convexity $12a_{u-1}$ and the side wall of the opposite side convexity $11a_{d-1}$, and a diagonal capacitor $C_{uds}$ is formed between the top of the vibrating side convexity $12a_{u+1}$ and the side wall of the opposite side convexity $11a_d$. It is also shown schematically that an oblique capacitor $C_{uds}$ is also formed between the top of the opposing convexity $11a_{d-1}$ and the sidewall of the vibrating convexity $12a_u$, and between the top of the opposing convexity $11a_d$ and the sidewall of the vibrating convexity $12a_u$, increasing the capacitance $C_{uds}$. The oblique direction capacitor $C_{uds}$ means that the electric lines of force extend in the oblique direction.

FIG. 2E shows the cross-sectional structure of the acoustic element of the first embodiment focusing on the peripheral side structure of the vibrating cavity. That is, the outermost first vibration side convex part $12a_1$ is inserted between the recesses constituted by the outermost opposite side stepped side wall part $11a_0$ and the first opposite side convex part $11a_1$. which is the side wall structure, and the second vibration side convex part $12a_2$ is inserted into the recess on the inner circumference of the first opposite side convex part $11a_1$, increasing the capacitance of the longitudinal capacitors $C_{udv1}$, $C_{udv2}$ and the lateral capacitor $C_{udh}$ The following is an example of the increase in the capacitance of the capacitors. That is, the surfaces of the opposing side step side wall $11a_0$ and the first opposing side convexity $11a_1$, as well as the surfaces of the first vibrating side convexity $12a_1$ and the second vibrating side convexity $12a_2$, induce true charges that are the starting and ending points of the lines of electric force of the vibrating cavity 18 according to Gauss' law to constitute longitudinal capacitors $C_{udv1}$, $C_{udv2}$ and transverse capacitor $C_{udh}$ The longitudinal capacitors C The longitudinal capacitors $C_{udv1}$, $C_{udv2}$ mean that the electric lines of force extend in the direction normal to the principal surfaces of the first electrode base (vibrating electrode base) 12 and the second electrode base (opposing electrode base) 11, and the longitudinal capacitors $C_{udv1}$, $C_{udv2}$ are hereafter referred to herein as "normal direction capacitors". On the other hand, the transverse direction capacitor $C_{udh}$ means that the lines of electric force extend in a direction perpendicular to the lines of electric force extending in the direction normal to the main surfaces of the first and second electrode bases. In this specification, a capacitor that relies at least in part on electrical force lines inclined from the direction normal to the principal surfaces of the first electrode base (vibrating electrode base) 12 and second electrode base (opposing electrode base) 11 is hereinafter referred to as a "non-normal direction capacitor. The situation differs from that of the periphery of the structure shown in FIG. 2C, but the conditions for setting the spacing and intersection of the opposing stepped side wall $11a_0$ and the first opposing side convexity $11a_1$ and the first vibrating side convexity $12a_1$ as initial settings at the manufacturing process stage. In the structure shown in FIG. 2C, the stepped vibrating electrode and the stepped counter electrode do not intersect nestedly at the periphery. However, FIG. 2E shows that the area contributing to the normal direction capacitance $C_{udv1}$, $C_{udv2}$ and the non-normal direction capacitance $C_{udh}$ increases even without nested intersections if each of the stepped vibration electrode and the stepped counter electrode has a stepped structure. That is, in the acoustic element of the first embodiment, it is not necessary that all the step-type vibrating electrodes and step-type counter electrodes intersect in a nested manner, but only that at least some of them intersect in a nested manner.

The counter electrode support layer 25 shown in FIG. 2B is composed of a device substrate 51, such as a silicon substrate, a substrate insulating film 52, such as a silicon oxide film ($SiO_2$ film) on the device substrate 51, and a protective film 53 for the bottom surface of the counter electrode, such as a silicon nitride film ($Si_3N_4$ film) on the insulating film 52. The counter electrode base 11 is placed on the protective film 53 for the bottom surface of the counter electrode. When the vibrating electrode base 12 is set to the ground potential $V_{ss}$=0 V and the drive potential $V_{dr}$ is applied to the counter electrode base 11, the first step sidewall of the step type vibrating electrode (12; 12$a_{q-1}$, 12$a_q$, 12$a_{q+1}$, . . . ) and the step type counter electrode (11; 11$a_{p-1}$, 11$a_p$, 11$a_{p+1}$, 11$a$ The facing area defined between the two vertical sidewalls of the second stepped sidewall of ( . . . ) varies with the drive potential $V_{dr}$. The drive potential $V_{dr}$ can be, for example, $V_{dr}$=30 V or higher. The counter electrode base 11 can be composed of a conductor such as tungsten (W). The opposing side step side wall portion 11$a_0$ and the first opposing side convex portion 11$a_1$, which are disposed above the counter electrode base 11 and constitute a structure protruding upwardly from the counter electrode base 11, can also be composed of a metal such as W.

As illustrated in FIG. 2E, the surface on the vibration cavity 18 side of the opposing side stepped side wall 11$a_0$ and the surface of the first opposing side convex portion 11$a_1$, as well as the top surface of the opposing electrode base 11 at the point where the opposing side stepped side wall 11$a_0$ and the first opposing side convex portion 11$a_1$ are not located, are covered with the opposing side dielectric layer 54 consisting of a dielectric film such as silicon nitride film The top surface of the opposite side dielectric layer 54 is covered with a dielectric film such as silicon nitride film. Similarly, the surfaces of the first vibration-side convex part 12$a_1$ and the second vibration-side convex part 12$a_2$, as well as the underside of the vibration electrode base 12 at the points where the first vibration-side convex part 12$a_1$ and the second vibration-side convex part 12$a_2$ are not located, are covered by a vibration-side dielectric layer 55 made of a dielectric film such as a silicon nitride film. The opposite side dielectric layer 54 and the vibration side dielectric layer 55 can be made of thin films of various high dielectrics, ferroelectrics, paraelectrics, etc., as described in the latter part of the explanation of the basic concept at the beginning of this document. A protective film 56 on the top surface of the vibrating electrode, such as a silicon oxide film, for example, is placed on the base 12 of the vibrating electrode. It has already been explained that the vibrating side convex portions 12$a_{q-1}$, 12$a_q$, 12$a_{q+1}$, . . . and the opposite side convex portions 11$a_{p-1}$, 11$a_p$, 11$a_{p+1}$, . . . can be composed of conductive materials such as metals and dielectrics with low specific resistance ρ.

In particular, when the vibrating side convex portions 12$a_{q-1}$, 12$a_q$, 12$a_{q+1}$, . . . and the opposing side convex portions 11$a_{p-1}$, 11$a$, 11$a_{pp+1}$, . . . are made of metal, the vibrating side convex portions 12$a_{q-1}$, 12$a_q$, 12$a_{q+1}$, and The surface of . . . should be coated with a vibrating side dielectric layer 55, and the surface of the opposite side convex part 11$a_{p-1}$, 11$a_p$, 11$a_{p+1}$, . . . should be coated with an opposite side dielectric layer 54. The surface of the opposite side dielectric layer 54 should be coated with the opposite side dielectric layer 54. Without coating by the vibrating side dielectric layer 55 or the opposing side dielectric layer 54, the bare metal vibrating side convex part 12$a_{q+1}$, 12$a_q$, 12$a_{q+1}$, . . . and the metal opposing side convex part 11$a_{p-1}$, 11$a_p$, 11$a_{p+1}$, . . . . This is because they contact each other and the metals electrically short-circuit each other.

Furthermore, the opposing dielectric layer 54 and the vibrating side dielectric layer 55 also have the effect of increasing the capacitance. Therefore, the thickness of the portions of the opposing dielectric layer 54 and the vibrating side dielectric layer 55 located on the sidewalls of the vibrating side convex part 12$a_{q-1}$, 12$a_q$, 12$a_{q+1}$, . . . and the width of the opposing convex part 11$a_{p-1}$, 11$a_p$, 11$a_{p+1}$, . . . . (See the width of convexity $x_0$ defined in FIG. 22(*a*). It may be thicker relative to the The cavity sidewall 23 shown in FIG. 2B is composed of a composite structure of a sidewall insulating film base layer 21 such as a silicon oxide film and a sidewall insulating film 22 such as a silicon oxide film deposited on the sidewall insulating film base layer 21 in the example structure of FIG. 2E. The sidewall insulating film base layer 21 is deposited on the top surface of the underlying insulating film 52 in such a manner as to embed the opposite electrode base 11, and the sidewall insulating film 22 is deposited on the sidewall insulating film base layer 21 including the top surface of the edge of the opposite electrode base 11.

=Method of Manufacturing Acoustic Elements in Accordance with the First Embodiment=

The manufacturing method of an acoustic element in accordance with the first embodiment of the present disclosure is described below with reference to FIGS. 6A through 6H. First, as shown in FIG. 6A, a film formation method such as the chemical vapor deposition (CVD) method is used to form a base insulating film 52 such as a silicon oxide film over the entire surface at a thickness of about 100 nm on an element substrate 51 such as a single-crystal silicon substrate, for example. Then, using a CVD method or the like, a protective film 53 on the entire surface of the lower surface of the opposite electrode, such as a silicon nitride film, is formed on top of the base insulating film 52 at a thickness of about 50 nm. Also, using a CVD method or the like, form a sidewall insulating film base layer 21, such as a silicon oxide film, over the entire surface at a thickness of about 100 nm on top of the protective film 53 for the lower surface of the opposite electrode.

Then, a first photoresist film is spin-coated over the entire surface of the sidewall insulating film base layer 21, and using photolithography technology, the first photoresist film is exposed and developed to open a pattern of grooves for the first damascene that embeds the opposite electrode base 11. Using the pattern of the first photoresist film as an etching mask, the groove section for the first damascene is formed by selectively etching the sidewall insulating film base layer 21 using dry etching techniques such as reactive ion etching (RIE) until the top surface of the protective film 53 on the bottom surface of the opposite electrode is exposed. If the protective film 53 on the lower surface of the opposite electrode is a silicon nitride film and the sidewall insulating film base layer 21 is a silicon oxide film, the protective film 53 on the lower surface of the opposite electrode functions as an etch stop layer.

Then, after forming a first conductive film such as W by a film forming method such as the CVD method to embed the first damascene groove section, a film polishing method such as the chemical mechanical polishing (CMP) method is used to flatten the film until the top surface of the sidewall insulating film base layer 21 is exposed, and the first conductive film is embedded inside the groove section for the first damascene The first conductive film is embedded inside the first damascene groove. The first conductive film embedded inside the first damascene groove section becomes a flat opposite electrode base 11 having a flat main surface.

Next, a sidewall insulating film 22, such as a silicon oxide film, is formed over the entire surface of the sidewall insulating film base layer 21 and the counter electrode base 11 using a CVD method or the like, with a thickness of about 250 to 900 nm. Then, a second photoresist film is spin-coated over the entire surface on the sidewall insulating film 22. and using photolithography technology, the second photoresist film is exposed and developed to open a pattern of grooves for the second damascene that embeds the pattern of the opposing side convex part as illustrated in gray in the planar pattern in FIG. 6C The pattern of the second photoresist film is formed by exposure and development. Using the pattern of the second photoresist film as an etching mask, selectively etch the sidewall insulating film 22 using a dry etching technique such as RIE until the top surface of the opposite electrode base 11 is exposed, forming the second damascene groove portion as illustrated in gray in FIG. 6C. The counter electrode base 11 serves as the etch stop layer.

Then, a second conductive film such as W is formed by a film forming method such as CVD method to fill the second damascene groove. The same conductive material may be used for the first conductive film and the second conductive film. The film is then planarized using a film polishing method such as the CMP method until the top surface of the sidewall insulating film 22 is exposed, and the second conductive film is embedded inside the second damascene groove, as illustrated in FIG. 6B, which shows a partial cross-sectional structure. The second conductive film embedded inside the second damascene groove section becomes the first layer of hexagonal rings, the first opposing side convexity 11$a_1$, on the inner circumference from the opposing side stepped side wall 11$a_0$ and opposing side stepped side wall 11$a_0$, which constitute the outermost side wall structure, if we focus on the cross-sectional structure of the peripheral area shown in FIG. 6B.

In fact, as the planar pattern is shown in FIG. 6C, the pattern of opposing convexes 11$a_{p-1}$, 11$a_p$, 11$a_{p+1}$, . . . is periodically and repeatedly connected to form multiple concentric hexagonal rings on a flat counter electrode base 11 with a flat main surface, and a stepped counter electrode structure is configured. In FIG. 6C, it should be noted that the patterns of the opposing convex hulls 11$a_{p-1}$, 11$a_p$, 11$a_{p+1}$, . . . are not continuous complete hexagonal rings, but intermittent hexagonal rings with breaks (notches). That is, the notches in the planar pattern of the hexagonal rings of each of the opposing convexities 11$a_{p-1}$, 11$a_p$, 11$a_{p+1}$, . . . are radially continuous and constitute three corrosion medium flow paths (canals). In FIG. 6C, the three corrosion medium flow paths (canals) 151, 152, 153 are represented schematically with two dotted lines, but the figure does not imply that there is a difference between the pattern of the void and the pattern of the canal of the opposing convexities 11$a_{p-1}$, 11$a_p$, 11$a_{p+1}$, . . . . The "corrosion medium flow path" is a medium path through which etchant (corrosion medium) is introduced in the process of removing the sacrificial film, which is described later. Therefore, when the corrosion medium is a liquid, in a micro-integrated structure where the opposite side convex hulls 11$a_{p-1}$, 11$a_p$, 11$a_{p+1}$, . . . consist of about 150 channels with a pitch of 400 nm, the number of corrosion medium flow paths (canals) 151, 152, 153 In such a case, the canals are formed radially in a spider web shape. If the corrosive medium is gas, the corrosive medium flow paths 151, 152, 153 can be omitted.

Furthermore, a third photoresist film is spin-coated over the entire surface of the sidewall insulating film 22 and the opposite side convex portions 11$a_{p-1}$, 11$a_p$, 11$a_{p+1}$, . . . and, using photolithography technology, the third photoresist film is applied to the outermost opposite side stepped side wall portion 11$a$ that will become the sidewall structure$_0$ and the top surface of the sidewall insulating film 22 located on the outer periphery of the opposite side stepped sidewall 11$a$0, which is the sidewall structure, are exposed and developed to form a pattern that protects the top surface of the sidewall insulating film 22. The pattern of the third photoresist film is formed so that it also covers the canal end portions 141, 142, 143, which are peripheral portions, and the top surfaces of the corrosion medium flow paths 151, 152, 153 that are continuous through the sidewall insulating film 22 to the canal end portions 141, 142, 143 on the sidewall side. Then, using the pattern of the third photoresist film as an etching mask, the top surface of the opposite electrode base 11 is etched until the top surface of the opposite electrode base 11 is exposed, for example, by wet etching technique using an etching selectivity ratio to form the sacrificial film embedded groove portion. However, wet etching is not necessary if the etching selectivity can be guaranteed. As a result of etching using this etching selectivity ratio, the surface of the opposing convex portions 11$a_{p-1}$, 11$a_p$, 11$a_{p+1}$, . . . and the opposing electrode base 11 without the opposing convex portions 11$a_{p-1}$, 11$a_p$, 11$a_{p+1}$, . . . 1 surface is exposed. Furthermore, the surface of the counter electrode base 11 corresponding to the corrosive medium channels 151, 152, 153 shown in FIG. 6C and to the wall of the hexagonal ring at the cut points of the opposite side convexities 11$a_{p-1}$, 11$a_p$, 11$a_{p+1}$, . . . cut by the corrosive medium channels 151, 152, 153 The edge that is perpendicular (radial) is also exposed.

Then, on the sidewall insulating film 22 and the opposite side convex portions 11$a_{p-1}$, 11$a_p$, 11$a_{p+1}$, . . . , a fourth photoresist film is spin-coated over the entire surface to fill the sacrificial film embedded grooves, and a pattern to open the canal ends 141, 142, 143 shown in FIG. 6C The pattern is exposed and developed to form a pattern to open the corrosion medium flow paths (canals) 151, 152, 153, which are continuous through the sidewall insulating film 22 to the canal end portions 141, 142, 143, in the peripheral area. Then, using the pattern of the fourth photoresist film as an etching mask, the sidewall insulating film 22 is selectively etched by dry etching technology such as RIE, etc. The vertical hole-shaped (well-shaped) canal ends 141, 142, 143 and the canal ends 141, 142, 143 have horizontal U-shaped groove sections of corrosion medium flow paths 151, 152, 153 are formed that penetrate in the direction and are continuous from the sacrificial film embedded groove section side.

After this, using a CVD method or the like, the opposing side dielectric layer 54 consisting of a dielectric film such as a silicon nitride film is formed to cover the surfaces of the opposing side convex portions 11$a_{p-1}$, 11$a_p$, 11$a_{p+1}$, . . . and the opposing electrode base portion 11 exposed at the bottom of the sacrifice film embedded grooves, with a thickness of 50 The dielectric layer 54 is formed on the entire surface with a thickness of about 50 nm. The opposite side dielectric layer 54 also covers the surface of the opposite electrode base 11 corresponding to the corrosive medium channels 151, 152, 153 shown in FIG. 6C and the edges of the cut points of the opposite side convex portions 11$a_{p-1}$, 11$a_p$, 11$a_{p+1}$, . . . cut by the corrosive medium channels 151, 152, 153 covered. Furthermore, the inner walls and bottoms of the vertical hole-shaped patterns that become the canal ends 141, 142, 143, as well as the inner walls and bottoms of the U-shaped grooves of the corrosion medium channels 151, 152, 153 that are continuous from the sacrificial film embedded groove side to the canal ends 141, 142, 143 are also covered with the opposite side dielectric layer 54.

Then, using a CVD method or the like, a sacrificial film 16 made of a material film having sacrificial etchability, such as W, is formed on the entire surface through the opposing dielectric layer 54, for example, with a thickness of 20 to 100 nm, along the side profile of the sacrificial film embedded grooves, and the sacrificial film embedded grooves are filled. Sacrificial film 16 also fills the inside of canal ends 141, 142, 143, which are vertical holes (wells), and corrosion media channels 151, 152, 153, which are U-shaped groove sections continuous with corresponding canal ends 141, 142, 143, respectively. Then, a fifth photoresist film is spin-coated over the entire surface of the sacrificial film 16, and exposed and developed to selectively expose the top side position of the peripheral sidewall insulating film 22. Then, using the pattern of the fifth photoresist film as an etching mask, the sacrificial film 16 is selectively etched by dry etching technique such as RIE to expose the top surface of the opposite side dielectric layer 54 located on the top surface of the sidewall insulating film 22 of the peripheral portion. The process of exposing the top surface of the opposing dielectric layer 54 located on the top surface of the sidewall insulating film 22 of the peripheral portion allows the sacrificial film 16 to be embedded also inside the canal ends 141, 142, 143 and the corrosion medium channels 151, 152, 153 that are continuous with the corresponding canal ends 141, 142, 143, respectively. It becomes a plug.

Figure 6D:
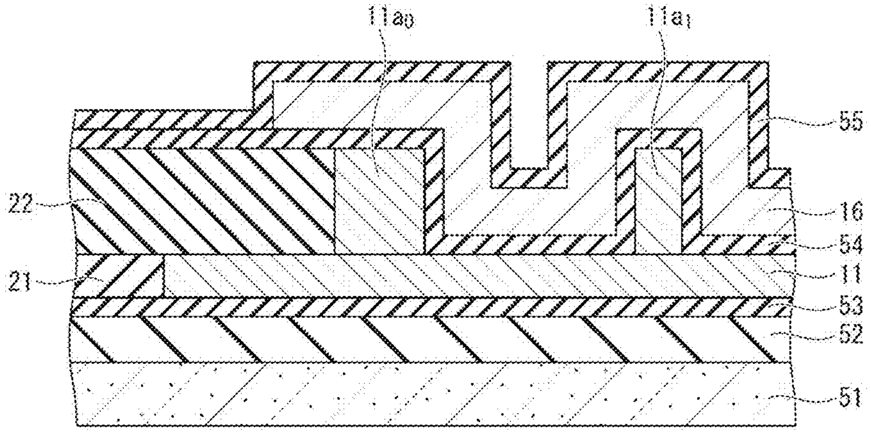
FIG. 6D is a process cross-sectional view illustrating exemplarily the method of manufacturing an acoustic element according to the first embodiment, focusing on the cross-sectional structure of the periphery of the vibrating cavity, corresponding to the cross-sectional structure of FIG. 6B (Part 3).

Furthermore, using a CVD method or the like, a vibration side dielectric layer 55 made of a dielectric film such as a silicon nitride film is formed over the entire surface with a thickness of about 50 nm on the sacrificial film 16 and the opposing side dielectric layer 54, as shown in FIG. 6D. As shown in FIG. 6D, the opposing side dielectric layer 54, the vibrating side dielectric layer 55, and the sacrificial film 16 are formed along the shape of the periodically continuous concavo-convexity of the sacrificial film embedded grooves composed of the opposing side stepped side wall 11$a_0$, the opposing electrode base 11, the first opposing side convexity 11$a_1$ and others. Therefore, the cross-sectional shape of the opposing dielectric layer 54, the vibrating side dielectric layer 55, and the sacrificial film 16 has a periodically repeating concavo-convex shape between the multiple hexagonal rings of the opposing step side wall part 11$a_0$, the first opposing side convex part 11$a_1$, etc., which constitute the step-type opposing electrode.

Figure 6E:
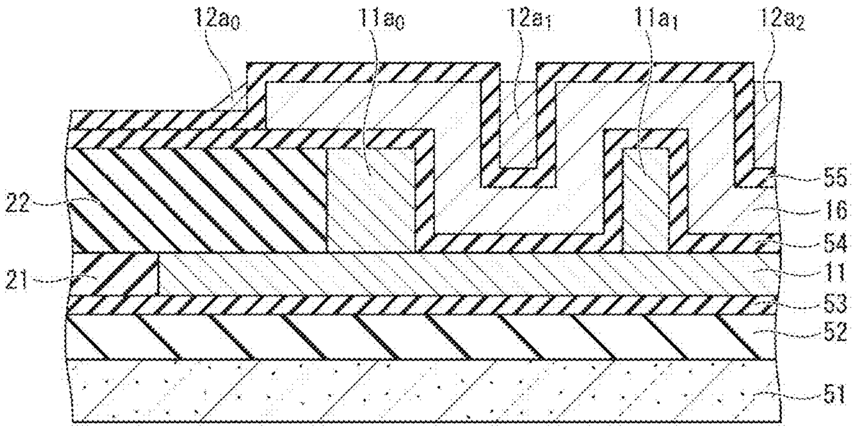
FIG. 6E is a process cross-sectional view illustrating exemplarily the manufacturing method of the acoustic element according to the first embodiment, corresponding to the cross-sectional structure of FIG. 6D (No. 4).

Next, using a CVD method or the like, a third conductive film such as a W film is formed on the entire surface of the vibrating side dielectric layer 55 with a thickness of about 100 nm so that the recesses in the vibrating side dielectric layer 55 are embedded. Then, as shown in FIG. 6E, CMP is used to completely embed the third conductive film in the recesses of the vibrating side dielectric layer 55. Alternatively, instead of CMP, a sixth photoresist film is spin-coated over the entire surface to cover the third conductive film, and exposed and developed to selectively expose the top side position of the peripheral sidewall dielectric film 22. Then, using the pattern of the sixth photoresist film as an etching mask, the third conductive film is selectively etched by dry etching techniques such as RIE to expose the top surface of the vibration side dielectric layer 55 located on the top surface of the sidewall insulating film 22 in the peripheral area. After removal of the sixth photoresist film, this third conductive film is etched back. The etchback forms the patterns of the first vibration side convex part 12$a_1$ and the second vibration side convex part 12$a_2$ as shown in FIG. 6E. The patterns of the first vibration side convex part 12$a_1$ and the second vibration side convex part 12$a_2$ are embedded in a shape that is rectangular in cross section in the recesses of the sacrificial film 16 through the vibration side dielectric layer 55 in a shape that follows the periodically repeated concave-convex shape, as shown in FIG. 6E.

FIG. 6E is a partial cross-sectional view focusing on the periphery of the vibrating cavity, so it shows a rectangular cross-section of the two outermost first vibrating side convexities 12$a_1$ and the inner second vibrating side convexity 12$a_2$. On the left side of FIG. 6E, the residue 12$a_2$ of the third conductive film buried in the corner of the step composed of the sacrificial film 16 and the vibrating side dielectric layer 55 also remains as a triangular pattern. The overall structure, as can be understood from FIG. 2, consists of a pattern of hexagonal rings that become 12$a_{q-1}$, 12$a_q$, 12$a_{q+1}$, . . . , for example, at a pitch of 400 nm, periodically, for example, as 150 repetitions. After patterning the third conductive film, a fourth conductive film such as a W film is formed on the entire surface with a thickness of about 100 nm on the vibration side dielectric layer 55 and on the first vibration side convex part 12$a_1$ and the second vibration side convex part 12$a_2$ on the inner side using a CVD method, etc. The same conductive material may be used for the third and fourth conductive films.

Then, a seventh photoresist film is spin-coated over the entire surface to cover the fourth conductive film, and exposed and developed to selectively expose the top side position of the sidewall insulating film 22 in the peripheral area. Then, using the pattern of the seventh photoresist film as an etching mask, the fourth conductive film is selectively etched by dry etching techniques such as RIE to expose the top surface of the vibration side dielectric layer 55 located on the top surface of the sidewall insulating film 22 in the peripheral area. As a result, as shown in FIG. 6F, a planar vibration electrode base 12 with a flat main surface when not in vibration is formed, connected to the top of the first vibration side convex portion 12$a_1$ and the top of the second vibration side convex portion 12$a_2$, respectively.

Figure 6F:
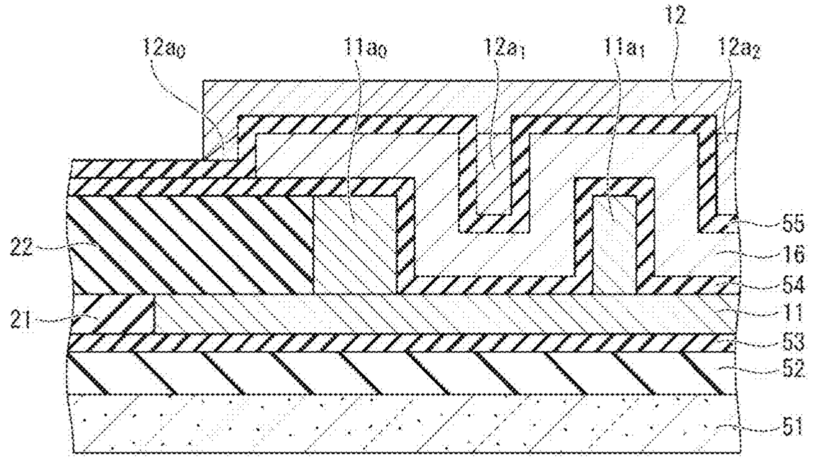
FIG. 6F is a process cross-sectional view corresponding to the cross-sectional structure of FIG. 6E and illustrating exemplarily the manufacturing method of the acoustic element of the first embodiment (No. 5).

FIG. 6F is a partial cross-sectional view focusing on the periphery of the vibrating cavity, so it shows the cross-sectional structure of the outermost first vibrating side convexity 12$a_1$ and the inner side second vibrating side convexity 12$a_2$ connected to the lower surface of the vibrating electrode base 12. The left side of FIG. 6F shows the etched edge of the fourth conductive film continuous with the residue 12$a_2$ of the third conductive film so that it constitutes a vertical side to the left of the step composed by the sacrificial film 16 and the vibrating side dielectric layer 55. The vertical sidewall of the etched edge shown on the left side of FIG. 6F, consisting of the third and fourth conductive films, constitutes the outer diameter of the regular hexagon shown in FIG. 2. As for the overall structure, as can be understood from FIG. 2, there are, for example, 150 vibration side convex portions 12$a_{q+1}$, 12$a_q$, 12$a_{q+1}$, . . . on the bottom surface of the planar vibration electrode base 12 having a flat main surface when not in vibration with a pitch of 400 nm, and opposing side convex portions 11$a_{p-1}$, 11$a_p$, 11$a_{p+1}$, and . . . are inserted between the two, each comprising a stepped vibrating electrode with a dangling structure.

Figure 6G:
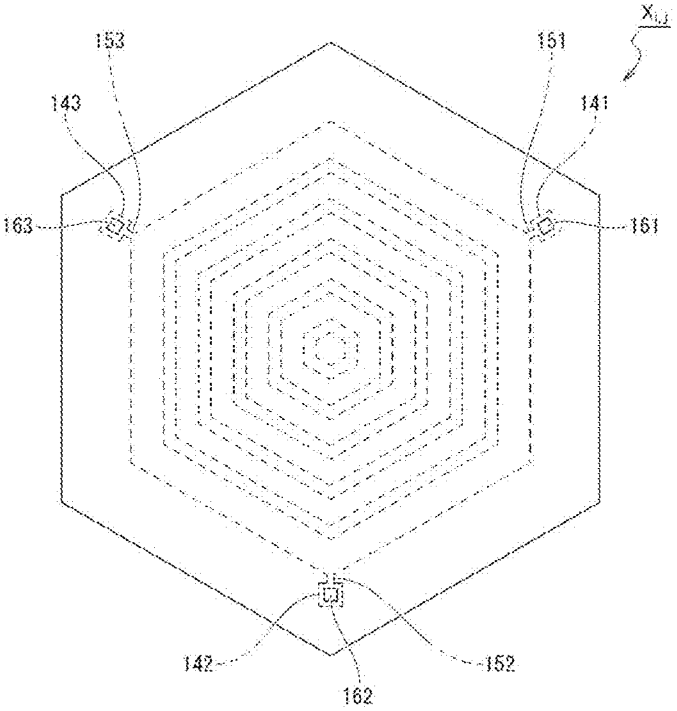
FIG. 6G is a plan view illustrating the process of mask matching the pattern of the hole for forming a cavity to the pattern of the canal end.

Next, a vibrating electrode protective film underlayer such as silicon oxide film is formed on the entire surface of the vibrating electrode with a thickness of about 50 nm on the vibrating side dielectric layer 55 and on the vibrating electrode base 12 using a CVD method or the like. Spin-coat the 8th photoresist film over the entire surface to cover the vibrating electrode protective film base layer, and expose and develop the patterns of holes 161, 162, 163 for cavity formation by mask matching the patterns of canal edges 141, 142, 143 as shown in FIG. 6G. Then, using the pattern of the 8th photoresist film as an etching mask, selective etching is performed to penetrate the vibrating electrode protective film base layer, the vibrating side dielectric layer 55, and the opposing side dielectric layer 54 by dry etching techniques such as RIE. By selective etching, holes 161, 162, 163 for forming cavities reaching the surface of the sacrificial film 16 embedded in a plug shape at the canal ends 141, 142, 143 are opened as shown in FIG. 6G.

When a corrosive medium such as hydrogen peroxide ($H_2O_2$) solution is introduced as an etchant through the cavity forming holes 161, 162, 163 shown in FIG. 6G, the corrosive medium is introduced into the corresponding corrosive medium channels 151, 152, 153 respectively via the corresponding canal ends 141, 142, 143. As a result, the sacrificial film 16, whose cross-sectional shape is shown in FIGS. 6D to 6F as a periodic uneven shape, is etched away by the corrosive medium (etchant). Once the sacrificial film 16 is etched away, a vibration cavity 18 is formed between the counter electrode base 11, drive sidewall counter electrode 11$a_0$ and first counter side convexity 11$a_1$ and the vibration electrode base 12, first vibration side convexity 12$a_1$ and second vibration side convexity 12$a_2$ as shown in FIG. 6H.

Figure 6H:
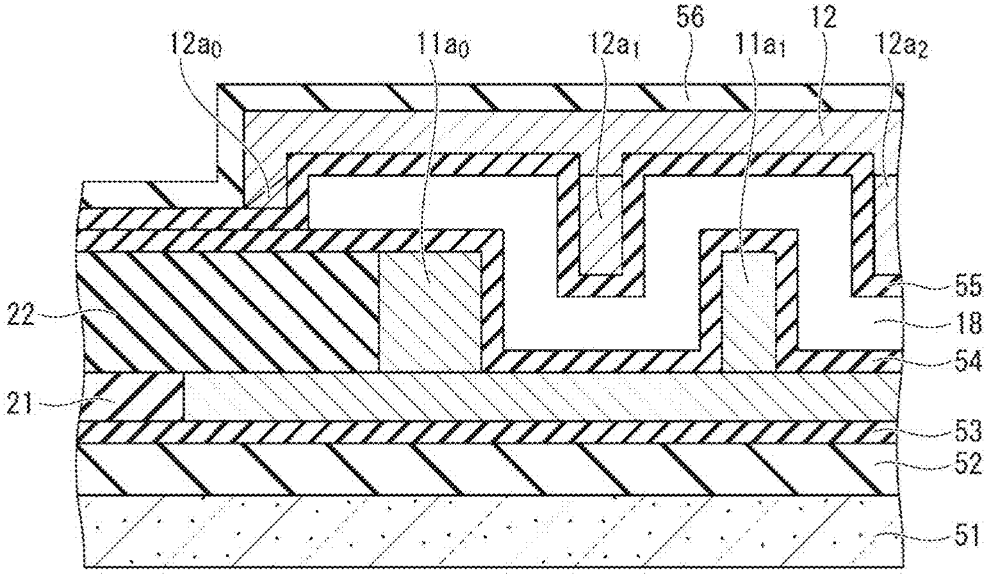
FIG. 6H is a process cross-sectional view corresponding to the cross-sectional structure of FIG. 6F and illustrating exemplarily the manufacturing method of the acoustic element of the first embodiment (Part 6).

FIG. 6H is a cross-sectional view of a portion of the vibrating cavity 18 focused on the periphery of the vibrating cavity 18, so that the vibrating cavity 18 meanders in a waveform between the first vibrating side convex part 12$a_1$ that is inserted from above against the concave space constituted by the outermost opposite side-stepped side wall part 11$a_0$ and the first opposite side convex part 11$a_1$ that is a side wall structure. Furthermore, shown on the right side of the paper in FIG. 6H, a portion of the vibrating cavity 18 that meanders in a waveform between the second vibrating side convex part 12$a_2$ that is inserted from above against the space in the recess that constitutes the inner circumference of the first opposite side convex part 11$a_1$ is illustrated. As for the overall structure, as can be understood from FIG. 2, the corresponding vibrating side convexes 12$a_{q+1}$, 12$a_q$, 12$a_{q+1}$, . . . are inserted into the concave space constituted between the adjacent opposite side convexes 11$a_{p-1}$, 11$a_p$, 11$a_{p+1}$, . . . are inserted in a nested configuration, wherein the opposite side convex part 11$a_{p-1}$, 11$a_p$, 11$a_{p+1}$, . . . and the vibrating side convex part 12$a_{q+1}$, 12$a_q$, 12$a_{q+1}$, . . . meander in a bellows-like manner between A vibration cavity 18 is formed.

When the etching medium is a liquid such as hydrogen peroxide solution, when the process of removing the sacrificial film 16 is completed, the etching medium cleaning process is performed using a cleaning solution. After the etchant cleaning process is completed, the cleaning solution is dried by isopropyl alcohol (IPA) vapor drying or other means. After drying of the cleaning solution, a main protective layer, which is the remaining part of the protective film 56 on the top surface of the vibrating electrode, is deposited over the entire surface of the film using a reduced-pressure CVD method or the like, with a thickness of about 150 to 1000 nm, on top of the vibrating electrode protective film base layer. By depositing the main protective layer on top of the vibrating electrode protective film underlayer under reduced pressure, a plug is provided at the entrance of the holes 161, 162, 163 for cavity formation, and the vibrating cavity 18 is vacuum-sealed. For example, by depositing the main protective layer by reduced-pressure CVD using He gas as the main carrier gas, with the inside of the vibrating cavity 18 in a reduced-pressure state of about 1 kPa, a plug is placed at the entrance of the holes 161, 162, 163 for forming the cavities. The composite film of the vibrating electrode protective film base layer and the main protective layer constitutes the protective film 56 on the top surface of the vibrating electrode shown in FIG. 6H, and the acoustic element of the first embodiment is completed.

In the above series of manufacturing processes, for example, assuming that the thickness of the opposing dielectric layer 54 is 50 nm, the thickness of the vibrating side dielectric layer 55 is 50 nm, the thickness of the sidewall insulating film 22 is 250 nm, and the thickness of the sacrificial film 16 is 100 nm, the vibrating side convexities 12$a_{q-1}$, 12$a_q$, 12$a_{q+1}$, . . . and the opposing side convexities 11$a_{p-1}$, 11$a_p$, 11$a_{p+1}$, . . . will have an initial intersection of 50%. However, as shown in FIGS. 3 to 5, the acoustic element with 0% initial crossing has a larger stored electrical energy and a larger transmitted acoustic energy than the acoustic element with 50% initial crossing.

To make an acoustic element with 0% initial crossing by partially using a structure based on the series of manufacturing processes described above, a second vibration cavity is further provided inside the protective film 56 on the top surface of the vibrating electrode, and a vibrating electrode suction electrode parallel and opposite to the vibrating electrode base 12 is provided at the top of the second vibration cavity and deflected upward. If the vibrating electrode base 12 at ground potential is flexed upward inside the second vibrating cavity by applying, for example, −90V to −180V to the vibrating electrode suction electrode, the vibrating side convex portions 12$a_{q-1}$, 12$a_q$, 12$a_{q+1}$, . . . can be pulled out along the vibration direction from the opposite side convexes 11$a_{p-1}$, 11$a_p$, 11$a_{p+1}$, . . . to make the initial crossing 0%, which is the initial state. Then, using this initial state as a reference, 90 V to 180 V may be applied to the counter electrode base 11. As another method, there is also a manufacturing method in which the initial crossing is set to 0% at the end of the manufacturing process. This manufacturing method is explained in the paragraph on Variations of the Second Embodiment.

Figure 7A:
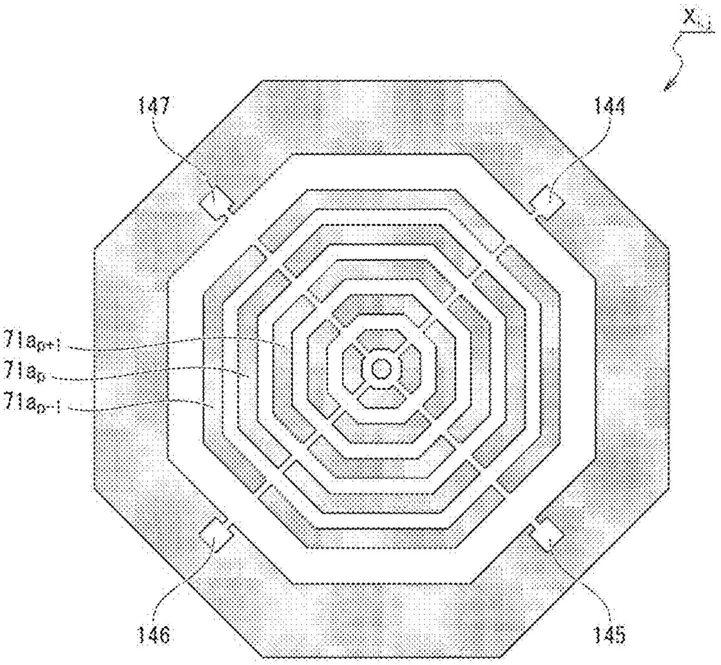
FIG. 7A is a plan view focusing on the stepped counter electrode of the acoustic element according to the first variant of the first embodiment.

It has already been mentioned that the planar pattern of the acoustic element of the first embodiment is not limited to a regular hexagon. FIG. 7A illustrates the structure of the acoustic element for the first variant of the first embodiment, which consists of multiple concentric octagonal rings on the opposite electrode side focusing on multiple opposite side convexities 71$a_{p-1}$, 71$a_p$, 71$a_{p+1}$, . . . . The corresponding cross-sectional view is omitted, but similar to the example shown in the cross-sectional view of FIG. 2B, the multiple opposing side convexities 71$a_{p-1}$, 71$a_p$, 71$a_{p+1}$, . . . each have a vertical sidewall and their cross sections are rectangular (rectangle). Although the counter electrode base is also omitted in FIG. 7A, each of the multiple concentric octagonal rings of opposing convexities 71$a_{p-1}$, 71$a_p$, 71$a_{p+1}$, and . . . is arranged as a convexity with a rectangular cross section on the counter electrode base. The step-type counter electrode is composed of an integral structure of a flat counter electrode base having a flat main surface and a plurality of opposing convexities 71$a_{p-1}$, 71$a_p$, 71$a_{p+1}$, . . . on this counter electrode base. Each of the vibrating side convex sections consisting of multiple concentric octagonal rings, which are omitted in FIG. 7A, are arranged as convex sections inserted into the inner space of the recess defined by the opposing side convex sections $71a_{p-1}$, $71a_p$, $71a_{p+1}$, . . . , such that a nested structure is possible with each other. The structure is composed of FIG. 7A is a schematic diagram in which the number of multiple concentric octagonal rings is represented by thinning out the number of concentric octagonal rings to make the structure easier to understand. If the outermost side wall structure, the opposite side-stepped side wall, is one octagonal ring, FIG. 7A shows a simplified structure with six octagonal rings surrounding one central octagonal column as a concentric octagonal ring. However, as in the case of the multiple concentric hexagonal rings shown in FIG. 2A, for example, the simplified model illustrates a structure in which 151 opposing side convexities $71a_{p-1}$, $71a_p$, $71a_{p+1}$, . . . and 150 vibrating side convexity pairs are arranged alternately, with a gap of 20 nm This is a representation.

It should be noted in FIG. 7A that the pattern of each of the opposing convexities $71a_{p+1}$, $71a_p$, $71a_{p+1}$, . . . is not a continuous complete octagonal ring but an intermittent octagonal ring with notches. That is, the notches in the planar pattern of the octagonal rings of each of the opposing convexities $71a_{p-1}$, $71a_p$, $71a_{p+1}$, . . . are radially continuous and illustrate the case of four corrosive medium flow paths. The corrosion medium flow paths are media paths that introduce etchant (corrosion medium) in the process of removing the sacrificial film and forming the vibrating cavity shown in FIG. 6H. The four corrosion medium flow paths are connected to the canal ends 144, 145, 146, and 147, which are provided as vertical hole-like (well-like) structures in the peripheral area respectively They are arranged radially in the following manner. If the corrosion medium is a gas, the corrosion medium flow paths can be omitted.

Figure 7B:
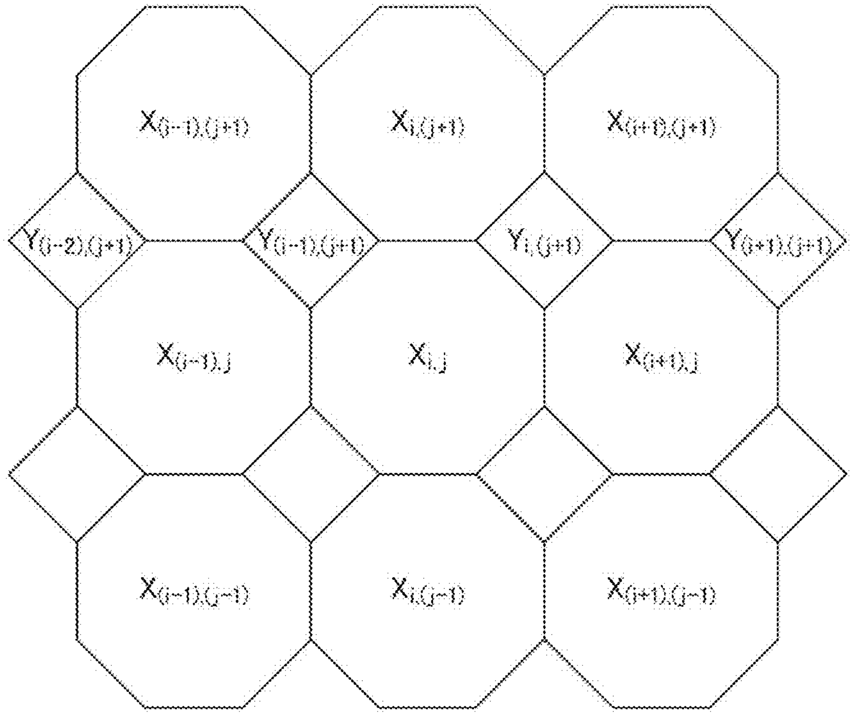
FIG. 7B is a plan view of the acoustic element integrated circuit for the first variant of the first embodiment.

When the acoustic elements for the first variant of the first embodiment, illustrated in FIG. 7A, are arranged in the element array section. as shown in FIG. 7B, a regular octagonal unit cell $X_{(i-1),(j+1)}$, $X_{i,(j+1)}$, $X_{(i+1),(j+1)}$, . . . , $X_{(i-1),j}$, $X_{i,j}$, $X_{(i+1),j}$, . . . , $X_{(i-1),(j-1)}$, $X_{i,(j-1)}$, $X_{(i+1),(j-1)}$, . . . , can be laid out. However, in the case of a regular octagon, plane filling (tessellation) is not possible on the same plane (on the same surface). That is, as shown in FIG. 7B, gaps of quadrilaterals $Y_{(i-2),(j+1)}$, $Y_{(i-1),(j+1)}$, $Y_{i,(j+1)}$, $Y_{(i+1),(j+1)}$, . . . occur between regular octagons, resulting in poor area efficiency. For example, a regular octagonal unit cell $X_{(i-1),(j+1)}$, $X_{i,(j+1)}$, $X_{(i+1),(j+1)}$, . . . , $X_{(i-1),j}$, $X_{i,j}$, $X_{(i+1),j}$, . . . , $X_{(i-1),(j-1)}$, $X_{i,(j-1)}$, $X_{(i+1),(j-1)}$, . . . as the transmitting cells, and the receiving cells are the gap squares $Y_{(i-2),(j+1)}$, $Y_{(i-1),(j+1)}$, $Y_{i,(j+1)}$, $Y_{(i+1),(j+1)}$, . . . . Conversely, a regular octagonal unit cell $X_{(i-1),(j+1)}$, $X_{i,(j+1)}$, $X_{(i+1),(j+1)}$, . . . , $X_{(i-1),j}$, $X_{i,j}$, $X_{(i+1),j}$, . . . , $X_{(i-1)(j-1)}$, $X_{i,(j-1)}$, $X_{(i+1),(j-1)}$, . . . as receiving cells, and the gap quadrangles $Y_{(i-2),(j+1)}$, $Y_{(i-1),(j+1)}$, $Y_{i,(j+1)}$, $Y_{(i+1),(j+1)}$, . . . may be used as sending cells. Although less area efficient, quadrilateral $Y_{(i-2),(j+1)}$, $Y_{(i-1),(j+1)}$, $Y_{i,(j+1)}$, $Y_{(i+1),(j+1)}$, . . . may be arranged as multiple hexagonal or multiple octagonal rings in a transmitting cell.

Figure 8A:
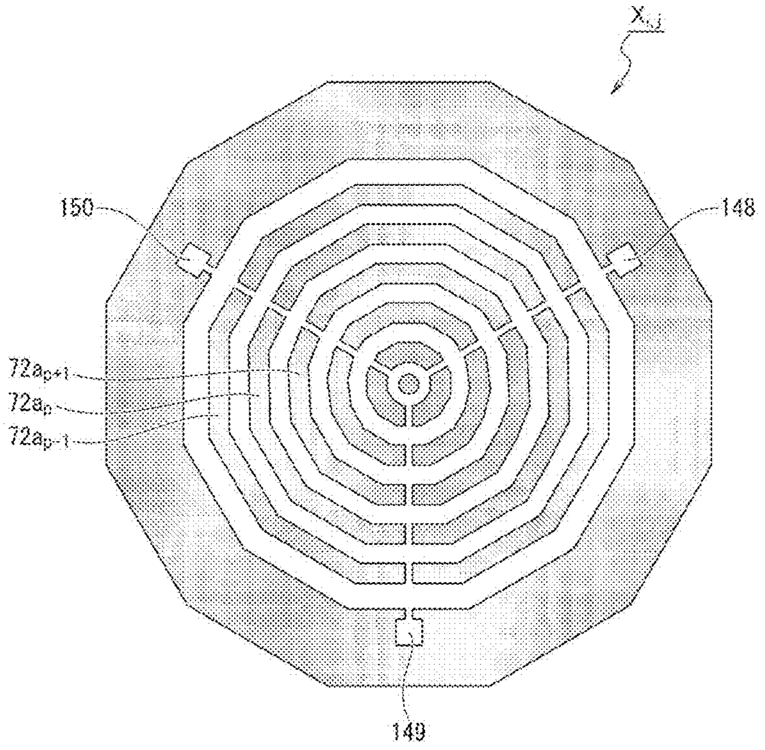
FIG. 8A is a plan view focusing on the stepped counter electrode of the acoustic element according to the second variant of the first embodiment.

FIG. 8A illustrates the structure of the acoustic element for the second variant of the first embodiment, which consists of multiple concentric dodecagonal rings on the opposing electrode side, focusing on the multiple opposing side convexities $72a_{p-1}$, $72a_p$, $72a_{p+1}$, . . . . Although the figure is omitted, similar to the example shown in the cross-sectional view in FIG. 2B, the multiple opposing side convexities $72a_{p-1}$, $72a_p$, $72a_{p+1}$, . . . each have a vertical sidewall and their cross-sections are rectangular (rectangle). Each of the plurality of opposing side convexities $72a_{p-1}$, $72a_p$, $72a_{p+1}$, . . . that form a concentric dodecagonal ring is arranged as a convexity with a rectangular cross section on the opposing electrode base, which is not shown.

As can be seen from FIG. 8A, a dodecagonal ring is almost a circle. Even if a dodecagonal ring pattern is configured at the mask level, the finished pattern after processes such as photolithography and etching is almost a circle. Therefore, regular polygons with more angles than regular dodecagons, such as concentric 15-angle rings and concentric 20-angle rings, can be approximated by circles. The step-type counter electrode is composed of a flat counter electrode base with a flat main surface and an integral structure of a plurality of counter side convex portions $72a_{p-1}$, $72a_p$, $72a_{p+1}$, . . . on this counter electrode base. Then, each of the vibration side convex portions consisting of a plurality of concentric dodecagonal rings, which are omitted from the figure, are arranged as convex portions that are inserted into the inner space of the recess defined by the opposing side convex portions $72a_{p-1}$, $72a_p$, $72a_{p+1}$, . . . , such that a nested structure is possible with each other, and a multiple concentric dodecagonal ring The structure of the ring is composed of multiple concentric dodecagonal rings such that nested structures are possible with each other.

FIG. 8A is a schematic diagram in which the number of multiple concentric dodecagonal rings is represented by thinning out the number of concentric dodecagonal rings to make the structure easier to understand. If the outermost side wall structure is one dodecagonal ring, FIG. 8A shows a simplified structure of six dodecagonal rings surrounding one central dodecagonal column as a concentric dodecagonal ring. However, as in the case of the multiple concentric hexagonal rings shown in FIG. 2A, for example, the simplified model illustrates a structure in which 151 opposing side convex $72a_{p-1}$, $72a_p$, $72a_{p+1}$, . . . and 150 vibrating side convex concave-convex pairs, with a gap of 20 nm, are arranged alternately This is a representation.

As shown in FIG. 8A, the pattern of each of the opposing convexities $72a_{p-1}$, $72a_p$, $72a_{p+1}$, . . . is not a continuous complete dodecagonal ring but an intermittent dodecagonal ring with notches. That is, the notches in the planar pattern of each of the opposing convexities $72a_{p-1}$, $72a_p$, $72a_{p+1}$, . . . are illustrated as three radially continuous corrosion medium flow paths. The three corrosion medium flow paths are each as a peripheral well-like structure They are arranged radially to be connected to the canal ends 144, 145, 146, and 147 provided. If the corrosion medium is a gas, the corrosion medium flow paths can be omitted.

Figure 8B:
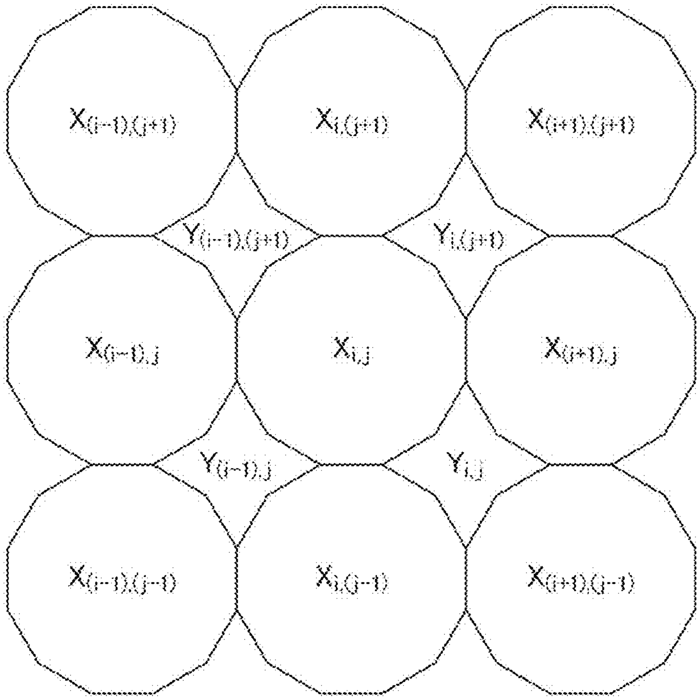
FIG. 8B is a plan view showing a schematic of an acoustic element integrated circuit according to the second variant of the first embodiment.

When the acoustic elements for the second variant of the first embodiment, illustrated in FIG. 8A, are arranged in the element array section, as shown in FIG. 8B, a regular dodecagonal unit cell $X_{(i-1),(j+1)}$, $X_{i,(j+1)}$, $X_{(i+1),(j+1)}$, . . . , $X_{(i-1),j}$, $X_{i,j}$, $X_{(i+1),j}$, . . . , $X_{(i-1),(j-1)}$, $X_{i,(j-1)}$, $X_{(i+1),(j-1)}$, . . . can be laid out. However, in the case of a regular dodecagon, plane-filling cannot be done on the same plane. That is, as shown in FIG. 8B, gaps of concave octagons $Y_{(i-1),(j+1)}$, $Y_{i,(j+1)}$, . . . , $Y_{(i-1),j}$ $Y_{i,j}$, . . . occur between regular dodecagons, resulting in poor area efficiency. For example, a regular dodecagonal unit cell $X_{(i-1),(j+1)}$, $X_{i,(j+1)}$, $X_{(i+1),(j+1)}$, . . . , $X_{(i-1),j}$, $X_{i,j}$, $X_{(i+1),j}$, . . . , $X_{(i-1),(j-1)}$, $X_{i,(j-1)}$, $X_{(i+1),(j-1)}$, . . . as transmitting cells, and $Y_{(i-1),(j+1)}$, $Y_{i,(j+1)}$, . . . , $Y_{(i-1),j}$ $Y_{i,j}$, . . . as receiving cells. Conversely, a dodecagonal unit cell $X_{(i-1),(j+1)}$, $X_{i,(j+1)}$, $X_{(i+1),(j+1)}$, . . . , $X_{(i-1),j}$, $X_{i,j}$, $X_{(i+1),j}$, . . . , $X_{(i-1),(j-1)}$, $X_{i,(j-1)}$, $X_{(i+1),(j-1)}$, . . . as receiving cells, and the concave octagons $Y_{(i-1),(j+1)}$, $Y_{i,(j+1)}$, . . . , $Y_{(i-1),j}$ $Y_{i,j}$, . . . in the gaps may be used as transmitting cells. Although less area efficient, multiple hexagonal rings, multiple octagonal rings, and multiple dodecagonal rings may be arranged within concave octagons $Y_{(i-1),(j+1)}$, $Y_{i,(j+1)}$, . . . , $Y_{(i-1),j}$, $Y_{i,j}$, . . . .

If the corrosion medium used in fabricating the vibrating cavity is a liquid, in a micro-integrated structure where the opposing convexities 11$a_{p-1}$, 11$a_p$, 11$a_{p+1}$, . . . shown in FIG. 2A consist of about 150 channels with a 400 nm pitch in a 120 μm cavity width, the number of corrosion medium flow channels (canals) 151, 152, 153 may not be sufficient. Similarly, in the case of a regular octagon as shown in FIG. 7A, four corrosive medium channels will not be sufficient, and in the case of a regular dodecagon as shown in FIG. 8A, three corrosive medium channels will not be sufficient. In this case, additional corrosive medium channels must be formed radially in a spider web shape. As the number of additional radial channels increases in the spider web shape, the facing length between the first step side wall of the step type vibrating electrode and the second step side wall of the step type counter electrode, which face each other, becomes longer, and the facing area cannot be increased. Furthermore, in the spider web-like planar pattern, the area efficiency of the spider web pattern in the basic cell $X_{ij}$ becomes poor because sharp angles are generated in the web mesh and mesh areas of halfway size are created.

Figure 9A:
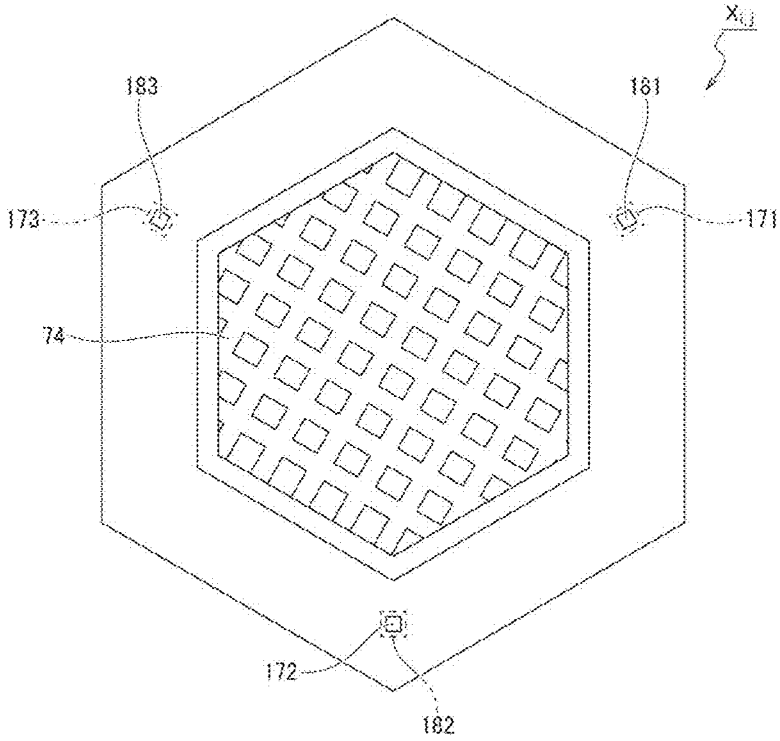
FIG. 9A is a plan view focusing on the lattice-shaped stepped vibration electrodes of the acoustic element according to the third variant of the first embodiment.
Figure 9B:
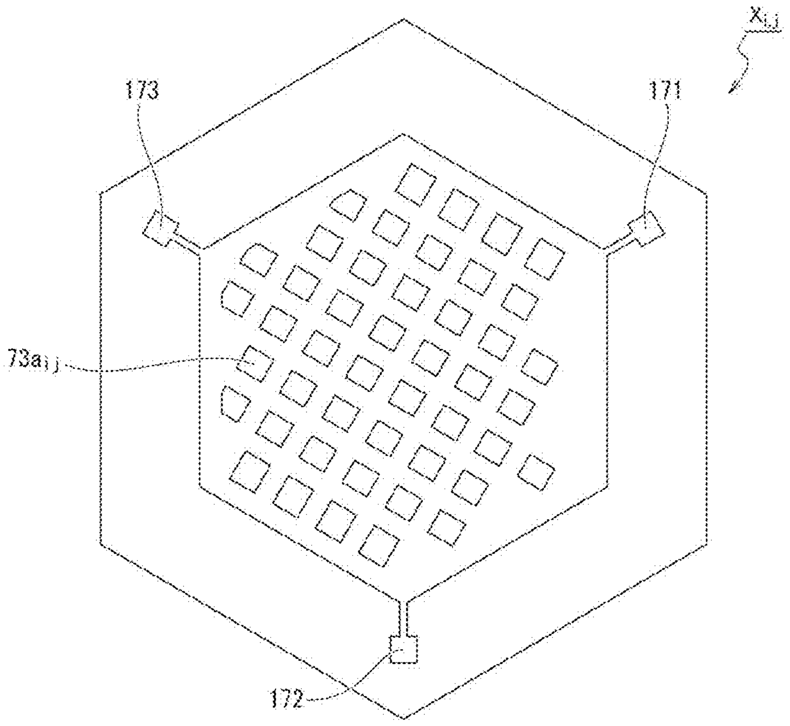
FIG. 9B is a plan view focusing on the kenzan-shaped stepped counter electrode of the acoustic element pertaining to the third variant of the first embodiment.

In the acoustic element for the third variant of the first embodiment, the downward projecting portion of the stepped vibrating electrode 74 having a lattice shape as shown in FIG. 9A and the upward projecting portion of the square column needle 74$a_{ij}$ on the opposite electrode side shown in FIG. 9B are nested and cross each other in the vertical direction. In FIG. 9B, the canal ends 171, 172, 173 are configured as vertical holes at the location of the peripheral sidewall insulation film. In FIG. 9A, holes 181, 182, 183 for forming cavities are configured at the positions of the surrounding sidewall insulating film corresponding to the positions of the canal ends 171, 172, 173, so that liquid corrosion medium can be introduced through the holes 181, 182, 183 for forming cavities. The lattice-shaped stepped vibrating electrode 74 is disposed on the underside of a flat plate vibrating electrode base having a flat main surface, which is not shown in the figure. The square prismatic needles 74$a_{ij}$ shown in FIG. 9B are arranged like a sword mountain on the counter electrode base, which is omitted from the figure, to form a stepped counter electrode. By nesting the sword-pillar 74$a_{ij}$ needles in the form of sword pillars, which constitute the step-type counter electrode, in the space formed by the recesses of the lattice on the vibrating electrode side, the facing area between the step-type counter electrode and the step-type vibrating electrode can be increased to the maximum extent. Therefore, according to the acoustic element for the third variant of the first embodiment, the transmission output of ultrasonic signals at the same drive voltage can be increased in one basic cell $X_{ij}$.

Second Embodiment

The acoustic element integrated circuit of the second embodiment of the present disclosure is similar to FIG. 1 of the first embodiment, with the element array section having regular hexagonal unit cells $X_{(i-1),(j+1)}$, $X_{i,(j+1)}$, $X_{(i+1),(j+1)}$, . . . , $X_{(i-1),j}$, $X_{i,j}$, $X_{(i+1),j}$, . . . , $X_{(i-1),(j-1)}$, $X_{i,(j-1)}$, $X_{(i+1),(j-1)}$, . . . , etc., are arranged in the same plane (on the same surface) to form a two-dimensional matrix, based on a planar layout. As illustrated exemplarily in FIG. 10, the stepped counter electrode of the acoustic element of the second embodiment consists of a plurality of counter side convexities (second electrode side convexities) 13$a_{p-1}$, 13$a_p$, 13$a_{p+1}$, . . . comprising a plurality of wall-shaped conductors forming multiple concentric hexagonal rings inside a cavity whose planar pattern is a regular hexagon . . . are arranged at a constant pitch with equally spaced gaps. However, it is an example, and it is not always essential to configure multiple concentric hexagonal rings with the same gap and constant pitch. By making the gaps and pitches of the multiple concentric hexagonal rings non-uniform, it is possible to broaden the frequency bandwidth of the acoustic element integrated circuit of the second embodiment. Therefore, the gap or pitch of the multiple concentric hexagonal rings may be varied for the purpose of widening the frequency bandwidth. Each of the multiple opposing convexities 13$a_{p-1}$, 13$a_{p+1}$, . . . has a vertical side wall, similar to the cross-sectional structure of the opposing convexity 13$a_p$ shown in FIG. 12 and the opposing stepped side wall 13$a_0$ and first opposing convexity 13$a_1$ shown in FIG. 13.

Figure 11:
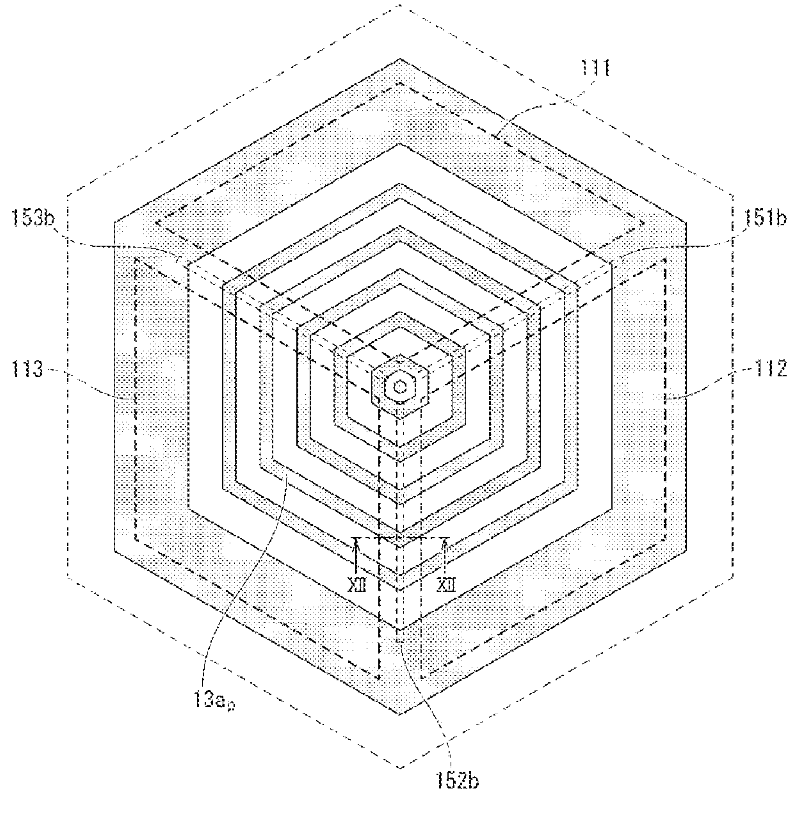
FIG. 11 is a plan view focusing on the stepped counter electrode of the acoustic element of the second embodiment, illustrating the three first counter electrode bases, the second counter electrode base, and the third counter electrode base.

As FIG. 11 shows a plan view focusing on the stepped counter electrode, each of the plurality of opposing convex portions 13$a_{p-1}$, 13$a_p$, 13$a_{p+1}$, . . . is arranged on the three-divided first counter electrode base 111. second counter electrode base 112 and third counter electrode base 113, The feature of the structure in which they are electrically connected to each other differs from the structure with a single counter electrode base 11 of the acoustic element of the first embodiment shown in FIG. 2A and FIG. 2E, etc. In the acoustic element of the second embodiment, there are three flat plate-shaped first, second, and third counter electrode bases 111, 112, and 113, which are divided into three parts and have flat main surfaces with electrically identical potentials, and a plurality of counter electrode bases 111, 112, and 113 connected to the three first, second, and third counter electrode bases 111, 112, and 113, respectively. The integral structure of a plurality of opposing convex portions 13$a_{p-1}$, 13$a_p$, 13$a_{p+1}$, . . . connected to the two opposing convex portions is called a “stepped counter electrode”.

Figure 10:
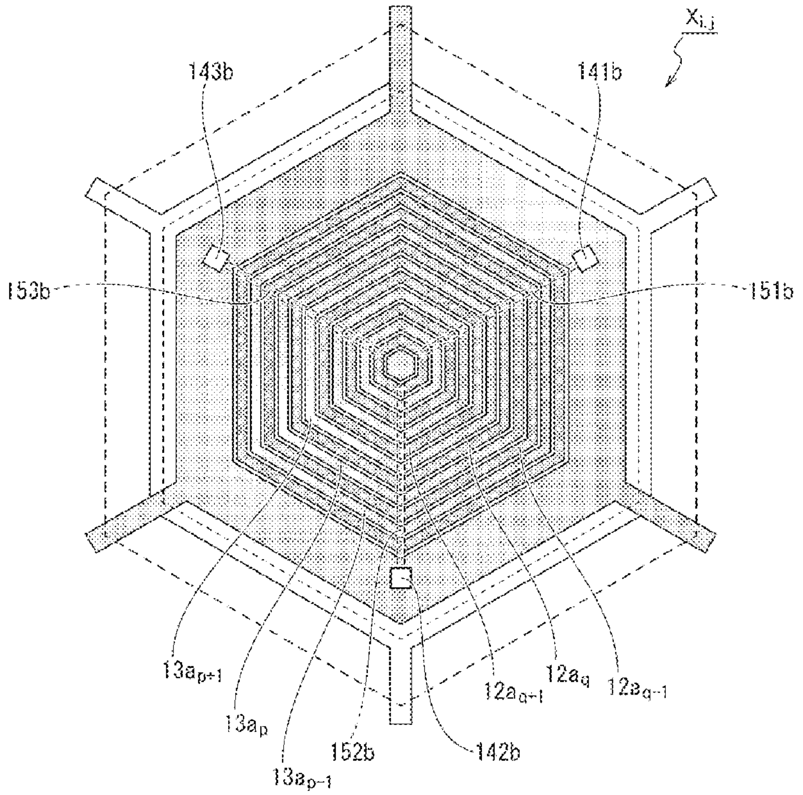
FIG. 10 is a plan view of the acoustic element of the second embodiment of the present disclosure.

However, it is not limited to three divisions, but can be divided into two or four or more other divisions. As shown in FIG. 10. a plurality of vibrating side convexes (first electrode side convexes) 12$a_{q-1}$, 12$a_q$, 12$a_{q+1}$, . . . made of multiple wall-like conductors forming another multiple concentric hexagonal ring, are sandwiched in a gap between each of a plurality of opposite side convexes 13$a_{p-1}$, 13$a_p$, 13$a_{p+1}$, . . . are arranged at a fixed pitch with equally spaced gaps and form a cross structure in cross-sectional structure with a plurality of opposite-side convex portions 13$a_{p-1}$, 13$a_p$, 13$a_{p+1}$, . . . . The structure is similar to that of the acoustic element in the first embodiment. The structure is similar to that of the acoustic element of the first embodiment. Each of the plurality of vibrating side convexities 12$a_{q-1}$, 12$a_q$, 12$a_{q+1}$, . . . also has a vertical side wall, similar to the structure shown in FIG. 12.

Figure 12:
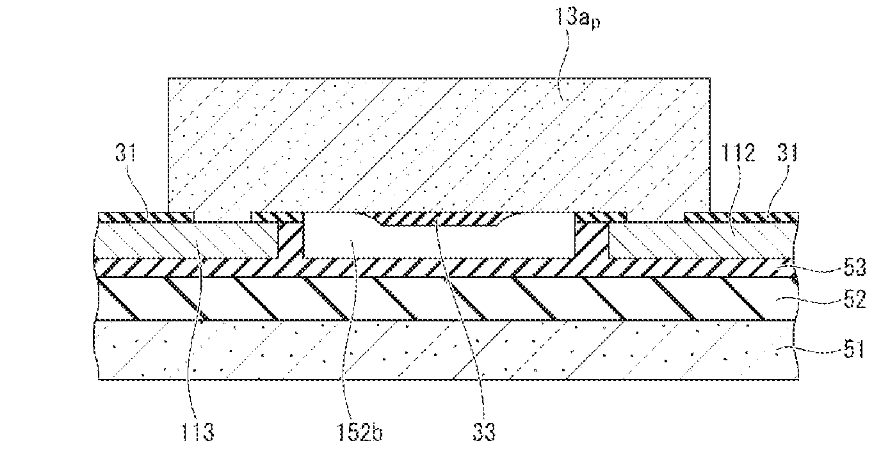
FIG. 12 is a cross-sectional view from the XII-XII direction of FIG. 11.

In the acoustic element of the first embodiment, the corrosive medium flow paths 151, 152. and 153 that introduce the corrosive medium in forming the vibration cavity were a flat roof structure configured at the same horizontal level as the multiple opposing side convexities 11$a_{p-1}$, 11$a_p$, 11$a_{p+1}$, . . . . On the other hand, in the acoustic element according to the second embodiment, it is different from the acoustic element of the first embodiment that the corrosion medium passages 151$b$, 152$b$, 153$b$ for introducing the corrosion medium, as shown in FIGS. 11 and 12, are three-dimensional structures formed in the underground pits, which are three dimensionally divided into three plate-like first opposed electrode bases 111, the second counter electrode base 112 and the third counter electrode base 113, which have a flat main surface having the same potential, and have a horizontal level.

By configuring the corrosive medium channels 151*b*, 152*b*, 153*b* in the underground pit below the vibrating cavity 18 so that the structure is three-dimensional, even when the number of corrosive medium channels 151*b*, 152*b*, 153*b* is increased and arranged in a dense spider web-like structure, the multiple opposing side convexities $13a_{p-1}$, $13a_p$, $13a_{p+1}$, and . . . and the oscillating side convexities $12a_{q-1}$, $12a_q$, $12a_{q+1}$, . . . , the reduction of the length of the opposition between the multiple hexagonal rings can be avoided. That is, even with a microstructure in which opposing side convexities $13a_{p-1}$, $13a_p$, $13a_{p+1}$, . . . and vibrating side convexities $12a_{q-1}$, $12a_q$, $12a_{q+1}$, . . . are arranged at a pitch of 400 nm in a cavity width of 120 μm, underground By increasing the number of corrosion media channels 151*b*, 152*b*, 153*b* and the cross-sectional area of the fluid paths configured in the pit, a bellows-like vibration cavity can be formed efficiently and avoiding a reduction in the facing length.

In the acoustic element according to the first embodiment shown in FIG. 2E and FIG. 6C, the opposing dielectric layer 31 covered the surface of the opposing electrode base 11 and the opposing convex portions $11a_{p-1}$, $11a_p$, $11a_{p+1}$, . . . . In contrast, in the acoustic element of the second embodiment, as shown in FIGS. 12 and 13, the opposing side convex portions $13a_{p-1}$, $13a_p$, $13a_{p+1}$, . . . are composed of a dielectric of low specific resistance, such as impurity-doped semiconductor, and the opposing side convex portions $13a_{p-1}$, $13a_p$, $13a_{p+1}$, and The fact that the surface of . . . is exposed to the interior of the vibrating cavity 18 is another feature that differs from the structure shown in FIG. 2E, etc. As mentioned above, the present disclosure defines an "electrode" as a portion of the surface of an opposing area of different potentials where, according to Gauss's law, positive charges, which are the starting point of the lines of electric force in the vibrating cavity, and negative true charges, which are the ending point of the lines of electric force in the vibrating cavity, are induced. The symbols for the normal direction capacitors $C_{udv1}$, $C_{udv2}$ and the non-normal direction capacitor $C_{udh}$ represented in FIG. 2E are omitted, but as in FIG. 2E, in the cross-sectional structure shown in FIG. 13, the surface of the opposing stepped side wall $11a_0$ and the surface of the first opposing side convex part 11*a*, and the surface of the first vibrating side convex part $12a_1$ and the The surfaces of the first vibrating side convexity $12a_2$ and the second vibrating side convexity 12*a* are induced by true charges, which are the starting and ending points of the lines of electric force of the vibrating cavity 18 according to Gauss' law, to form normal direction capacitors $C_{udv1}$, $C_{udv2}$ and non-normal direction capacitor $C_{udh}$. The normal direction capacitors $C_{udv1}$, $C_{udv2}$ mean that the lines of electric force extend in the direction normal to the principal surfaces of the first electrode base (vibrating electrode base) 12 and the second electrode base (opposing electrode base) 11. In FIG. 13, the non-normal direction capacitor $C_{udh}$ has electric force lines extending in a direction perpendicular to the electric force lines extending in the direction normal to the main surfaces of the first and second electrode bases.

That is, the surface of the low resistivity dielectric that forms the convex part of the same potential electrically connected to the first counter electrode base 111, the second counter electrode base 112, and the third counter electrode base 113 is induced a true charge by Gauss' law, so the "convex part on the opposite side" functions as a part of the electrode. As shown in FIG. 13, the surface of the third counter electrode base 113 is coated with the counter side dielectric layer 31. The vibration side convex portions $12a_{q-1}$, $12a_q$, $12a_{q+1}$, and . . . are composed of metal. In the case where the vibrating side convex part $12a_{q-1}$, $12a_q$, $12a_{q+1}$, . . . is composed of metal and the opposite side convex part $13a_{p-1}$, $13a_p$, $13a_{p+1}$, . . . is composed of a solid dielectric, the opposite side convex part $13a_{p-1}$, $13a_p$, $13a_{p+1}$, 13*a* By setting the length of . . . longer than the vibrating side convex part $12a_{q-1}$, $12a_q$, $12a_{q+}1$, . . . , the vibrating side convex part $12a_{q-1}$, $12a_q$, $12a_{q+1}$, . . . and the opposing side convexities $13a_{p-1}$, $13a_p$, $13a_{p+1}$, . . . can prevent a short circuit between the metal electrodes.

The surface of the vibrating electrode base (first electrode base) 12 is coated with a vibrating side dielectric layer 55, but even if the vibrating side dielectric layer 55 is destroyed, there is a large contact resistance between the dielectric and the metal, because the dielectric also has resistance. Therefore, the opposing side convexes $13a_{p-1}$, $13a_p$, $13a_{p+1}$, . . . made of solid dielectric can function as stoppers. Similar to the configuration described in the first embodiment, a vibration electrode side convex portion of insulating material can be provided at the center of the vibration electrode side and a counter electrode side convex portion of insulating material can be provided at the center of the counter electrode side, and the tips of the counter electrode side convex portion and the vibration electrode side convex portion can collide with each other to act as a stopper. In this case, at least one of the opposing electrode side convexity and the vibrating electrode side convexity can function as a stopper if either one of them is composed of an insulator. Also, when the vibrating side convexes $12a_{q-1}$, $12a_q$, $12a_{q+1}$, . . . are composed of metal and the opposing side convexes $13a_{p-1}$, $13a_p$, $13a_{p+1}$, . . . are composed of a solid dielectric, the length of the opposing convex near the center of the vibrating cavity with large deflection In the case where the opposite side convexity is made of solid dielectric, it can function as a stopper even if only the length of the opposite side convexity is locally set longer than the vibrating side convexity.

FIG. 12 corresponds to a partial cross-sectional view along a direction orthogonal to the corrosion medium flow path 152*b* (XII-XII direction in FIG. 11). The structure of the partial cross-section shown in FIG. 12 is based on a three-layer structure in which a base insulating film 52 such as a silicon oxide film is deposited on a device substrate 51 such as a single crystal silicon substrate, and a protective film 53 such as a silicon nitride film is deposited on the base insulating film 52. The protective film 53 on the bottom surface of the counter electrode, the top layer of the three-layer structure The second counter electrode base 112 and the third counter electrode base 113, which are two of the three segmented electrodes, are spaced apart and embedded on both sides of the As can be seen from the plan view in FIG. 11, the corrosive medium flow path 152*b* flows perpendicular to the paper surface in FIG. 12 between the second counter electrode base 112 and the third counter electrode base 113. The opposing dielectric layer 31 covers the separately formed second counter electrode base 112 and third counter electrode base 113. The opposing side convex portion $13a_p$ is bridged over the second opposing electrode base 112 and the third opposing electrode base 113 on both sides through this opposing side dielectric layer 31. Through contact holes in the opposing side dielectric layer 31, the opposing side convex portions $3a_p$ are electrically connected to the second and third opposing electrode base 112 and 113, forming a substructure ($13a_p$, 112, 113) that is part of the stepped type opposing electrode. In FIG. 12, the lower surface of the opposing convex portion 13$a_p$ is schematically represented as an irregularly shaped residue of the film 33 for selective removal that was present on the lower surface of the opposing convex portion 13$a_p$. The residue of the selective removal membrane 33 is an unnecessary structure by design and can be ignored.

FIG. 13 shows the cross-sectional structure of the acoustic element of the second embodiment, focusing on the structure of the peripheral side of the vibration cavity. That is, as in FIG. 12, it is based on a three-layer structure in which a base insulating film 52 is deposited on the device substrate 51, and a protective film 53 is deposited on the bottom surface of the opposite electrode on top of the base insulating film 52. The outermost first vibration side convex portion 12$a_1$ is inserted between the recesses constituted by the outermost opposite side stepped side wall portion 13$a_0$ and the first opposite side convex portion 13$a_1$, which is the side wall structure of the acoustic element of the first embodiment, and the second vibration side convex portion 12$a_2$ is inserted into the recess on the inner side of the first opposite side convex portion 13$a_1$ to form the normal direction capacitance $C_{udv1}$, $C_{udv2}$ and non normal direction capacitor capacitance $C_{udh}$ is increased (see FIG. 2E for indication of $C_{udv1}$, $C_{udv2}$ and quantity $C_{udh}$).

The third counter electrode base 113, one of the three segmented electrodes, is placed on the protective film 53 on the bottom surface of the counter electrode, and a common drive potential $V_{dr}$ is applied to the third counter electrode base 113 along with the other first and second counter electrode bases 111 and 112. The drive potential $V_{dr}$ can be, for example, $V_{dr}$=30 V or more. The third counter electrode base 113 can be composed of a conductor such as W. The opposing side step side wall portion 13$a_0$ and the first opposing side convex portion 13$a_1$, which are disposed above the third counter electrode base 113 and constitute a structure protruding upward from the third counter electrode base 113, are composed of a low resistivity dielectric such as a DOPOS film. The acoustic element of the second embodiment is an example of a structure with a convex portion of a conductive material. However, more generally, the opposite side stepped side wall portion 13$a_0$ and the first opposite side convex portion 13$a_1$, etc. can be dielectric as an insulator with specific resistance $\rho \approx \infty$, as described in the sixth embodiment.

As illustrated in FIG. 13, the top surface of the third counter electrode base 113 at the point where the opposite side-stepped side wall 13$a_0$ and the first opposite side convex portion 13$a_1$ are not disposed is covered with the opposite side dielectric layer 31 such as silicon oxide film. Similarly, the surfaces of the first vibrating side convex portions 12$a$, and the second vibrating side convex portion 12$a_2$ and the underside of the vibrating electrode base 12 at the locations where the first vibrating side convex portion 12$a_1$ and the second vibrating side convex portion 12$a_2$ are not located are covered by a vibration side dielectric layer 55 made of a dielectric film such as silicon nitride film. Various types of high dielectrics, ferroelectrics, paraelectric materials, etc., as described in the latter part of the explanation of the basic concept at the beginning of this paper, can be used for the opposite side dielectric layer 54 and the vibration side dielectric layer 55. A protective film 56 on the top surface of the vibrating electrode, such as a silicon oxide film, for example, is placed on the base 12 of the vibrating electrode. The side wall of the cavity, in the example structure of FIG. 13, consists of a composite structure of a side wall insulating film base layer 21 such as a silicon oxide film and a side wall insulating film 22 such as a silicon oxide film deposited on top of the side wall insulating film base layer 21. The sidewall insulating film base layer 21 is deposited on the top surface of the underlying insulating film 52 in such a manner as to embed the third counter electrode base 113, and the sidewall insulating film 22 is deposited on the sidewall insulating film base layer 21 including the top surface of the edge of the third counter electrode base 113.

FIG. 13 is a schematic cross-sectional view of a portion of the vibrating cavity 18 focusing on the periphery, so that the vibrating cavity 18 meandering in a waveform between the first vibrating side convex part 12$a_1$ inserted from above against the space of the concave part composed of the outermost opposite side stepped side wall part 13$a_0$ and the first opposite side convex part 13$a_1$ that is the side wall structure is shown as an example. Furthermore, shown on the right side of the paper in FIG. 13, a portion of the vibrating cavity 18 that meanders into a waveform between the second vibrating side convex part 12$a_2$ that is inserted from above against the space of the concave part that constitutes the inner circumference of the first opposite side convex part 13$a_1$ is illustrated. As for the overall structure, as can be understood from FIG. 2, the corresponding vibrating side convexes 12$a_{q-1}$, 12$a_q$, 12$a_{q+1}$, . . . are inserted into the concave space constituted between adjacent opposing side convexes 13$a_{p-1}$, 13$a_p$, 13$a_{p+1}$, . . . in a nested configuration in which the opposing side convex part 13$a_{p-1}$, 13$a_p$, 13$a_{p+1}$, . . . and the vibrating side convex part 12$a_{q-1}$, 12$a_q$, 12$a_{q+1}$, . . . meander in a bellows-like manner between A vibration cavity 18 is formed.

=Method of Manufacturing Acoustic Elements in Accordance with the Second Embodiment=

The manufacturing method of the acoustic element according to the second embodiment of the present disclosure will be described below with reference to FIGS. 14A to 14I. First, using a CVD method or the like, a base insulating film 52 such as a silicon oxide film is formed over the entire surface at a thickness of about 100 nm on an element substrate 51 such as a single-crystal silicon substrate, for example. Then, a protective film 53 such as a silicon nitride film is formed on the entire surface of the lower surface of the opposite electrode at a thickness of about 50 nm on top of the base insulating film 52 using a CVD method or the like. Also, using a CVD method or the like, a sidewall insulating film base layer 21, such as a silicon oxide film, is formed over the entire surface at a thickness of about 100 nm on top of the protective film 53 for the lower surface of the opposite electrode. Then, a first photoresist film is spin-coated over the entire surface on top of the sidewall insulating film base layer 21, and using photolithography technology, the first photoresist film is exposed and developed to open a pattern of the first damascene groove section that embeds the third counter electrode base 113. Using the pattern of the first photoresist film as an etching mask, selectively etch the sidewall insulating film base 21 to the desired depth using dry etching techniques such as RIE to form the first damascene groove section.

Figure 14A:
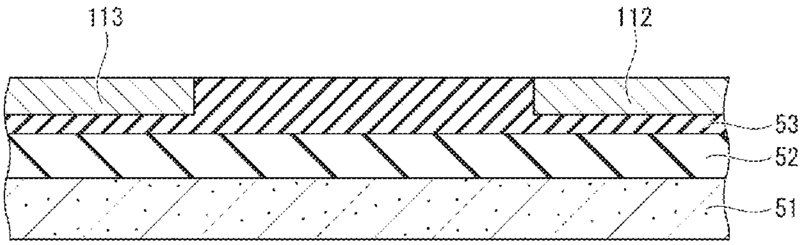
FIG. 14A is a process cross-sectional view illustrating an example of the manufacturing method of the acoustic element according to the second embodiment (Part 1).

Then, after forming a first conductive film such as W by a film forming method such as the CVD method to embed the first damascene groove, a film polishing method such as the CMP method is used to flatten the film until the top surface of the protective film 53 on the bottom surface of the opposite electrode is exposed. as shown in FIG. 14A. As shown in FIG. 14A, the first conductive film is embedded inside the first damascene groove. The first conductive film embedded inside the groove portion for the first damascene becomes the flat plate-shaped second counter electrode base 112 and third counter electrode base 113 having flat main surfaces. The remaining one counter electrode base 111, which is omitted in FIG. 14A but divided into three pieces at other locations, is embedded simultaneously with the second counter electrode base 112 and third counter electrode base 113.

Figure 14B:
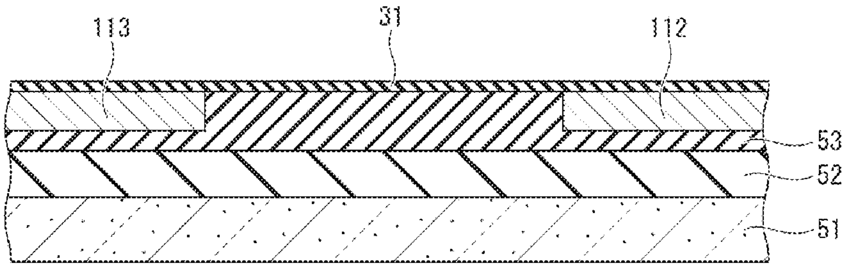
FIG. 14B is a process cross-sectional view illustrating an example of the method of manufacturing an acoustic element according to the second embodiment following the process of the cross-sectional structure illustrated in FIG. 14A.
Figure 14C:
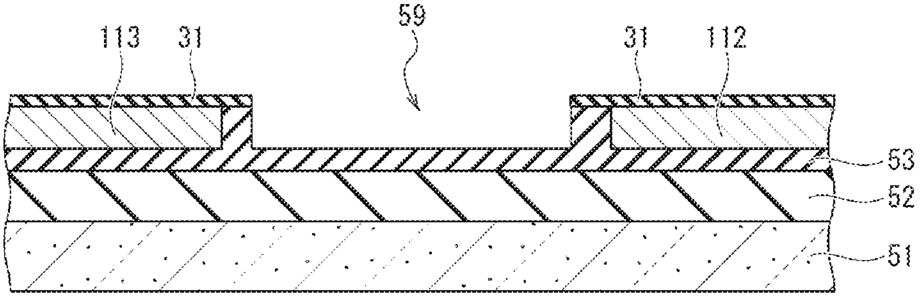
FIG. 14C is a process cross-sectional view illustrating exemplarily the method of manufacturing an acoustic element according to the second embodiment following the process of the cross-sectional structure illustrated in FIG. 14B.

Next, using a CVD method or the like, the opposing side dielectric layer 31, such as a silicon oxide film, is formed over the entire surface of the sidewall insulating film base layer 21 and the third opposing electrode base 113 with a thickness of about 50 nm as shown in FIG. 14B. Then, a second photoresist film is spin-coated over the entire surface on the opposing side dielectric layer 31, and using photolithography technology, the second photoresist film is exposed and developed to open the pattern of the grooves for the second damascene. Using the pattern of the second photoresist film as an etching mask, the opposing dielectric layer 31 is selectively etched to the desired depth using dry etching techniques such as RIE to form the second damascene groove 59 as shown in FIG. 14C.

Figure 14D:
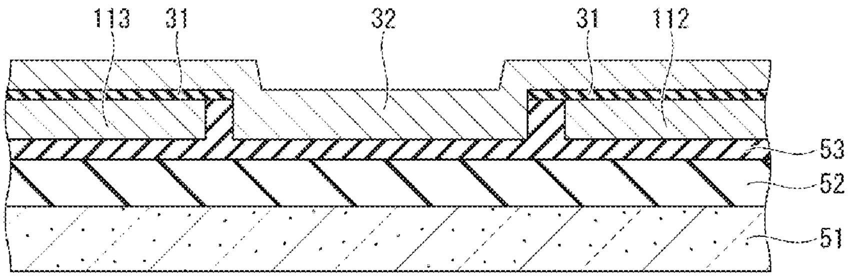
[FIG. 14D] Process cross-sectional view illustrating exemplarily the method of manufacturing an acoustic element according to the second embodiment following the process of the cross-sectional structure illustrated in FIG. 14C.
Figure 14E:
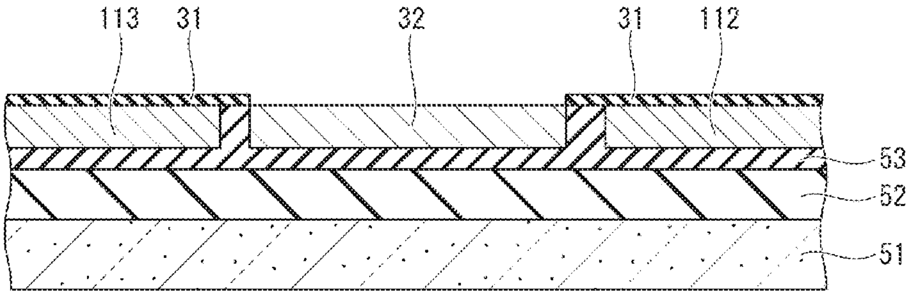
[FIG. 14E] This is a process cross-sectional view illustrating exemplarily the method of manufacturing an acoustic element according to the second embodiment following the process of the cross-sectional structure illustrated in FIG. 14D.
Figure 14F:
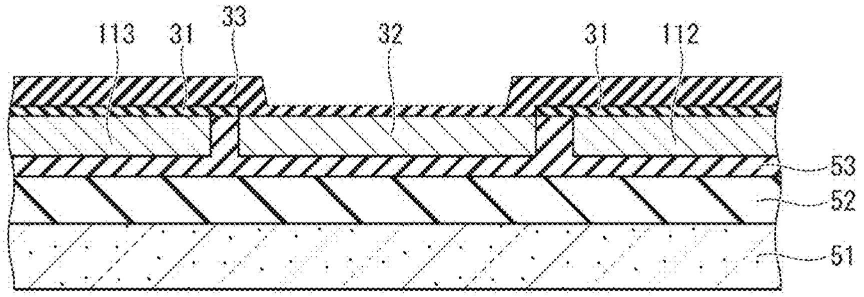
FIG. 14F is a process cross-sectional view illustrating exemplarily the method of manufacturing an acoustic element according to the second embodiment following the process of the cross-sectional structure illustrated in FIG. 14E.

Then, a second conductive film 32 such as W is formed by a film forming method such as CVD method to embed the second damascene groove 59 as shown in FIG. 14D. The first conductive film and the second conductive film 32 may be the same conductive material. Thereafter, a film polishing method such as the CMP method is used to flatten the film until the top surface of the opposing dielectric layer 31 is exposed, and the film is further etch-backed as shown in FIG. 14E. Next, using a CVD method or the like, a selective removal film 33, which has a different etching selectivity ratio for a specific etchant compared to the opposite side dielectric layer 31, is formed over the entire surface with a thickness of about 100 nm as shown in FIG. 14F. When the opposing dielectric layer 31 is a silicon oxide film, a silicon nitride film can be employed as the selective removal film 33.

Figure 14G:
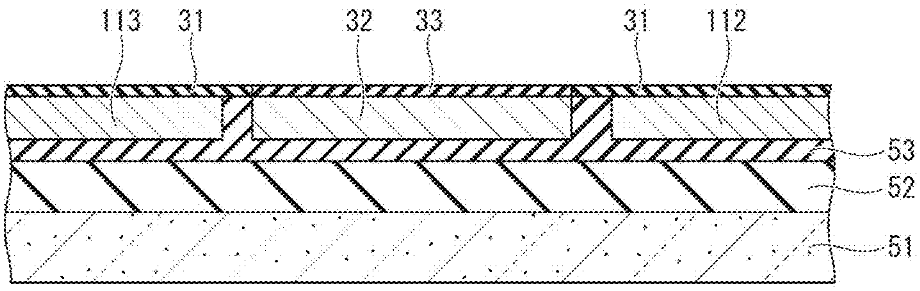
[FIG. 14G] Process cross-sectional view illustrating exemplarily the method of manufacturing an acoustic element according to the second embodiment following the process of the cross-sectional structure illustrated in FIG. 14F.

By planarizing until the surface of the opposite side dielectric layer 31 is exposed using a film polishing method such as the CMP method, the film for selective removal 33 is embedded on the top surface of the W film embedded in the second damascene groove 59, as shown in FIG. 14G. Next, a sidewall insulating film 22, such as a silicon oxide film, is formed over the entire surface of the dielectric layer 31 and the film for selective removal 33 using a CVD method or the like, with a thickness of 250 to 900 nm. Then, a third photoresist film is spin-coated over the entire surface on top of the sidewall insulating film 22, and using photolithography technology, the third photoresist film is exposed and developed to open a pattern that leaves the sidewall insulating film 22 in the peripheral area as shown in FIG. 10. Using the pattern of the third photoresist film as an etching mask, the sidewall insulating film 22 is selectively etched using dry etching technology such as RIE until the top surface of the opposite side dielectric layer 31 is exposed.

Then, a fourth photoresist film is spin-coated over the entire surface of the opposite side dielectric layer 31, and using photolithography technology, the fourth photoresist film is exposed and developed to form patterns that become contact holes for the second opposite electrode base 112 and third opposite electrode base 113. Using the pattern of the fourth photoresist film as an etching mask, the opposing dielectric layer 31 is selectively etched using dry etching techniques such as RIE to form contact holes that expose portions of the surfaces of the second and third opposing electrode base 112 and 113.

Figure 14H:
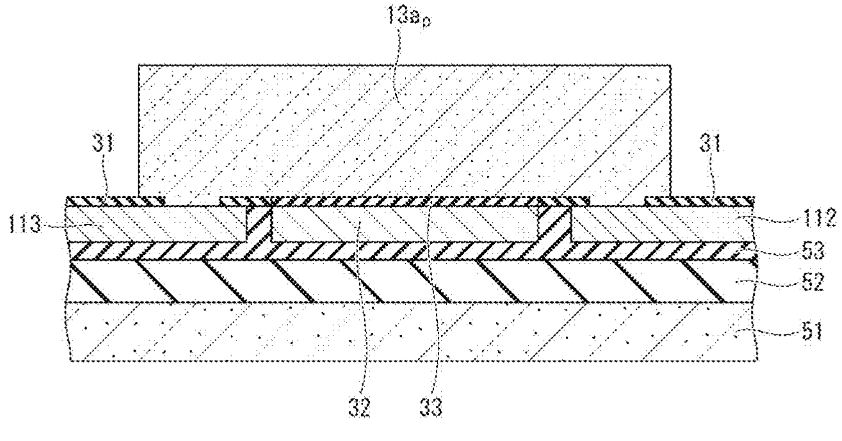
[FIG. 14H] Process cross-sectional view illustrating exemplarily the method of manufacturing an acoustic element according to the second embodiment following the process of the cross-sectional structure illustrated in FIG. 14G.

Next, a dielectric film such as DOPOS film is deposited over the entire surface with a thickness of 250 nm to 1000 nm by doping CVD method, etc. Then, a fifth photoresist film is spin-coated over the entire surface of the dielectric film, and using photolithography technology, the fifth photoresist film is exposed and developed to form the pattern of the convex hull on the opposite side. Using the pattern of the fifth photoresist film as an etching mask, selectively etch the dielectric film to the desired depth using a dry etching technique such as RIE to form the opposing side convex part $13a_p$ as shown in FIG. 14H. The opposing side convex portion $13a_p$ can be electrically connected to the second opposing electrode base 112 and the third opposing electrode base 113 via contact holes in the opposing dielectric layer 31. At the same time as the pattern of the opposing side convex portion $13a_p$ shown in FIG. 14H, other patterns such as a plurality of opposing side convex portions $13a_{p-1}$, $13a_{p+1}$, . . . are also formed in other areas such as at the back of the paper, and through contact holes provided in the opposing side dielectric layer 31, corresponding first opposing Electrically connected to the corresponding first opposite electrode base 111, second opposite electrode base 112 and third opposite electrode base 113 through contact holes provided in the opposite side dielectric layer 31.

Then, a sixth photoresist film is spin-coated over the entire surface of the plurality of opposing convex portions $13a_{p-1}$, $13a_{p+1}$, . . . , the opposing dielectric layer 31 and the sidewall insulating film 22, and using photolithography technology, the sixth photoresist film is used as the The mask is used to form a window that selectively opens the area above the corrosion medium channels 151*b*, 152*b*, and 153*b*. Using the pattern of the sixth photoresist film as an etching mask, selectively etch a portion of the opposing dielectric layer 31 using a dry etching technique such as RIE until a window is formed in which the pattern on the top surface of the film 33 for selective removal is exposed. Furthermore, a seventh photoresist film is spin-coated over the entire surface of the multiple opposing side convex portions $13a_{p-1}$, $13a_{p+1}$, . . . and the sidewall dielectric film 22, and photolithography technology is used to apply the seventh photoresist film to the canal edges 141*b*, 142*b*, 143*b* as a mask with aperture patterns.

Using the pattern of the seventh photoresist film as an etching mask, the sidewall insulating film 22 is selectively etched using a dry etching technique such as RIE until the top surface of the film 33 for selective removal is exposed. Next, when a thermal phosphoric acid ($H_3PO_4$) solution is used to etch the entire surface, the selective removal film 33 embedded in the second damascene groove 59 is selectively removed, and between the patterns of multiple opposing side convex portions $13a_{p-1}$, $13a_p$, $13a_{p+1}$, . . . . The surface of the second conductive film 32 embedded inside is exposed. Even if there is some misalignment of masks in the photolithography process using the sixth photoresist film, the desired area above the corrosion medium channels 151*b*, 152*b*, 153*b* can be selectively opened by using the selective removal process with the selective removal film 33. Also, the selective removal film 33 exposed at the bottom of the canal ends 141*b*, 142*b*, 143*b* is selectively removed.

Figure 14I:
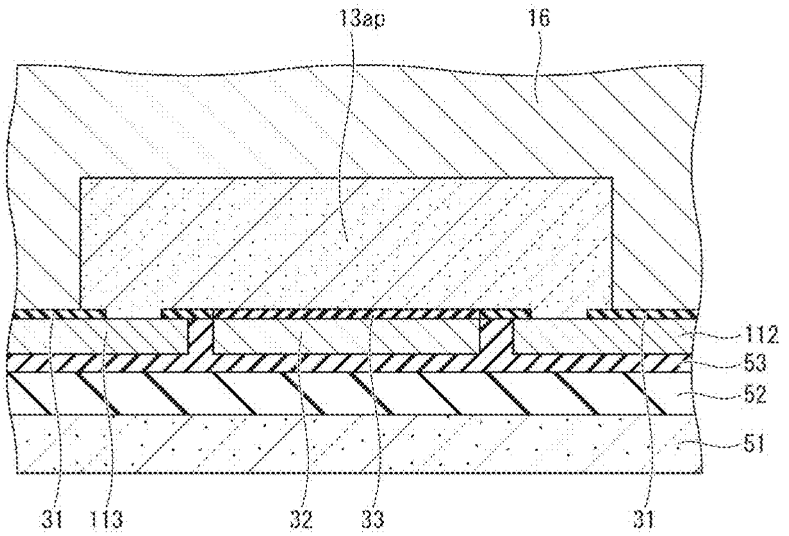
[FIG. 14I] This is a process cross-sectional view illustrating exemplarily the method of manufacturing an acoustic element according to the second embodiment following the process of the cross-sectional structure illustrated in FIG. 14H.

Then, using a CVD method or the like, a sacrificial film 16 made of a material film with sacrificial etchability such as W is deposited over the entire surface with a thickness of about 20 to 200 nm, and, similar to that shown in FIG. 6D, a plurality of opposing side convexities $13a_{p-1}$, $13a_p$, $13a_{p+1}$, . . . patterns of vertical step coverage along the sidewalls. FIG. 14I also schematically shows how the sacrificial film 16 is deposited along the vertical sidewall of the opposing convexity. With the full deposition of the sacrificial film 16, the wells at the canal ends 141*b*, 142*b*, 143*b*, which are opened in the peripheral sidewall insulating film 22, are also plugged and filled.

Further, using a CVD method or the like, a vibration-side dielectric layer 55 consisting of a dielectric film such as a silicon nitride film is formed over the entire surface of the sacrificial film 16 at a thickness of about 50 nm, similar to that shown in FIG. 6D. Next, using a CVD method or the like, a third conductive film such as a W film is formed over the entire surface of the vibration side dielectric layer 55 with a thickness of about 100 nm so as to completely fill the recesses in the vibration side dielectric layer 55. Then, an eighth photoresist film is spin-coated over the entire surface to cover the third conductive film, and exposed and developed to selectively expose the position on the top side of the opposing side dielectric layer 31 in the peripheral area. Then, using the pattern of the eighth photoresist film as an etching mask, the third conductive film is selectively etched by dry etching techniques such as RIE to expose the top surface of the vibration side dielectric layer 55 located on the top surface of the opposite side dielectric layer 31 in the peripheral area. After removal of the eighth photoresist film, this third conductive film is etched back. The etchback forms the patterns of the first vibrating side convex part 12$a_1$ and the second vibrating side convex part 12$a_2$, similar to the structure shown in FIG. 1E.

After etchback, a fourth conductive film such as a W film is formed over the entire surface with a thickness of about 100 nm on the vibrating side dielectric layer 55 and on the first vibrating side convexity 12$a_1$ and the second vibrating side convexity 12$a_2$ on the inner side using a CVD method or the like. Then, the 9th photoresist film is spin-coated over the entire surface to cover the 4th conductive film, and exposed and developed to selectively expose the top side position of the opposing side dielectric layer 31 on the periphery. Then, using the pattern of the 9th photoresist film as an etching mask, the 4th conductive film is selectively etched by dry etching techniques such as RIE to expose the top surface of the vibration side dielectric layer 55 located on the top surface of the opposite side dielectric layer 31 in the peripheral area. As a result, as shown in FIG. 13, a planar vibration electrode base 12 with a flat main surface when not in vibration is formed, which is connected to the top of the first vibration side convex portion 12$a_1$ and the top of the second vibration side convex portion 12$a_2$, respectively.

Next, a vibrating electrode protective film underlayer, such as a silicon oxide film, is formed on the entire surface at a thickness of about 50 nm on the vibrating side dielectric layer 55 and on the vibrating electrode base part 12 using a CVD method or the like. A 10th photoresist film is spin-coated over the entire surface to cover the vibrating electrode protective film base layer, and the pattern of holes for forming cavities is exposed and developed by mask matching the pattern of canal ends 141*b*, 142*b*, 143*b* as shown in FIG. 10. Then, using the pattern of the 10th photoresist film as an etching mask, selective etching is performed to penetrate through the vibrating electrode protective film base layer and 55 vibrating side dielectric layer by dry etching technique such as RIE. By selective etching, holes for forming cavities reaching the surface of the sacrificial film 16 embedded in a plug shape at the canal ends 141*b*, 142*b*, 143*b* are opened as shown in FIG. 10.

When a corrosive medium such as hydrogen peroxide solution is introduced as an etchant through the holes for cavity formation, the corrosive medium is introduced into each of the corrosive medium channels 151*b*, 152*b*, and 153*b*, which are correspondingly provided in the lower layer in a three-dimensional structure via the canal ends 141*b*, 142*b*, 143*b* shown in FIG. 10. As a result, the sacrificial film 16 is etched away by the corrosive medium (etchant). When the sacrificial film 16 is etched away, a vibration cavity 18 is formed between the third counter electrode base 113, the drive sidewall counter electrode 13$a_0$ and the first counter side convexity 13$a_1$ and the vibration electrode base 12, the first vibration side convexity 12$a_1$ and the second vibration side convexity 12$a_2$ as shown in FIGS. 12 and 13.

When the etching medium is a liquid such as hydrogen peroxide solution, when the removal process of the sacrificial film 16 is completed, the etching medium is moved to the cleaning process using a cleaning solution. After the cleaning process is completed. the cleaning solution is dried by IPA vapor drying or other means. During the drying of the cleaning solution, heat treatment in a vacuum may be used in combination with heat treatment to progress silicidation and alloying between the opposing convex portions 13$a_{p-1}$, 13$a_p$, 13$a_{p+1}$, . . . and the first opposing electrode base 111, second opposing electrode base 112 and third opposing electrode base 113 This may be done. After the cleaning solution is dried, a main protective layer, which is the remaining part of the protective film 56 on the top surface of the vibrating electrode, is deposited over the entire surface with a thickness of 150 to 1000 nm on top of the protective film base layer, using a film deposition technique under reduced pressure such as reduced pressure CVD, plasma CVD or vacuum deposition. By depositing the main protective layer on top of the vibrating electrode protective film underlayer under reduced pressure, a plug is provided at the entrance of the hole for forming the cavity, and the vibrating cavity 18 is vacuum-sealed. For example, with the inside of the vibration cavity 18 in a state of reduced pressure of about 1 kPa, the main protective layer is deposited by reduced-pressure CVD using He gas as the main carrier gas, and a plug is placed at the entrance of the hole for forming the cavity. The composite film of the vibrating electrode protective film base layer and the main protective layer constitutes the protective film 56 on the top surface of the vibrating electrode shown in FIG. 13, and the acoustic element of the second embodiment is completed.

Variation of the Second Embodiment

In the explanation of the acoustic element for the second embodiment, as shown in FIGS. 3 to 5, the acoustic element with 0% initial crossing has a larger stored electrical energy and a larger transmitted acoustic energy than the acoustic element with 50% initial crossing. In the manufacturing method of acoustic elements for the first embodiment shown in FIGS. 6A-6H, the structure at the stage of the end of the manufacturing process had the problem that the initial crossing was more than 50%. In the following manufacturing method of the acoustic element according to the second embodiment variant, the manufacturing method that enables 0% initial crossing at the stage of the end of the manufacturing process is described after the process where the W film and the film for selective removal 33 are embedded in the groove 59 for the second damascene shown in FIG. 14G above.

Figure 15A:
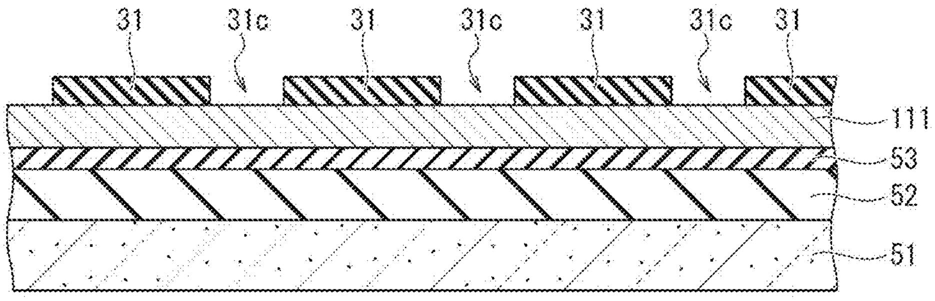
FIG. 15A is a process cross-sectional view illustrating an example of the method of manufacturing an acoustic element according to a variant of the second embodiment (Part 1).
Figure 15B:
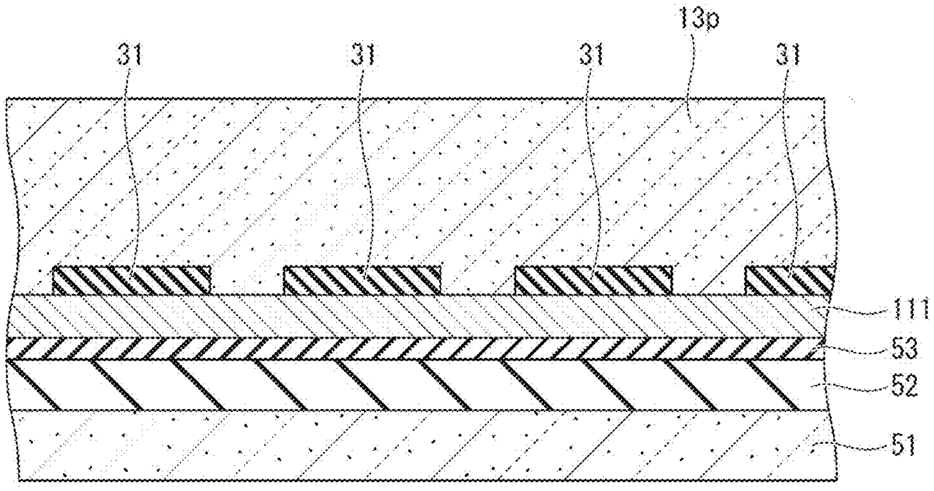
FIG. 15B is a process cross-sectional view illustrating an example of a manufacturing method of an acoustic element pertaining to a variation of the second embodiment following the process of the cross-sectional structure illustrated in FIG. 15A.

That is, FIG. 15A shows that after the process shown in FIG. 14G, using the pattern of the fourth photoresist film as an etching mask, a contact hole 31*c* is opened in the opposing side dielectric layer 31 to expose part of the top surface of the first opposing electrode base 111, one of the three-division opposing electrode base parts. FIG. 15B shows a state in which dielectric film 13*p*, such as DOPOS film, is deposited over the entire surface of the opposing side dielectric layer 31, such that the dielectric film 13*p* is electrically connected to a portion of the top surface of the first counter electrode base 111 via contact hole 31*c*.

Figure 15C:
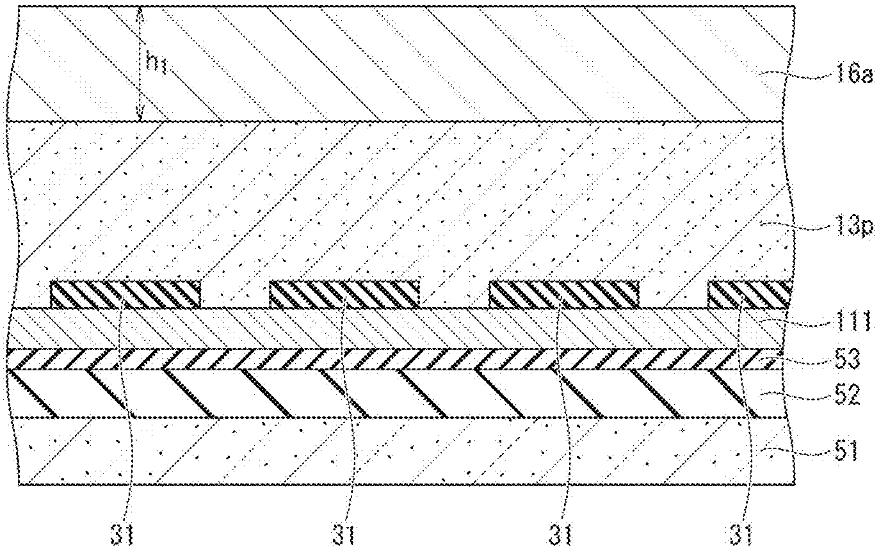
FIG. 15C is a process cross-sectional view illustrating exemplarily the method of manufacturing an acoustic element pertaining to a variation of the second embodiment following the process of the cross-sectional structure illustrated in FIG. 15B.
Figure 15D:
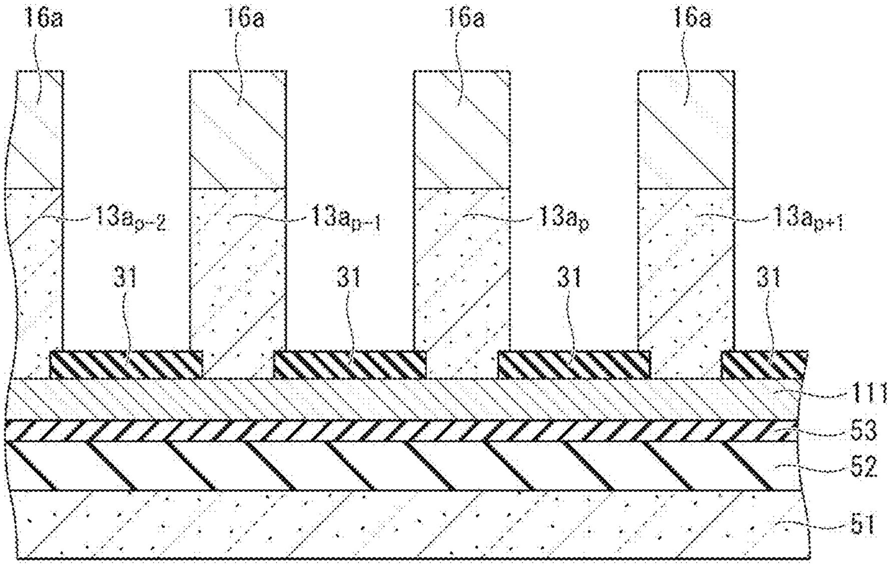
FIG. 15D is a process cross-sectional view illustrating exemplarily the method of manufacturing an acoustic element pertaining to a variation of the second embodiment following the process of the cross-sectional structure illustrated in FIG. 15C.

In the manufacturing method of the acoustic element for the variation of the second embodiment, as shown in FIG. 15C, a first sacrificial film 16*a* having sacrificial etch suitability such as W is further deposited on the entire surface of the dielectric film 13*p* at a vertical bulk height $h_1$ by a film forming method such as CVD method. Then, a fifth photoresist film is spin-coated over the entire surface of the first sacrificial film 16*a*, and the fifth photoresist film is exposed and developed to form a pattern of the opposite side convex part (second electrode side convex part) using photolithography technology. Using the pattern of the fifth photoresist film as an etching mask, a highly directional dry etching technique such as RIE is used to etch the first sacrificial film 16*a* and the dielectric film 13*p* until the top surface of the opposite side dielectric layer 31 is exposed, and as shown in FIG. 15D, the opposite side convex part with vertical side walls 13$a_{p-2}$, 13$a_{p-1}$, 13$a_p$, 13$a_{p+1}$, . . . patterns are formed. In selective etching using the fifth photoresist film, the first sacrificial film 16*a* and dielectric film 13*p* above the sidewall insulating film in the peripheral area are also removed.

Then, a sixth photoresist film is spin-coated over the entire surface of the plurality of opposing convex portions 13$a_{p-1}$, 13$a_{p+1}$, . . . the opposing dielectric layer 31 and the sidewall insulating film 22, and the sixth photoresist film is applied by photolithography technique to the corrosion media shown in FIGS. 10 and 11 The mask is used to open the top of the flow paths 151*b*, 152*b*, and 153*b*. Using the pattern of the sixth photoresist film as an etching mask, the opposing dielectric layer 31 is etched using a dry etching technique such as RIE until an opening is selectively opened where the top surface of the film 33 for selective removal is exposed. Furthermore, a seventh photoresist film is spin-coated over the entire surface of the plurality of opposing side convex portions 13$a_{p-1}$, 13$a_{p+1}$, . . . , the opposing side dielectric layer 31 and the sidewall insulating film 22, and the seventh photoresist film is applied by photolithography technology to the canal edge 141*b*, 142*b*, 143*b*, 143*b* with the opening patterns shown in FIG. 10. Using the pattern of the seventh photoresist film as an etching mask, the sidewall insulating film 22 is selectively etched using dry etching technology until the top surface of the film 33 for selective removal is exposed, and vertical holes (wells) of the canal ends 141*b*, 142*b*, 143*b* are dug through the sidewall insulating film 22.

Next, full surface etching using a thermal phosphoric acid solution selectively removes the film 33 for selective removal exposed in an opening in a portion of the opposing dielectric layer 31 at the bottom of the concave pattern formed by the plurality of opposing side convex portions 13$a_{p-1}$, 13$a_p$, 13$a_{p+1}$, . . . . As a result of the selective removal of the film 33 for selective removal, the surface of the second conductive film 32 embedded inside the groove portion 59 for the second damascene is exposed at a portion of the bottom of the concave pattern formed by the plurality of opposing side convex portions 13$a_{p-1}$, 13$a_p$, 13$a_{p+1}$, . . . . Even if there is a slight deviation in mask alignment during the photolithography process to expose the top surface of the film 33 for selective removal, the desired area at the top of the corrosion medium channels 151*b*, 152*b*, 153*b* can be selectively opened by using the selective removal process with the film 33 for selective removal. Also, the selective removal film 33 exposed at the bottom of the canal ends 141*b*, 142*b*, 143*b* is selectively removed.

Figure 15E:
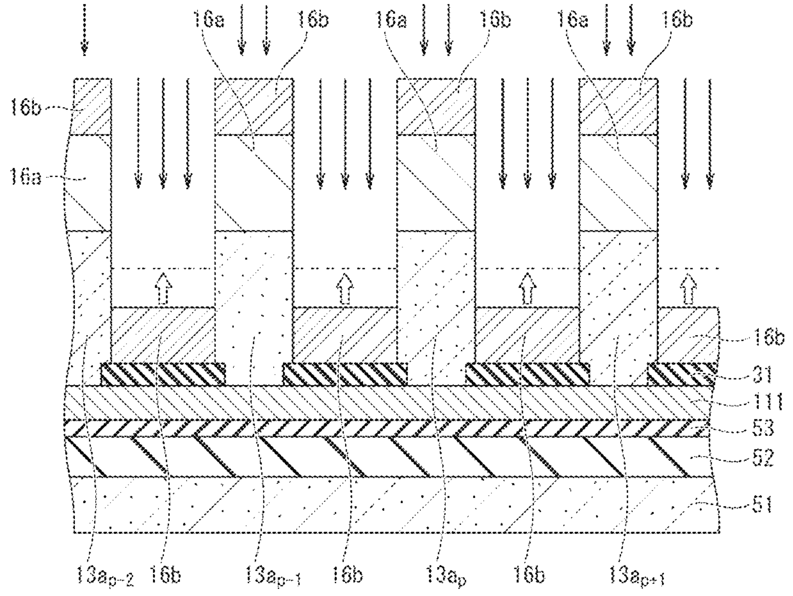
FIG. 15E This is a process cross-sectional view illustrating exemplarily the method of manufacturing an acoustic element pertaining to a variation of the second embodiment following the process of the cross-sectional structure illustrated in FIG. 15D.

Then, using highly directional film deposition techniques such as ultra-high vacuum electron beam deposition or molecular beam deposition, as shown in FIG. 15E, avoid adhering to the vertical sidewalls of the opposing convexities 13$a_{p-2}$, 13$a_{p+1}$, 13$a_p$, 13$a_{p+1}$, . . . . The second sacrificial film 16*b* is deposited directionally perpendicularly at the bottom of the groove between opposing convexities 13$a_{p-2}$ and 13$a_{p-1}$, the bottom of the groove between the opposing convexities 13$a_{p-1}$ and 13$a_p$, the bottom of the groove between the opposing convexities 13$a_p$ and 13$a_{p+1}$, and . . . , respectively. The first and second sacrificial films 16*a* and 16*b* should be material films with nearly identical etching properties for the same etchant. In the highly directional vertical deposition technique shown in FIG. 15E, if an eave (overhang) is formed at the top edge of the opposing convexity 13$a_{p-2}$, 13$a_{p-1}$, 13$a_p$, 13$a_{p+1}$, . . . , the deposition shape of the bottom of the groove in the cross-sectional view becomes a trapezoid. Since one factor in the formation of the overhang is the accumulation of charge on the deposit, the base 112 of the second counter electrode should be grounded to prevent the deposit from being charged. In addition, back-etching is used in combination to prevent the formation of eaves. The second sacrificial film 16*b* is also deposited inside the vertical holes of the canal ends 141*b*, 142*b*, 143*b* that penetrate the sidewall insulating film 22. but the cross-sectional shape of the deposits inside the canal ends 141*b*, 142*b*, 143*b* can be trapezoidal.

Figure 15F:
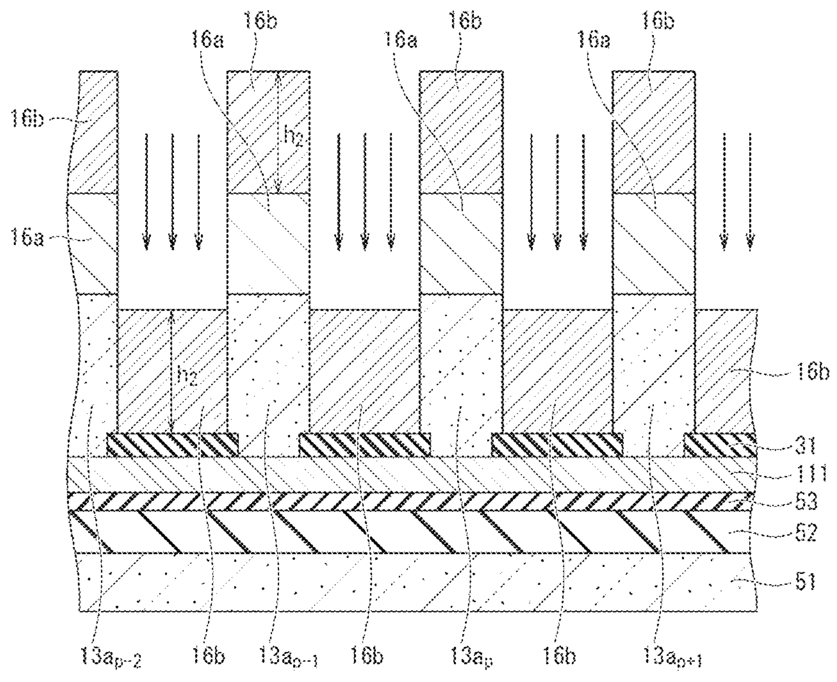
FIG. 15F is a process cross-sectional view illustrating exemplarily the method of manufacturing an acoustic element pertaining to a variation of the second embodiment following the process of the cross-sectional structure illustrated in FIG. 15E.

The highly directional vertical deposition technique shown in FIG. 15E is performed with repeated eave removal processes, as shown in FIG. 15F: bottom of the groove between opposing convexities 13$a_{p-2}$ and 13$a_{p+1}$, bottom of the groove between opposing convexities 13$a_{p-1}$ and 13$a_p$, bottom of the groove between opposing convexities 13$a_p$ and 13$a_{p+1}$, . . . . In addition, the second victim film 16*b* is directionally deposited at a vertical bulk height of $h_2$. Since the second sacrificial film 16*b* is also deposited at the top of the opposing convexities 13$a_{p-2}$, 13$a_{p-1}$, 13$a_p$, 13$a_{p+1}$, . . . at a vertical bulk height $h_2$, once the designed vertical bulk height $h_2$ is reached. CMP or other techniques are used to deposit the top of the opposing convexities 13$a_{p-2}$, 13$a_{p-1}$, 13$a_p$, 13$a_{p+1}$, 13*a* Remove deposits from the top edge of . . . . Then, using a film formation method with good step coverage, such as reduced-pressure CVD, the third sacrificial film 16*c* is deposited over the entire surface with a gap thickness Δ=20 to 100 nm as shown in FIG. 15G.

The gap thickness Δ is between the opposing side convexes 13$a_{p-2}$, 13$a_{p-1}$, 13$a_p$, 13$a_{p+1}$, . . . and the vibrating side convexes (first electrode side convexes) 12$a_{q-2}$, 12$a_{q-1}$, 12$a_q$, 12$a_{q+1}$, . . . that oppose them respectively. It is the dimension that determines the gap. The first sacrificial film 16*a*, the second sacrificial film 16*b*, and the third sacrificial film 16*c* must be material films with chemical properties that exhibit nearly identical etch selectivity for the same etchant, even though the deposition techniques may differ. The full deposition of the third sacrificial film 16*c* also plugs and fills the top of the canal edge 141*b*, 142*b*, 143*b* wells that are opened in the peripheral sidewall dielectric 22.

Figure 15G:
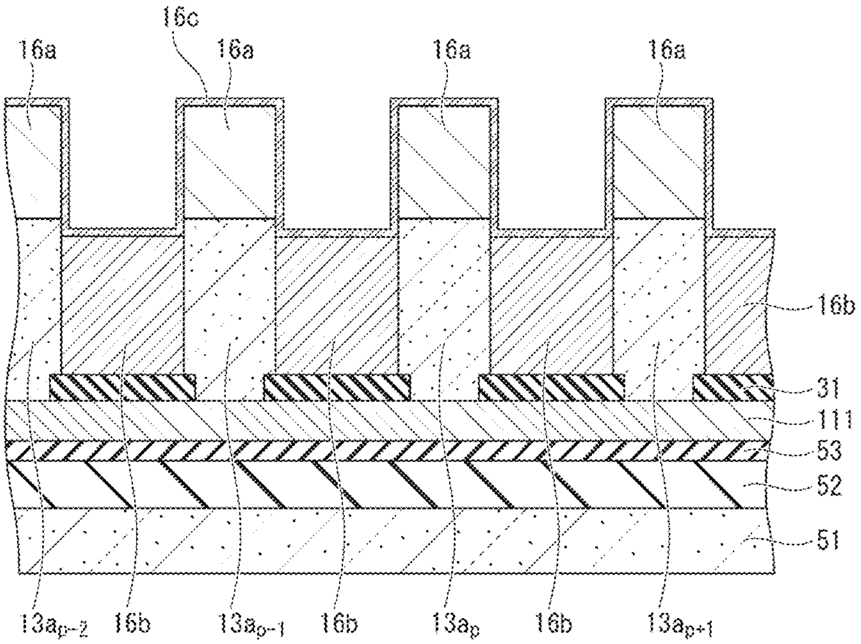
FIG. 15G is a process cross-sectional view illustrating exemplarily the method of manufacturing an acoustic element pertaining to a variation of the second embodiment following the process of the cross-sectional structure illustrated in FIG. 15F.
Figure 15H:
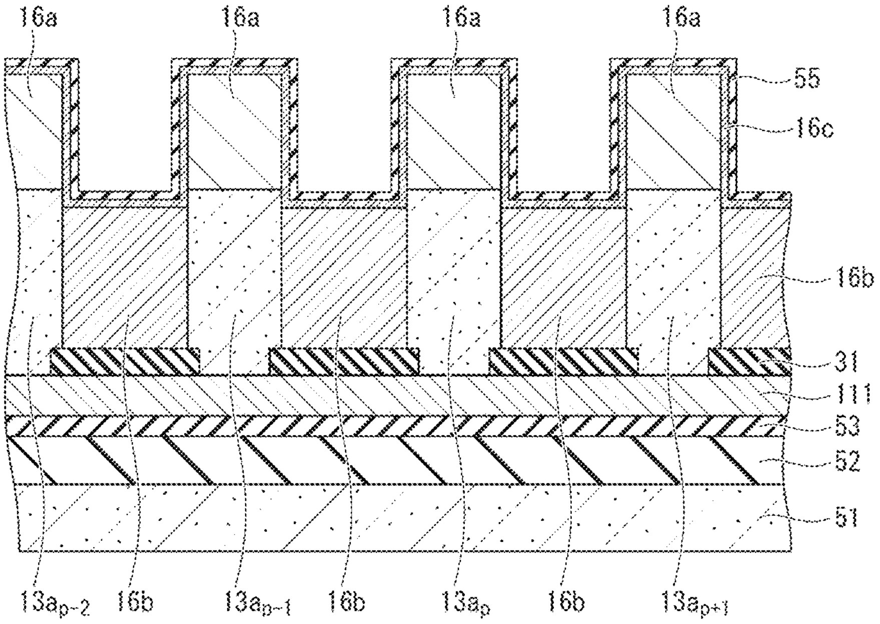
FIG. 15H is a process cross-sectional view illustrating exemplarily the method of manufacturing an acoustic element pertaining to a variation of the second embodiment following the process of the cross-sectional structure illustrated in FIG. 15G.

Further, using a CVD method or the like, a vibration-side dielectric layer 55 made of a dielectric film such as a silicon nitride film is formed over the entire surface with a thickness of about 50 nm on the third sacrificial film 16*c*, as shown in FIG. 15G. Continuously, a third conductive film such as a W film is formed on the entire surface of the vibration side dielectric layer 55 with a thickness of about 100 nm, using a CVD method or the like, to completely fill the recesses in the vibration side dielectric layer 55. Furthermore, an eighth photoresist film is spin-coated over the entire surface to cover the third conductive film, and exposed and developed to selectively expose the position on the top side of the opposing side dielectric layer 31 in the peripheral area. Then, using the pattern of the eighth photoresist film as an etching mask, the third conductive film is selectively etched by dry etching technique to expose the top surface of the vibration side dielectric layer 55 located on the top surface of the opposite side dielectric layer 31 in the peripheral area. After removal of the eighth photoresist film, this third conductive film is etched back.

Figure 15I:
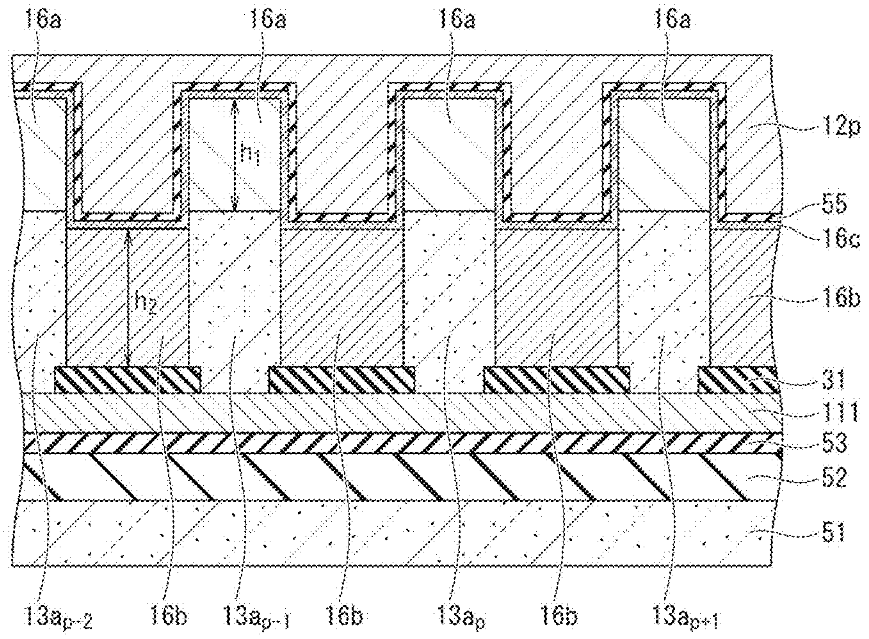
FIG. 15I is a process cross-sectional view illustrating exemplarily the method of manufacturing an acoustic element pertaining to a variation of the second embodiment following the process of the cross-sectional structure illustrated in FIG. 15H.
Figure 15J:
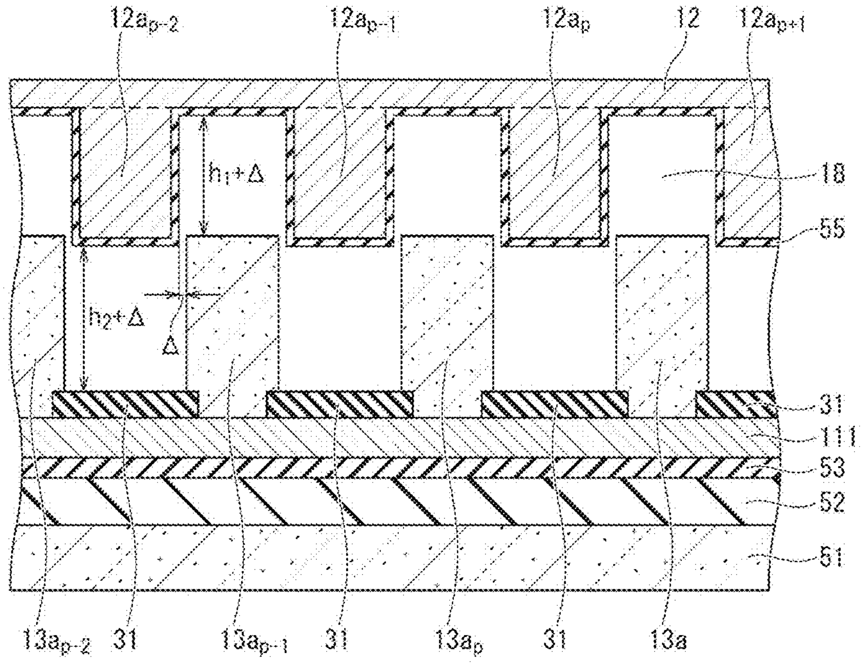
FIG. 15J is a process cross-sectional view illustrating exemplarily the method of manufacturing an acoustic element pertaining to a variation of the second embodiment following the process of the cross-sectional structure illustrated in FIG. 15I.

After etching back, a fourth conductive film such as a W film is formed on the entire surface with a thickness of about 100 nm on the top of the vibrating side dielectric layer 55 and on the third conductive film using a CVD method or the like. Furthermore, using the pattern of the 9th photoresist film as an etching mask, the 4th conductive film is selectively etched by dry etching technique to expose the top surface of the vibration side dielectric layer 55 located on the top surface of the opposite side dielectric layer 31 in the peripheral area. As a result, the structure of the stepped type vibrating electrode 12*p* is completed as shown in FIG. 15I. The stepped type vibrating electrode 12*p* consists of a plate-shaped vibrating electrode base (first electrode base) 12 and a plurality of vibrating side convex portions $\mathbf{12}a_{q-2}$, $\mathbf{12}a_{q-1}$, $\mathbf{12}a_{q}$, $\mathbf{12}a_{q+1}$, . . . hanging on the lower surface of this vibrating electrode base 12, as shown in FIG. 15J. Then, a 10th photoresist film is spin-coated over the entire surface to cover the stepped counter electrode 12*p*, and exposed and developed to selectively expose the top side position of the peripheral counter side dielectric layer 31.

Next, a vibrating electrode protective film underlayer, such as a silicon oxide film, is formed on the entire surface at a thickness of about 50 nm on the vibrating side dielectric layer 55 and on the vibrating electrode base part 12 using a CVD method or the like. A 10th photoresist film is spin-coated over the entire surface to cover the vibrating electrode protective film base layer, and the pattern of holes for forming cavities is exposed and developed by mask matching the pattern of canal ends 141*b*, 142*b*, 143*b* as shown in FIG. 10. Then, using the pattern of the 10th photoresist film as an etching mask, selective etching is performed to penetrate through the vibrating electrode protective film base layer and 55 vibrating side dielectric layer by dry etching technique. By selective etching, holes for forming cavities reaching the surface of the third sacrificial film 16*c* embedded in the canal ends 141*b*, 142*b*, 143*b* are opened as shown in FIG. 10.

When a corrosive medium such as hydrogen peroxide solution is introduced as an etchant through the holes for cavity formation, the corrosive medium is introduced into the corresponding corrosive medium flow paths 151*b*, 152*b*, 153*b* respectively via the canal ends 141*b*, 142*b*, 143*b* shown in FIG. 10. As a result, the first sacrificial film 16*a*, second sacrificial film 16*b*, and third sacrificial film 16*c* are etched away by the corrosive medium (etchant). Once the first sacrificial film 16*a*, second sacrificial film 16*b*, and third sacrificial film 16*c* are etched away, as shown in FIG. 15J, the first counter electrode base 111, counter side convexity $\mathbf{13}a_{p-2}$, $\mathbf{13}a_{p-1}$, $\mathbf{13}a_{p}$, $\mathbf{13}a_{p+1}$, . . . and vibration electrode base 12, vibration side convexity $\mathbf{12}a_{q-2}$, $\mathbf{12}a_{q-1}$, $\mathbf{12}a_{q}$, $\mathbf{12}a_{q+1}$, . . . . During this period, vibrating cavity 18 is formed. Since the following process has been described, the repeated explanation is omitted.

According to the above method of manufacturing the acoustic element for the second embodiment variant, as shown in FIG. 15J, the vertical bulk height $h_1$ of the first sacrificial film 16*a*, the vertical bulk height $h_2$ of the second sacrificial film 16*b*, and the gap thickness Δ of the third sacrificial film 16*c* can be adjusted so that the initial crossing is 0% at the end of the manufacturing process The initial crossing of the structure at the end of the fabrication process can be set to 0%. By reducing the amount of initial crossing of the structure at the end of the manufacturing process stage, it is possible to increase the stored electrical energy and transmit acoustic energy.

Third Embodiment

Figure 17A:
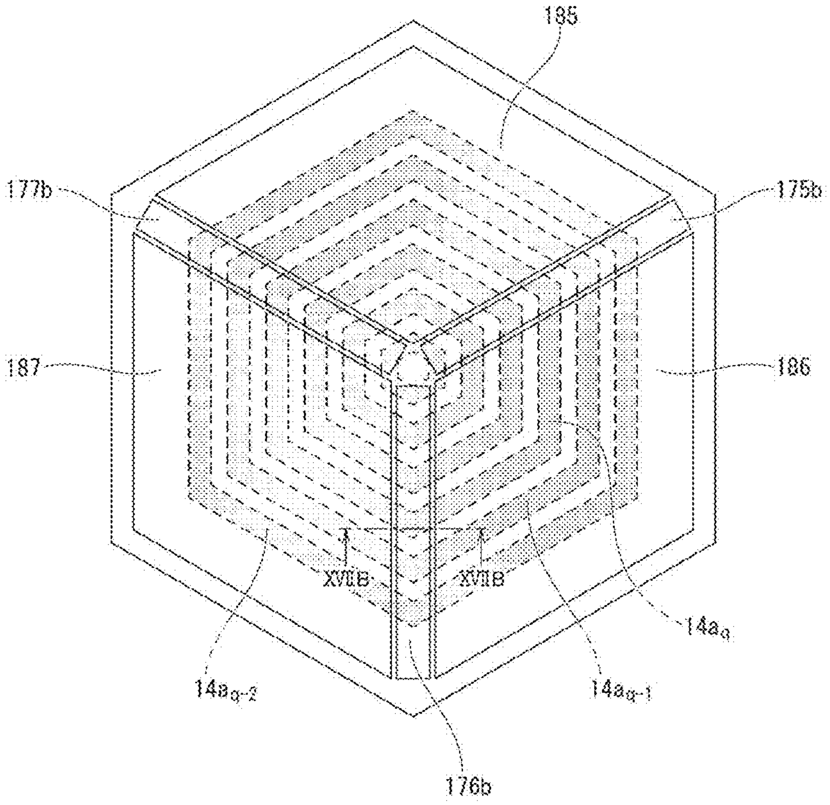
FIG. 17A is a plan view illustrating the three first, second, and third vibrating electrode bases, focusing on the stepped vibrating electrode of the acoustic element of the third embodiment.

The acoustic element integrated circuit of the third embodiment of the present disclosure is similar to the plan view of FIG. 1 described in the first embodiment, with the element array section having regular hexagonal unit cells $X_{(i-1),(j+1)}$, $X_{i,(j+1)}$, $X_{(i+1),(j+1)}$, . . . , $X_{(i-1),j}$, $X_{i,j}$, $X_{(i+1),j}$, . . . , $X_{(i-1),(j-1)}$, $X_{i,(j-1)}$, $X_{(i+1),(j-1)}$, . . . , etc., on the same plane (on the same surface) to form a two-dimensional matrix, which is the basic layout. FIG. 17A shows the structure of the ladder vibrating electrode as an example. The ladder vibrating electrode of the sound element in embodiment 3 consists of vibrating side convex parts (side of the first electrode) like multiple walls (side of the first electrode) forming multiple concentric hexagonal rings inside the hollow with A flat pattern of regular hexagonal. Convex) $\mathbf{14}a_{q-2}$, $\mathbf{14}a_{q-1}$, $\mathbf{14}a_{q}$, $\mathbf{14}a_{q-1}$, . . . are arranged at a constant pitch with equally spaced gaps (in FIG. 17A, the signs of the vibrating side convexities $\mathbf{14}a_{q-1}$, $\mathbf{14}a_{q}$, $\mathbf{14}a_{q-1}$, and . . . are omitted). However, it is an example, and it is not always mandatory to configure multiple concentric hexagonal rings with the same gap and constant pitch. By making the gap and pitch of the multiple concentric hexagonal rings non-uniform, it is possible to broaden the frequency band of the acoustic element integrated circuit of the third embodiment. Each of the multiple vibrating side convexes $\mathbf{14}a_{q-2}$, $\mathbf{14}a_{q-1}$, $\mathbf{14}a_{q}$, $\mathbf{14}a_{q+1}$, . . . is similar to the cross-sectional structure of the outermost first and second vibrating side convexes $\mathbf{14}a_1$ and $\mathbf{14}a_2$ shown in the cross-sectional view focusing on the structure near the side wall insulating film 22 in FIG. 16, parallel to the vibration direction. It has vertical side walls.

As shown in FIG. 17A, each of the plurality of vibrating side convexes $\mathbf{14}a_{q-2}$, $\mathbf{14}a_{q-1}$, $\mathbf{14}a_{q}$, $\mathbf{14}a_{q+1}$, . . . is suspended and electrically connected under the three divided first vibrating electrode base 185, second vibrating electrode base 186, and third vibrating electrode base 187, arranged The feature of the structure in which the acoustic elements are arranged in a single vibrating electrode base 12 is different from the structure in which the acoustic elements for the first embodiment shown in FIG. 2B, etc. are provided in a single vibrating electrode base 12. In the acoustic element of the third embodiment, the three flat plate-shaped first, second, and third vibrating electrode bases 185, 186, and 187, which are divided into three parts and electrically at the same potential and have flat main surfaces, and the three first, second, and third vibrating electrode bases 185, 186, and 187, which are The integral structure of a plurality of vibrating side convex sections $\mathbf{14}a_{q-1}$, $\mathbf{14}a_{q}$, $\mathbf{14}a_{q+1}$, . . . suspended and connected to the lower surface is called a "stepped vibrating electrode". However, the three divisions are merely an example, and other divisions such as two or four or more can be used.

As shown in FIG. 17*a*, multiple vibrating side convexes $\mathbf{14}a_{q-2}$, $\mathbf{14}a_{q-1}$, $\mathbf{14}a_{q}$, $\mathbf{14}a_{q+1}$, . . . . In order to be sandwiched by the gap between each of the multiple wound-like opposing convex parts (second electrode side convex parts) forming another multiple concentric hexagonal ring $\mathbf{14}a_{q-2}$, $\mathbf{14}a_{q-1}$, $\mathbf{14}a_{q}$, $\mathbf{14}a_{q+1}$, . . . are arranged at a constant pitch with equally spaced gaps, and are cross-structured in cross-sectional structure with the plurality of vibrating side convex portions $14a_{q-2}$, $14a_{q-1}$, $14a_q$, $14a_{q+1}$, . . . in the first embodiment. (FIG. 17A is a schematic diagram focusing on the stepped vibration electrode, so the opposing side convex portions $14a_{q-2}$, $14a_{q-1}$, $14a_q$, $14a_{q+1}$, . . . are omitted from the diagram.). The cross-sectional view in FIG. 16 shows the outermost opposing stepped side wall $14a_0$ and the first opposing side convexity $14a_1$ on its inner side, but the respective structures of the other opposing side convexities $14a_{q-2}$, $14a_{p-1}$, $14a_q$, $14a_{p+1}$, . . . are also similar to the structures near the side wall insulation film 22 in FIG. 16 have vertical sidewalls parallel to the vibration direction.

Figure 17B:
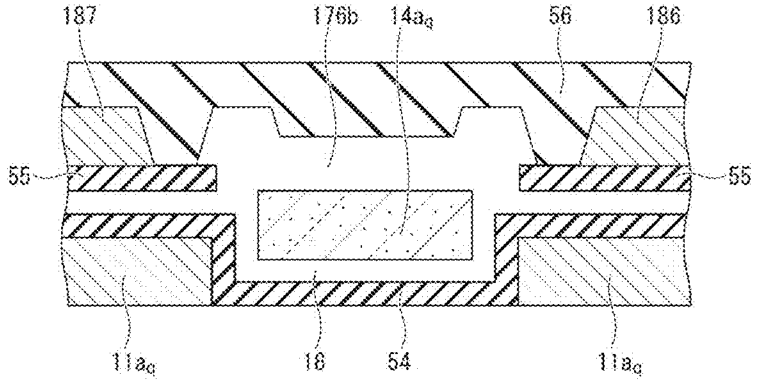
FIG. 17B is a cross-sectional view from the XVIIB-XVIIB direction of FIG. 17A.

In the acoustic element of the first embodiment, the corrosive medium flow paths 151, 152, 153 for introducing corrosive medium in forming the vibration cavity were configured at the same horizontal level as the plurality of opposing side convexities $11a_{p-1}$, $11a_p$, $1a_{p+1}$, . . . , so to speak, in a flat roof structure. In contrast, in the acoustic element of the third embodiment, the three first corrosive medium flow paths 175*b*, 176*b*, and 177*b*, which introduce corrosive medium as shown in FIG. 16, FIG. 17A, and FIG. 17B, are configured at the same level as the first vibration electrode base 185, second vibration electrode base 186, and third vibration electrode base 1 The three-partitioned first vibrating electrode base 185, second vibrating electrode base 186, and third vibrating electrode base 187 are electrically at the same potential and each has a flat main surface. They have a flat plate shape having a flat main surface.

Increase the number of first, second, and third corrosive medium channels 175*b*, 176*b*, and 177*b* to four or more by configuring three first, second, and third corrosive medium channels 175*b*, 176*b*, and 177*b* in the ceiling above the vibrating cavity 18 to form a three-dimensional structure, The conductance of the fluid can be increased. Also, even in the case of a dense spider web arrangement, the multiple hexagonal rings between the multiple oscillating side convexities $14a_{q-2}$, $14a_{q-1}$, $14a_q$, $14a_{q+1}$, . . . and the opposing side convexities $14a_{p+1}$, $14a_p$, $14a_{p+1}$, . . . . The reduction of the facing length can be avoided. That is, even with a microstructure in which $14a_{q-2}$, $14a_{q-1}$, $14a_q$, $14a_{q+1}$, . . . and opposing side convexities $14a_{p-1}$, $14a_p$, $14a_{p+1}$, . . . are arranged with a pitch of 400 nm in a cavity width of 120 μm Even with this, by increasing the number of first corrosive medium channels 175*b*, second corrosive medium channels 176*b*, and third corrosive medium channels 177*b* configured in the ceiling and the cross-sectional area of the fluid path, a bellows-like vibration cavity can be efficiently formed and a reduction in the opposing length can be avoided.

In the acoustic element according to the first embodiment shown in FIG. 2E and FIG. 6C, the vibration side dielectric layer 55 covered the surface of the vibration electrode base 12 and the vibration side convex portions $12a_{q-1}$, $12a_q$, $12a_{p+1}$, . . . . In contrast, in the acoustic element of the third embodiment, as shown in FIGS. 16 and 17*b*, the vibrating side convex portions $14a_{q-2}$, $14a_{q-1}$, $14a_q$, $14a_{q+1}$, . . . are composed of a low specific resistance dielectric such as impurity doped semiconductor, and the vibrating side convex portions $14a_{q-2}$, $14a_{q-1}$, $14a_q$, $14a_{q+1}$, and The fact that the surface of . . . is exposed to the interior of the vibrating cavity 18 is another feature that differs from the structure shown in FIG. 2E, etc. Although the acoustic element of the third embodiment exemplifies a structure with a convex part of a conductor, more generally, the vibration side convex part $14a_{q-2}$, $14a_{q-1}$, $14a_q$, $14a_{q+1}$, . . . , etc., as described in the sixth embodiment, is an insulator with a specific resistance $\rho \approx \infty$. A dielectric is fine.

The symbols for the normal direction capacitors $C_{udv1}$, $C_{udv2}$ and the non-normal direction capacitor $C_{udh}$ are omitted in FIG. 16, but as in FIG. 2E, the surfaces of the opposite side step side wall $11a_0$ and the first opposite side convexity $11a_1$, as well as the surfaces of the first vibrating side convexity $14a_1$ and the second vibrating side convexity $14a_2$ are, by Gauss' law The normal direction capacitors $C_{udv1}$, $C_{udv2}$ and the non-normal direction capacitor $C_{udh}$ are constituted by the induced true charges that are the starting and ending points of the lines of electric force of the vibrating cavity 18. The normal direction capacitors $C_{udv1}$ and $C_{udv2}$ mean that the lines of electric force extend in the direction normal to the main surfaces of the first electrode base (vibrating electrode base) 12 and the second electrode base (opposing electrode base) 11. In FIG. 16, the non-normal direction capacitor $C_{udh}$ has electric force lines extending in a direction perpendicular to the electric force lines extending in the direction normal to the main surfaces of the first and second electrode bases.

That is, it has already been mentioned that in the present disclosure, the "electrode" is defined as the portion of the surface of opposing areas of different potentials on which positive and negative true charges are induced by Gauss's law. Therefore, the surface of the low specific resistance dielectric that forms the convex part of the same potential electrically connected to the first vibrating electrode base 185, the second vibrating electrode base 186, and the third vibrating electrode base 187, respectively, is a part of the "vibrating side convex part" that functions as a part of an electrode, since a true charge is induced by Gauss's law. Although the figures are omitted, the opposing side convex hulls $11a_{p-2}$, $11a_{p-1}$, $11a_p$, $11a_{p+1}$, . . . are made of metal. In the case where the vibrating side convexities $14a_{q-2}$, $14a_{q-1}$, $14a_q$, $14a_{q+1}$, . . . are composed of a solid dielectric and the opposite side convexities $11a_{p-2}$, $11a_{p-1}$, $11a_p$, $11a_{p+1}$, . . . are composed of a metal, the vibrating side convexities $14a_{q-2}$, $14a_{q-1}$, $14a_q$, $14a_{q+1}$, . . . are set longer than the opposite side convex portions $11a_{p-2}$, $11a_{p-1}$, $11a_p$, $11a_{p+1}$, . . . , the vibration side convex portions $14a_{q-2}$, $14a_{q-1}$, $14a_q$, $14a_{q+1}$, . . . and the opposite side convexity $11a_{p-2}$, $11a_{p-1}$, $11a_p$, $11a_{p+1}$, . . . can prevent a short circuit between the metal electrodes.

The surface of the counter electrode base (second electrode base) 11 is coated with the counter side dielectric layer 54, but even if the counter side dielectric layer 54 is destroyed, there is a large contact resistance between the dielectric and the metal, and the dielectric also has resistance. Therefore, the vibration side convexes $14a_{q-2}$, $14a_{q-1}$, $14a_q$, $14a_{q+1}$, . . . made of solid dielectric can function as stoppers. Similar to the configuration described in the first and second embodiments, a vibrating electrode side convex portion of insulator can be provided at the center of the vibrating electrode side and a counter electrode side convex portion of insulator at the center of the counter electrode side, so that the tip of the counter electrode side convex portion and the tip of the vibrating electrode side convex portion collide with each other to act as a stopper. In this case, at least one of the opposing electrode side convexity and the vibrating electrode side convexity can function as a stopper if either one of them is composed of an insulator. Also, when the vibrating side convexes $14a_{q-2}$, $14a_{q-1}$, $14a_q$, $14a_{q+1}$, . . . are composed of a solid dielectric and the opposing side convexes $11a_{p-2}$, $11a_{p-1}$, $11a_p$, $11a_{p+1}$, . . . are composed of a metal, the large deflection Only the length of the vibration-side convexity near the center of the vibration cavity can function as a stopper even if it is locally set longer than the opposite-side convexity.

FIG. 16 shows the cross-sectional structure of the acoustic element of the third embodiment focusing on the peripheral side structure of the vibrating cavity. That is, the outermost first vibration side convex part 14$a_1$ is inserted between the recesses constituted by the outermost opposite side stepped side wall part 11$a_0$ and the first opposite side convex part 11$a_1$, which is the side wall structure, and the second vibration side convex part 14$a_2$ is inserted in the recess on the inner circumference of the first opposite side convex part 11$a_1$ to increase the normal direction capacitance $C_{udv1}$, $C_{udv2}$ and non-normal direction capacitance $C_{udh}$ are increased (see FIG. 2E for indications of $C_{udv1}$, $C_{udv2}$ and quantity $C_{udh}$). As illustrated in FIG. 16, the surface of the part of the opposing side stepped side wall 11$a_0$ exposed to the vibration cavity 18 and the surface of the first opposing side convex part 11$a_1$ as well as the top surface of the opposing electrode base 11 in the part where the opposing side stepped side wall 11$a_0$ and the first opposing side convex part 11$a_1$ are not located are coated with a dielectric film, such as silicon nitride film, comprising an opposing side dielectric The top surface of the opposite side dielectric layer 54 is coated with a dielectric film such as a silicon nitride film.

On the other hand, the surfaces of the first vibration-side convex part 14$a_1$ and the second vibration-side convex part 14$a_2$, which are composed of a solid dielectric, are exposed, but the underside of the third vibration electrode base 187 at the point where the first vibration-side convex part 14$a_1$ and the second vibration-side convex part 14$a_2$ are not located is covered by the vibration-side dielectric layer 55, which is composed of a dielectric film such as silicon nitride film The bottom surface of the third vibrating electrode base 187 is covered by a vibration side dielectric layer 55 consisting of a dielectric film such as silicon nitride film. The opposite side dielectric layer 54 and the vibration side dielectric layer 55 can be various high dielectrics, ferroelectrics, paraelectric materials, etc., as described in the latter part of the explanation of the basic concept at the beginning of this paper. A protective film 56 for the top surface of the vibrating electrode, such as a silicon oxide film, for example, is placed on the third vibrating electrode base 187. The sidewall insulating film base 21 is deposited on the top surface of the underlying insulating film 52 in such a manner as to embed the counter electrode base 11, and the sidewall insulating film 22 is deposited on the sidewall insulating film base 21 including the top surface of the edge of the counter electrode base 11. FIG. 16 focuses on the third vibrating electrode base 187, but even in the area not illustrated in FIG. 16, the lower surfaces of the first and second vibrating electrode bases 185 and 186 are covered with the vibrating side dielectric layer 55, as seen in FIGS. 17A and 17B.

FIG. 17B corresponds to a partial cross-sectional view along a direction orthogonal to the second corrosion medium flow path 176$b$ (XVIIB-XVIIB direction in FIG. 17A). That is, FIG. 17B corresponds to a cross-sectional view focusing on the qth vibrating side convexity 14$a_q$. In FIG. 17A, the hexagonal ring of the qth vibrating side convexity 14$a_q$ is surrounded as a concentric hexagonal ring by the qth opposing side convexity 11$a_q$, which is not shown in the plan view. The cross-sectional view in FIG. 17B shows the q opposing side convexity 11$a_q$ surrounding the q oscillating side convexity 14$a_q$ on the lower side of the paper. Although off the paper surface, further below the q-facing side convexity 11$a_q$ is a three-layer structure in which the device substrate 51, the underlying insulating film 52, and the protective film 53 on the underside of the opposing electrode are deposited, as shown in FIG. 16. In FIG. 16, the structure in which the top surface of the q opposing convex part 11$a_0$ and the first opposing convex part 14$a_1$ are covered with the opposing dielectric layer 54 is shown, while in FIG. 17B, the top surface of the q opposing convex part 11$a_q$, which is shown divided into two sides on the bottom side of the paper, is covered with the opposing dielectric layer 54. The two q opposing side convexities 11$a_q$, shown divided on both sides, are an integral structure connected on the front side of the paper in FIG. 17B.

The second corrosive medium flow path 176$b$, one of the three medium flow paths, is configured on top of the q vibrating side convex 14$a_q$ stored in the vibrating cavity 18. At the same horizontal level as this second corrosive medium flow path 176$b$, the second and third vibrating electrode bases 186 and 187 of the three divided vibrating electrode bases are shown spaced apart on either side of the second corrosive medium flow path 176$b$. As can be seen from the plan view in FIG. 17A, the second corrosive medium flow path 176$b$ flows perpendicular to the paper surface in FIG. 17B between the second and third vibrating electrode bases 186 and 187. The vibration side dielectric layer 55 covers the underside of the separately formed second and third vibrating electrode bases 186 and 187. As can be inferred from FIG. 17A, the qth vibrating side convexity 14$a_q$ is bridged to the lower surfaces of the second and third vibrating electrode bases 186 and 187 on both sides at the back of the paper surface in FIG. 17B. The qth vibration side convexity 14$a_q$ is electrically connected to the lower surfaces of the second and third vibration electrode bases 186 and 187 via contact holes in the vibration side dielectric layer 55 that covers the lower surfaces of the second and third vibration electrode bases 186 and 187. Therefore, the q vibrating side convex portion 14$a_q$, the second vibrating electrode base 186 and the third vibrating electrode base 187 constitute a substructure (14$a_q$, 186, 187) that forms part of the stepped type vibrating electrode.

=Method of Manufacturing an Acoustic Element in Accordance with the Third Embodiment=

Figure 18A:
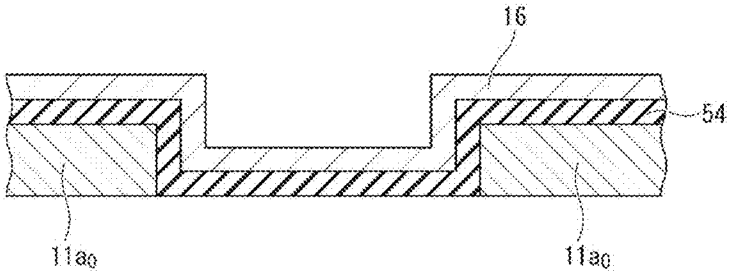
FIG. 18A is a process cross-sectional view illustrating an example of a manufacturing method of an acoustic element according to the third embodiment (Part 1).
Figure 18B:
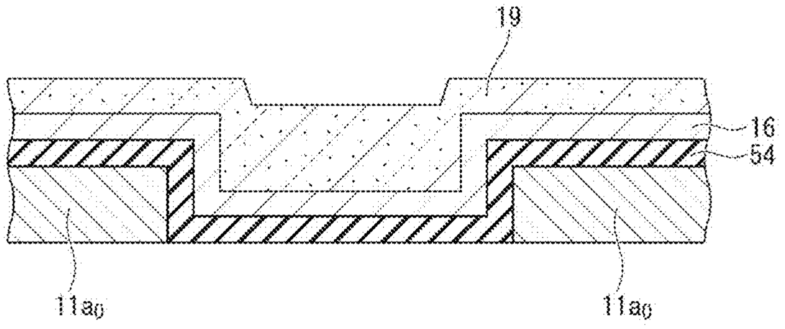
FIG. 18B is a process cross-sectional view illustrating an example of the manufacturing method of an acoustic element according to the third embodiment following the process of the cross-sectional structure illustrated in FIG. 18A.

FIG. 18A shows the stage of the process shown in FIG. 6D in the description of the manufacturing method of the acoustic element according to the first embodiment, namely, the state in which the sacrificial film 16 is deposited over the entire thickness of about 20 to 100 nm on the opposing side dielectric layer 54. As shown in FIG. 18A, the opposing side dielectric layer 54 and the sacrificial film 16 are formed along the concavo-convex shape constituted by the pattern of the opposing side convex part 11$a_p$ etc., and the concave part is sandwiched between the patterns of the opposing side convex parts 11$a_p$ on both sides. As in the manufacturing method for the acoustic element of the first embodiment, thereafter, the top surface of the opposing side dielectric layer 54 located on the top surface of the peripheral sidewall insulating film 22 is exposed by a photolithography process using a fifth photoresist film and dry etching techniques, and then a doping CV D method or the like is used to produce the DOPOS film shown in FIG. 18$b$ As shown in FIG. 18B, a dielectric film 19 such as a DOPOS film is formed over the entire surface of the sacrificial film 16 and the opposing dielectric layer 54 with a thickness of about 250 nm to 1000 nm. As shown in FIG. 18B, the opposing dielectric layer 54, sacrificial film 16, and dielectric film 19 are formed in a concave shape in the center along the concavo-convex shape constituted by the pattern of the opposing convex part 11$a_p$ etc., and the dielectric film 19 is embedded in the concave part sandwiched between the patterns of the opposing convex parts 11$a_p$ on both sides.

Figure 18C:
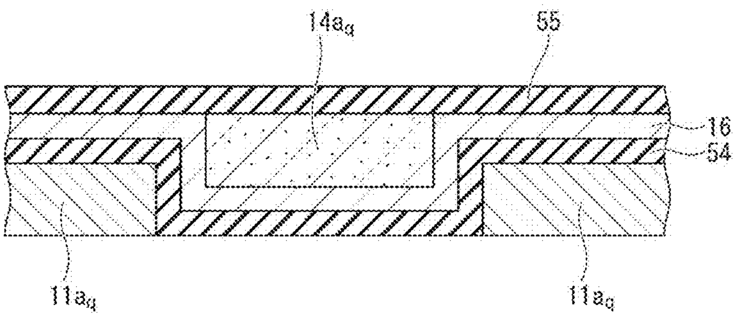
FIG. 18C is a process cross-sectional view illustrating exemplarily the method of manufacturing an acoustic element according to the third embodiment following the process of the cross-sectional structure illustrated in FIG. 18B.

Then, when the surface of the sacrificial film 16 is planarized by CMP or other techniques until the surface is exposed, the dielectric film 19 is embedded in the concave area constituted by the sacrificial film 16, and the pattern of the vibrating side convex part 14$a_q$ is cut out. Although the figure is omitted, other patterns such as 14$a_{q-2}$, 14$a_{q-1}$, 14$a_{q+1}$, and . . . are formed in the same way. Next, using a CVD method or the like, a vibration side dielectric layer 55 such as a silicon nitride film or the like is formed over the entire surface of the sacrificial film 16 with a thickness of about 50 nm to cover the patterns of the vibration side convex portions 14$a_{q-2}$, 14$a_{q-1}$, 14$a_q$, 14$a_{q+1}$, . . . as shown in FIG. 18C. The stage of the process cross section shown in FIG. 18C corresponds to the state of the cross section shown in FIG. 6D described in the manufacturing method of the acoustic element of the first embodiment.

Figure 18D:
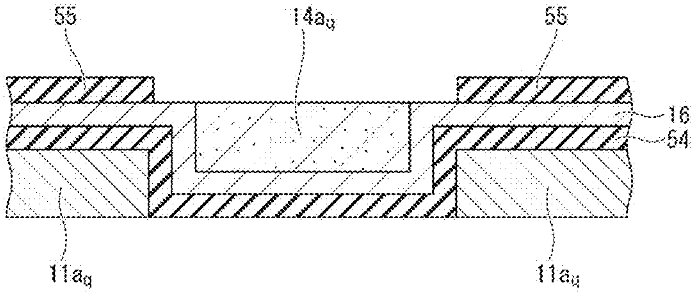
FIG. 18D is a process cross-sectional view illustrating exemplarily the method of manufacturing an acoustic element according to the third embodiment following the process of the cross-sectional structure illustrated in FIG. 18C.
Figure 18E:
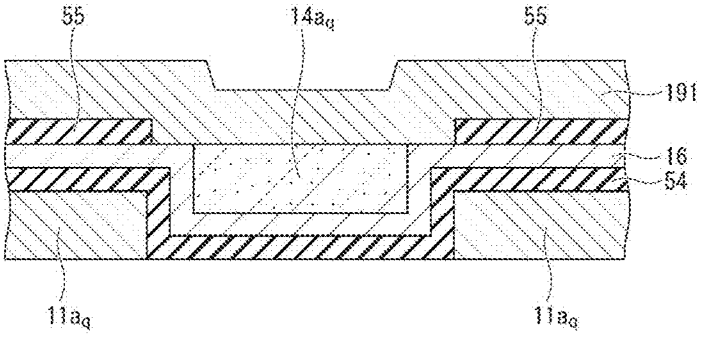
FIG. 18E is a process cross-sectional view illustrating exemplarily the method of manufacturing an acoustic element according to the third embodiment following the process of the cross-sectional structure illustrated in FIG. 18D.

Then, a sixth photoresist film is spin-coated over the entire surface to cover the top of the vibration-side dielectric layer 55, and the pattern forming the corrosion medium flow path and contact holes is exposed and developed. Then, using the pattern of the sixth photoresist film as an etching mask, selectively etch the vibrating side dielectric layer 55 by dry etching technique to selectively expose a portion of the top surface of the vibrating side convexity 14$a_q$, as shown in FIG. 18D. For the top surfaces of other vibration-side convex portions 14$a_{q-2}$, 14$a_{q-1}$, 14$a_{q+1}$, and . . . not shown in FIG. 18D, a portion of the top surface is selectively exposed in the same manner. Although not shown in FIG. 18D, contact holes are opened in the vibration side dielectric layer 55 located on the top surface of the vibration side convex part 14$a_q$ at the far side of the paper. After removal of the sixth photoresist film, a third conductive film 191 such as a W film is formed over the entire surface with a thickness of 100 to 1000 nm, as shown in FIG. 18E. Although not shown in FIG. 18D, the third conductive film 191 is electrically connected to the top surface of the vibration side convexity 14$a_q$ via contact holes opened in the vibration side dielectric layer 55 at the far side of the paper.

Figure 18F:
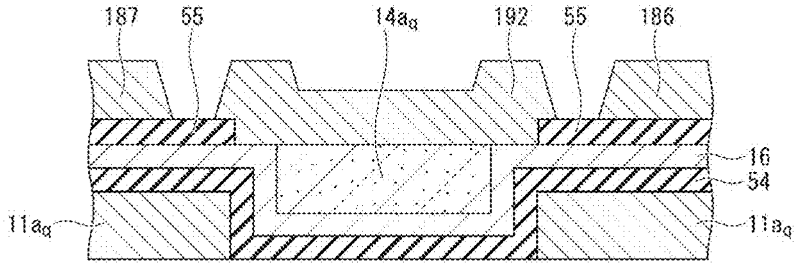
FIG. 18F is a process cross-sectional view illustrating exemplarily the method of manufacturing an acoustic element according to the third embodiment following the process of the cross-sectional structure illustrated in FIG. 18E.

Then, a seventh photoresist film is spin-coated over the entire surface to cover the third conductive film 191, and as shown in FIG. 17A, the three first, second, and third vibrating electrode bases 185, 186, and 187, and the three first corrosive medium channels 175*b*, 176*b* and the third corrosive medium channel 177*b* are exposed and developed to separate the third conductive film 191 from the pattern of the first corrosive medium channel 175*b*, the second corrosive medium channel 176*b*, and the third corrosive medium channel 177*b*. Then, using the pattern of the seventh photoresist film as an etching mask, selectively etching the third conductive film 191 by dry etching technique, as shown in FIG. 18F, the second and third vibrating electrode base 186 and the third vibrating electrode base 187 and the second corrosive medium flow path formation pattern 192 sandwiched between the second vibration electrode base 186 and the third vibration electrode base 187, as shown in FIG. 18F.

Figure 18G:
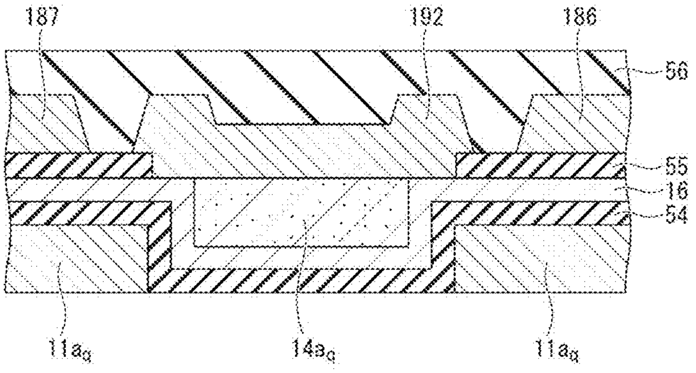
FIG. 18G is a process cross-sectional view illustrating exemplarily the method of manufacturing an acoustic element according to the third embodiment following the process of the cross-sectional structure illustrated in FIG. 18F.

Next, as shown in FIG. 18G, a vibrating electrode protective film underlayer such as silicon oxide film is formed over the entire surface with a thickness of about 50 nm on the dielectric film 19 and on the second and third vibrating electrode bases 186 and 187, respectively, using a CVD method or the like. The vibrating electrode protective film base layer is an insulating film that constitutes the vibrating electrode top protective film 56 as a composite film in a subsequent process. The eighth photoresist film is spin-coated over the entire surface to cover the vibrating electrode protective film base layer, and the pattern of holes for cavity formation is exposed and developed by mask matching. Then, using the pattern of the eighth photoresist film as an etching mask, the vibration electrode protective film base layer is opened by dry etching technique to expose part of the top surface of the second corrosive medium flow path formation pattern 192 and open the hole for cavity formation.

When a corrosive medium such as hydrogen peroxide solution is introduced as an etchant through the cavity forming holes, the second corrosive medium flow path forming pattern 192 is etched away to form the second corrosive medium flow path 176*b*. At the far side of the paper in FIG. 18G, the first corrosion medium flow path 175*b* and the third corrosion medium flow path 177*b* are formed in the same way. Once the second corrosion medium channel 176*b* is formed, the sacrificial film 16 is etched away via the second corrosion medium channel 176*b* to form the vibrating cavity 18 as shown in FIG. 17B.

If the etching medium is a liquid, when the process of removing the sacrificial film 16 is completed, the etching medium cleaning process is transferred to the etching medium cleaning process using a cleaning solution. After the etchant cleaning process is completed, the cleaning solution is vaporized. After vaporization of the cleaning solution, a main protective layer, which is the remaining part of the protective film 56 on the top surface of the vibrating electrode, is deposited on the entire surface of the vibrating electrode using a CVD method or the like, with a thickness of 150 to 1000 nm. By depositing the main protective layer on top of the vibrating electrode protective film underlayer under reduced pressure, a plug is provided at the entrance of the hole for cavity formation, and the vibrating cavity 18 is vacuum-sealed. The composite film of the vibrating electrode protective film base layer and the main protective layer makes up the protective film 56 on the top surface of the vibrating electrode shown in FIG. 18*h*, completing the acoustic element of the third embodiment, as illustrated in the cross-sectional structure in FIG. 17B.

Fourth Embodiment

Figure 19:
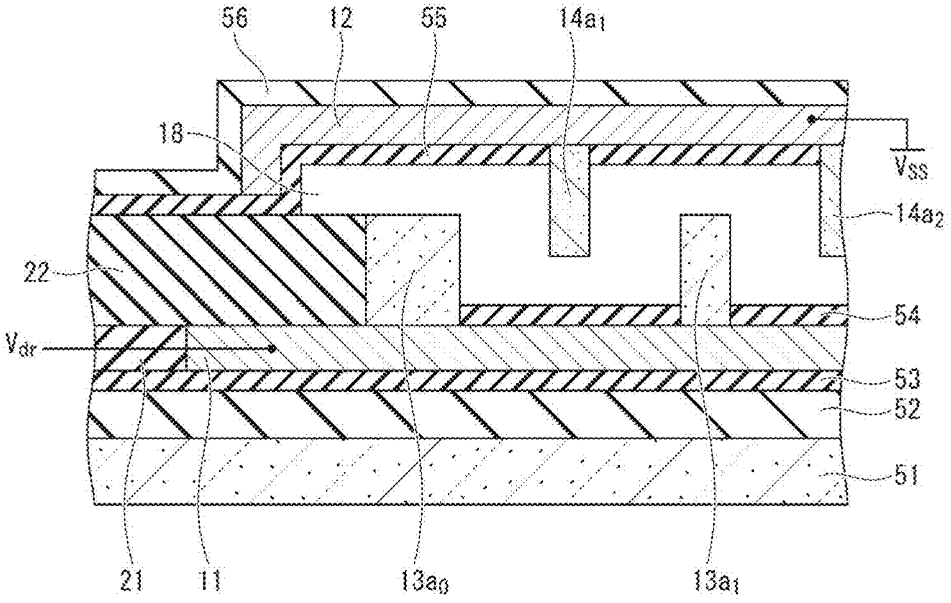
FIG. 19 is a schematic cross-sectional view illustrating a schematic of the acoustic element according to the fourth and fifth embodiments, focusing on the structure on the peripheral side of the vibrating cavity.

As explained in the introduction, the fourth embodiment of the present disclosure is mainly explained for the case where the opposite side convexity and the vibrating side convexity are conductive. FIG. 19 shows the cross-sectional structure of the acoustic element of the fourth embodiment focusing on the peripheral side structure of the vibrating cavity. That is, as in FIG. 2E, FIG. 13, and FIG. 16, etc. it is based on a three-layer structure in which a base insulating film 52 is deposited on the device substrate 51, and a protective film 53 on the lower surface of the counter electrode is deposited on top of the base insulating film 52. The outermost opposing side step side wall portion 13$a_0$ and the first opposing side convex portion 13$a_1$, which are the side wall structures of the acoustic element of the fourth embodiment, are composed of a low specific resistance dielectric such as a DOPOS film. And the outermost first vibration side convex portion 14$a_1$ is inserted between the recesses constituted by the opposing side step side wall 13$a_0$ and the first opposing side convex portion 13$a_1$, and the second vibration side convex portion 14$a_2$ is inserted in the inner recess of the first opposing side convex portion 13$a_1$, but the first vibration side convex portion 14$a_1$ and the second vibration side convex portion 14$a_2$ are also made of low resistivity dielectric like DOPOS film It is composed of a low-resistance dielectric material such as a DOPOS film.

The symbols for the normal direction capacitors $C_{udv1}$, $C_{udv2}$ and the non-normal direction capacitor $C_{udh}$ are omitted in FIG. 19, but as in FIG. 2E, the surfaces of the opposing step side wall 13$a_0$ and the first opposing convexity 13$a_1$, as well as the surfaces of the first vibrating convexity 14$a_1$ and the second vibrating convexity 14$a_2$ are, by Gauss' law The normal direction capacitors $C_{udv1}$, $C_{udv2}$ and the non-normal direction capacitor $C_{udh}$ are constituted by the induced true charges that are the starting and ending points of the lines of electric force of the vibrating cavity 18. The normal direction capacitors $C_{udv1}$, $C_{udv2}$ mean that the lines of electric force extend in the direction normal to the main surfaces of the first electrode base (vibrating electrode base) 12 and the second electrode base (opposing electrode base) 11. In FIG. 19, the non-normal direction capacitor $C_{udh}$ has electric force lines extending in a direction perpendicular to the electric force lines extending in the direction normal to the principal surfaces of the first and second electrode bases.

As illustrated in FIG. 19, the surfaces of the opposing side step side wall 13$a_0$ and the first opposing side convex portion 13$a_1$ are exposed, but the top surface of the opposing electrode base 11 at the point where the opposing side step side wall 13$a_0$ and the first opposing side convex portion 13$a_1$ are not located is covered with an opposing side dielectric layer 54 such as silicon oxide film. In addition, the surfaces of the first vibrating side convex part 14$a_1$ and the second vibrating side convex part 14$a_2$, which are composed of a solid dielectric, are exposed, while the lower surface of the vibrating electrode base 12 at the locations where the first and second vibrating side convex parts 14$a_{12}$ are not located is covered by a vibrating side dielectric layer 55, which consists of a dielectric film such as a silicon nitride film The dielectric layer 55 is a dielectric film such as a silicon nitride film. A protective film 56 on the top surface of the vibrating electrode, such as a silicon oxide film, is placed on the vibrating electrode base 12. The side wall of the cavity has a composite structure of a side wall insulating film base layer 21 such as a silicon oxide film and a side wall insulating film 22 such as a silicon oxide film deposited on top of the side wall insulating film base layer 21.

As already mentioned, when the vibrating side convex part 12$a_{q-1}$, 12$a_q$, 12$a_{q+1}$, . . . and the opposite side convex part 11$a_{p-1}$, 11$a_p$, 11$a_{p+1}$, . . . are composed of metal, there is a possibility of short circuit between metal electrodes. The surfaces of the convex portions 12$a_{q-1}$, 12$a_q$, 12$a_{q+1}$, . . . are covered with a vibration side dielectric layer 55, and the surfaces of the opposite side convex portions 11$a_{p-1}$, 11$a_p$, 11$a_{p+1}$, . . . had to be coated with the opposing dielectric layer 54. As shown in FIG. 19, when the opposing side step side wall 13$a_0$, the first opposing side convex portion 13$a_1$, the first vibrating side convex portion 14$a_1$ and the second vibrating side convex portion 14$a_2$ are composed of solid low resistivity dielectric, it is possible to expose the surface of the low resistivity dielectric to the vibrating cavity 18.

In the description of the first and second embodiments, the opposing convexes 11$a_{p-1}$, 11$a_p$, 11$a_{p+1}$, . . . and the opposing convexes 13$a_{p-1}$, 13$a_p$, 13$a_{p+1}$, . . . are dielectrics with a specific resistance ρ≤3 Ω·cm as conductors. The case in which a dielectric with a specific resistance of ρ≤3 Ω·cm is used as a conductor is described. In the explanation of the first and third embodiments, we also described the case where the convex part on the vibration side 12$a_{q-1}$, 12$a_q$, 12$a_{q+1}$, . . . and the convex part on the vibration side 14$a_{q-2}$, 14$a_{q-1}$, 14$a_q$, 14$a_q$+, . . . use a dielectric of specific resistance ρ≤3 Ω·cm as conductor. The case in which a dielectric with a specific resistance ρ≤3 Ω·cm is used as a conductor is described. The acoustic element of the fourth embodiment is an example of a case in which the opposing side step side wall 13$a_0$, the first opposing side convex portion 13$a_1$, the first vibrating side convex portion 14$a_1$ and the second vibrating side convex portion 14$a_2$ all use a dielectric of specific resistance ρ≤about 3 Ω·cm as a conductor.

That is, the acoustic element of the fourth embodiment consists mainly of a first electrode base, a convex part made of a dielectric having a first step sidewall made of a plane inclined at an inclination angle of 45° or less with respect to the vibration direction and installed in the first electrode base, a convex part made of a conductive body having a second step sidewall made of a plane inclined at the same angle as the first step sidewall and facing the first electrode base to form a capacitor, and a second electrode base. The convex part made of conductive material having a second step sidewall made of a plane and inclined at the same angle as the first step sidewall, and the second electrode base opposite the first electrode base with the convex part made of conductive material disposed thereon can be major components of the capacitor. The first electrode base can be the vibrating electrode base 12, the first vibrating electrode base 185, the second vibrating electrode base 186, and the third vibrating electrode base 187 described above, or conversely the opposing electrode base 11, the first opposing electrode base 111, the second opposing electrode base 112, and the third opposing electrode base 113.

In the acoustic element of the fourth embodiment, when the first electrode base is the vibrating electrode base 12 or the first vibrating electrode base 185, the second vibrating electrode base 186 and the third vibrating electrode base 187, the second electrode base is the counter electrode base 11 or the first counter electrode base 111, the second counter electrode base 112 and the third counter electrode base 113. The second electrode base becomes Conversely, if the first electrode base is the opposite electrode base 11, the first opposite electrode base 111, the second opposite electrode base 112, and the third opposite electrode base 113, the second electrode base becomes the vibration electrode base 12, the first vibration electrode base 185, the second vibration electrode base 186, and the third vibration electrode base 187. The voltage applied between the first and second electrode bases causes the first or second electrode base to vibrate in the vibration direction.

Furthermore, as illustrated in FIG. 1, it is possible to distribute a transmitting cell whose convex part is composed of a dielectric with a specific resistance ρ≤3 Ω·cm in a specific number of units, even if the above is described above in an acoustic device integrated circuit in which a plurality of cells, each distributed with a unit number of capacitive-type acoustic elements, are arranged two dimensionally on the same curved surface. Each of the plurality of transmitting cells consists of a first electrode base, a convex part provided on the first electrode base and made of a dielectric of about specific resistance ρ≤3 Ω·cm having a first stepped sidewall comprising a planar surface at an inclination angle inclined within 45° to the vibration direction, a first stepped sidewall facing the first electrode base to form a capacitor and convex portion comprising a dielectric having a second stepped sidewall comprising a plane inclined at the same angle of inclination and having a specific resistance ρ≤3 Ω·cm, and a second electrode base opposite to the first electrode base, in which the convex portion comprising the dielectric is arranged. In each of the transmitting cells of the acoustic device integrated circuit of the fourth embodiment, the first electrode base or the second electrode base vibrates in the vibration direction by the voltage applied between the first electrode base and the second electrode base.

Fifth Embodiment

As explained in the basic concept of the present disclosure, the vibrating side convex part (first electrode side convex part) and the opposing side convex part (second electrode side convex part) can be conductors with low specific resistance ρ or almost perfect insulators (ρ≈∞). For this reason, as explained in the introduction, the first through fourth embodiments of the present disclosure were mainly explained for the case where the opposing convexity and the vibrating convexity are conductors, while the fifth embodiment of the present disclosure is mainly and exemplarily explained for the case where the opposing convexity and the vibrating convexity are almost perfect insulators. As the subject of the simulations in FIGS. 3 to 5, the vibrating side convexity and the opposing side convexity can also be composed of an almost perfect insulator with low specific resistance ρ≈∞.

FIG. 19 is the cross-sectional structure referred to in the acoustic element pertaining to the fourth embodiment, which focuses on the structure of the peripheral side of the vibrating cavity. The acoustic element pertaining to the fifth embodiment, in which the opposing side convexity and vibrating side convexity are almost completely insulators, is also commonly referred to and explained, since the materials of the opposing side convexity and vibrating side convexity are only different. In the structure illustrated in FIG. 2E, the acoustic element pertaining to the fifth embodiment has a thicker portion located at the side wall of the opposing dielectric layer 54 and the vibrating side dielectric layer 55, and the width of the vibrating side convex portion and the opposing side convex portion (see width of convex portion $x_0$ defined in FIG. 22(*a*).) The structure can be contrasted with the narrow structure. That is, as in the case of the structure with the convex part of the conductor in FIG. 2E, FIG. 13 and FIG. 16, etc., the acoustic element pertaining to the fifth embodiment is based on a three-layer structure in which a base insulating film 52 is deposited on the device substrate 51 and a protective film 53 on the lower surface of the opposing electrode is further deposited on the base insulating film 52, as shown in FIG. 19. However, it differs from the acoustic element of the fourth embodiment in that the outermost opposing side step side wall portion 13$a_0$ and the first opposing side convex portion 13$a_1$, which are the side wall structures of the acoustic element of the fifth embodiment, are composed of an almost perfect insulator with low specific resistance ρ≈∞. And the outermost first vibration side convex portion 14$a_1$ is inserted between the recesses constituted by the opposing side step side wall 13$a_0$ and the first opposing side convex portion 13$a_1$, and the second vibration side convex portion 14$a_2$ is inserted in the inner recess of the first opposing side convex portion 13$a_1$, but the first vibration side convex portion 14$a_1$ and the second vibration side convex portion 14$a_2$ also have a low specific resistance ρ≈∞ almost completely, They are composed of an insulator.

The symbols of the normal direction capacitors $C_{udv1}$, $C_{udv2}$ are omitted in FIG. 19, but as in FIG. 2E, the surfaces of the opposing step side wall 13$a_0$ and the first opposing convexity 13$a_1$, as well as the surfaces of the first vibrating side convexity 14$a_1$ and the second vibrating side convexity 14$a_2$, have the electrical force lines of the vibrating cavity 18 by Gauss' law The true charges, which are the starting and ending points, are induced to form the normal direction capacitors $C_{udv1}$ and $C_{udv2}$. If the relative permittivity of the opposing side step side wall 13$a_0$, the first opposing side convex 13$a_1$, the first vibrating side convex 14$a_1$ and the second vibrating side convex 14$a_2$ is $\varepsilon_1$ and the relative permittivity of the vibrating cavity 18 is $\varepsilon_2$, then as explained in the basic concept, if $\varepsilon_2 \ll \varepsilon_1$, The electric field is weakened inside the opposed side stepped side wall portion 13$a_0$, the first opposed side convex portion 13$a_1$, the first vibrating side convex portion 14$a_1$ and the second vibrating side convex portion 14$a_2$ by $\varepsilon_1/\varepsilon_2$ and the distribution profile of equipotential lines is distorted.

If $\varepsilon_2 \ll \varepsilon_1$ and the gap between the opposing step side wall 13$a_0$ and the first vibrating side convexity 14$a_1$, between the first opposing side convexity 13$a_1$ and the first vibrating side convexity 14$a_1$, or between the first opposing side convexity 13$a_1$ and the second vibrating side convexity 14$a_2$ is narrow, the distribution profile of equipotential lines is distorted, resulting in a distortion of the equipotential lines at gaps with a relative permittivity $\varepsilon_2$. The slope of the potential lines becomes a steeply sloping profile close to the vertical direction. Since the electric flux is in the direction normal to the equipotential lines, between the opposing step side wall 13$a_0$ and the first vibrating side convex 14$a_1$, between the first opposing side convex 13$a_1$ and the first vibrating side convex 14$a_1$, or between the first opposing side convex 13$a$, and the second vibrating side convex 14$a_2$, the electric flux and lines of electric force inclined toward the near horizontal direction are generated and the electric flux and electric force lines are bent. That is, to include the obliquely inclined electric lines of force generated between opposing step side wall 13$a_0$ and first vibrating side convexity 14$a_1$, between first opposing side convexity 13$a_1$ and first vibrating side convexity 14$a_1$, or between first opposing side convexity 13$a_1$ and second vibrating side convexity 14$a_2$, which pass through opposing step side wall 13$a_0$ and first opposing side convexity 13$a$, to and the electrical force lines bend in a path out to the vibrating cavity and into the interior of the first vibrating side convexity 14$a_1$ and the second vibrating side convexity 14$a_2$. That is, in the power element of the fifth embodiment, a non-normal direction capacitor is formed inside the vibrating cavity, relying on electrical force lines that are bent with respect to the normal direction of the main surfaces of the first and second electrode base portions. Part of the slope of the electric lines of force provided by the non-normal direction capacitor formed in the power element of the fifth embodiment is a situation that is almost similar to the slope of the electric lines of force of the non-normal direction capacitor in the case of the conductor shown in FIG. 2E. Therefore, as explained using FIGS. 3 to 5, even in the case of an almost perfect insulator (ρ≈∞), the electrostatic energy in the vibrating cavity containing the non-normal directional capacitor can be increased and the attraction force can be increased, so that the transmitted sound pressure, as with the acoustic element using the convexity of the conductor in the first to fourth embodiments The increase in transmitted sound pressure can be achieved.

As illustrated in FIG. 19, the surfaces of the opposing side step side wall 13$a_0$ and the first opposing side convex portion 13$a_1$ are exposed, but the top surface of the opposing electrode base (second electrode base) 11 at the point where the opposing side step side wall 13$a_0$ and the first opposing side convex portion 13$a_1$ are not located is covered with an opposing side dielectric layer 54 such as silicon oxide film. In addition, the surfaces of the first vibration-side convex part 14$a_1$ and the second vibration-side convex part 14$a_2$, which are composed of a solid dielectric, are exposed, but the lower surface of the vibration electrode base (first electrode base) 12 at the locations where the first vibration-side convex part 14$a_1$ and the second vibration-side convex part 14$a_2$ are not disposed is covered by a vibration-side dielectric layer 55 The bottom surface of the vibrating electrode base 12 is covered by a dielectric film such as a silicon nitride film. A protective film 56 on the top surface of the vibrating electrode, such as a silicon oxide film, is placed on the vibrating electrode base 12. The side wall of the cavity has a composite structure of a side wall insulating film base layer 21 such as a silicon oxide film and a side wall insulating film 22 such as a silicon oxide film deposited on top of this side wall insulating film base layer 21. In the acoustic element pertaining to the fifth embodiment, the vibrating electrode base 12 is referred to as "first electrode base 12," the opposite electrode base 11 is referred to as "second electrode base 11." the convex part on the vibrating side is referred to as "first electrode side convex part" and the convex part on the opposite side as "second electrode side convex part" but this is merely a selection for the convenience of explanation. It is also possible to select a name for the vibrating electrode base defined in the fifth embodiment of the acoustic element, which is referred to as the "second electrode base," the opposing electrode base as the "first electrode base," the vibrating side convex part as the "second electrode side convex part" and the opposing side convex part as the "first electrode side convex part.

As explained in the first through fourth embodiments, when the vibrating side convex portions $\mathbf{12}a_{q-1}$, $\mathbf{12}a_q$, $\mathbf{12}a_{q+1}$, . . . and the opposing side convex portions $\mathbf{11}a_{p-1}$, $\mathbf{11}a_p$, $\mathbf{11}a_{p+1}$, . . . are made of metal, the fear of short circuit between the metal electrodes Since there is a risk of short-circuit between metal electrodes, the surfaces of the vibration side convex portions $\mathbf{12}a_{q-1}$, $\mathbf{12}a_q$, $\mathbf{12}a_{q+1}$, . . . are covered with a vibration side dielectric layer 55 and the surfaces of the opposite side convex portions $\mathbf{11}a_{p-1}$, $\mathbf{11}a_p$, $\mathbf{11}a_{p+1}$, . . . surfaces had to be coated with the opposing side dielectric layer 54. As shown in FIG. 19. when the opposing side step side wall $\mathbf{13}a_0$, the first opposing side convex part $\mathbf{13}a_1$, the first vibrating side convex part $\mathbf{14}a_1$ and the second vibrating side convex part $\mathbf{14}a_2$ are composed of solid dielectric, it is possible to expose the surface of the solid dielectric to the vibrating cavity 18.

Furthermore, as illustrated in FIG. 1, it is possible to distribute a specific number of cells for transmission in which the dielectric comprising the convex part is composed of an almost perfect insulator (ρ≈∞), even in an acoustic device integrated circuit in which a plurality of cells, each distributed with a unit number of capacitive acoustic elements, are arranged two dimensionally on the same curved surface The number of cells can be distributed in a specific number of units. Each of the plurality of transmitting cells consists of a vibrating electrode base, a vibrating side convexity made of a dielectric having a first step sidewall comprising a planar surface at an inclination angle inclined within 45° to the vibration direction, and a second step sidewall opposite the vibrating electrode base so as to form a capacitor and inclined at the same inclination angle as the first step sidewall The opposite side convex part made of a dielectric having a second stepped sidewall made of a planar surface, and the opposite electrode base part, which is located on the opposite side convex part and opposite to the vibrating electrode base part.

Here, the vibrating side convex part comprising a dielectric having a first step sidewall and the opposing side convex part comprising a dielectric having a second step sidewall may be almost perfect insulators (ρ≈∞), respectively. In each of the transmitting cells of the acoustic device integrated circuit of the fifth embodiment, the voltage applied between the first and second electrode bases causes the first or second electrode base to vibrate in the direction of vibration.

Sixth Embodiment

In this illustrative description of the acoustic element of the sixth embodiment of the present disclosure, we will mainly discuss the case in which either the opposing convexity or the vibrating convexity is an almost perfect insulator (ρ≈∞), or a situation equivalent to a perfect insulator. In other words, we will mainly discuss the case where the opposing convexity shown in FIG. 13 or the vibrating convexity shown in FIG. 16 is replaced by an almost perfect insulator, or the case of an electrical connection where the opposing convexity shown in FIG. 13 or the vibrating convexity shown in FIG. 16 is equivalent to a perfect insulator. The case where the vibrating side convexity shown in FIG. 16 is replaced by a perfect insulator corresponds to the structure of FIG. 23 described at the beginning of this paper.

For example, in the structure shown in FIG. 13, the opposing side convex part made of low resistivity dielectric was electrically connected to the third opposing electrode base 113, one of the split electrodes, through a contact hole (outside or behind the paper surface in FIG. 16, the other split electrodes, the first and second opposing electrode bases 111 and 112 (It is assumed that the vibrating side convex part of the hexagonal ring structure is connected in common). In contrast, "a situation equivalent to a perfect insulator" means a situation where there are no contact holes electrically connecting the opposing side convexes, i.e., where the low resistivity dielectric is in a floating state, etc. Similarly, in the structure shown in FIG. 16, the vibrating side convex portion made of low resistivity dielectric was electrically connected to the first vibrating electrode base 185, one of the split electrodes, via a contact hole, but there is no contact hole electrically connecting the vibrating side convex portion, meaning a case where the low resistivity dielectric is in a floating state, etc. (It is assumed that the vibration side convex part of the hexagonal ring structure is commonly connected to the other split electrodes, the second vibration electrode base 186 and the third vibration electrode base 187, outside or behind the paper surface in FIG. 16). That is, even a low resistivity dielectric exhibits behavior equivalent to that of an insulator if it is electrically floating. In the case of a low resistivity dielectric, the electric field inside the dielectric is not generated or is extremely small, which is equivalent to the effective narrowing of the distance between the dielectric and the insulator. However, in order to exhibit the behavior equivalent to that of an insulator, it is more desirable for the dielectric that serves as the opposite or oscillating convexity to have a relatively high specific resistance ρ of 1 kΩ·cm or more, since it is easier to dielectrically polarize it.

The acoustic element of the sixth embodiment comprises a first electrode base, a first electrode side convex portion provided on the first electrode base and comprising a dielectric having a first step side wall comprising a plane with an inclination angle inclined within 45° to the vibration direction, a second electrode side convex portion comprising a conductor having a second step side wall opposite the first electrode base so as to form a capacitor and having the same inclination angle as the first step side wall, and a second electrode side convex portion comprising the conductor. The second electrode side convexity made of a conductive material having a second step sidewall made of a planar surface having the same inclination angle as the first step sidewall, and the second electrode side convexity made of the conductive material can be arranged, and the second electrode base opposite the first electrode base can be a major component of the first electrode base. That is, the case of a structure in which either the vibrating side convex part, which is the first electrode side convex part, or the opposing side convex part is an almost perfect insulator with low specific resistance $\rho \approx \infty$, and the opposing second electrode side convex part is made of an electrical conductive body.

As shown in FIG. 23, when the vibrating side convexity 12$c_{ij}$ is formed as an insulator convexity, the electric flux passes from the side wall of the convexity (opposing side convexity) of the stepped opposing electrode 1$a$ to the inside of the vibrating side convexity 12$c_{ij}$ and reaches the vibrating electrode base 12. FIG. 23 shows the case of $\varepsilon_1 \approx \varepsilon_2$, but the electric flux is allowed to reach the vibrating electrode base 12 from the side wall of the opposite side convexity through the vibrating side convexity 12$c_{ij}$. $\varepsilon_2 << \varepsilon_1$, the equipotential lines inside the vibrating side convexity 12$c_{ij}$ are stretched in the vertical direction and the distribution profile of the equipotential lines is distorted. The distortion of the distribution profile of equipotential lines increases the electric flux reaching the vibrating electrode base 12 from the side wall of the opposing side convexity through the vibrating side convexity 12$c_{ij}$ and the slope of the electric flux between the gaps with relative permittivity $\varepsilon_2$ becomes close to horizontal. That is, an oblique direction of electric lines of force is generated between the side wall of the opposing side convexity and the side wall of the vibrating side convexity 12$c_{ij}$.

Besides the normal direction capacitor $C_{udv1}$ between the base 12 of the vibrating electrode and the top of the opposite side convex shown in FIG. 23 and the normal direction capacitor $C_{udv2}$ via the vibrating side convex 12$c_{ij}$, which is an insulator inserted between the concave part of the stepped opposite electrode 1$a$ and the vibrating electrode base 12, an electric force line inclined at an angle to the normal direction, which is at least partially The non-normal direction capacitor is composed of a non-normal direction capacitor that relies on an electric force line inclined oblique to the normal direction. Similar to FIG. 23, in the case where the opposing convexity shown in FIG. 13 is replaced by a complete insulator, in addition to the normal direction capacitor between the base of the opposing electrode and the top of the vibrating side convexity and the normal direction capacitor through the opposing convexity, an insulator inserted between the recess of the stepped vibration electrode and the base of the opposing electrode, the sidewall of the opposing convexity The electrostatic energy is increased by a non-normal direction capacitor that at least partially relies on the oblique directional lines of electric force generated between the side wall of the opposing convexity and the side wall of the vibrating convexity. The increase in electrostatic energy increases the attraction between the base of the vibrating electrode and the base of the counter electrode, which increases the transmission pressure.

In the acoustic element of the sixth embodiment, the first electrode base may be the single vibrating electrode base 12 described in the acoustic element of the first embodiment, or it may be the split structure of the first, second and third vibrating electrode bases 185, 186 and 187 described in the acoustic element of the third embodiment. However, in FIG. 13. the first counter electrode base 111, second counter electrode base 112, and third counter electrode base 113, which are split electrodes, are shown, but a single counter electrode base is also acceptable. The counter electrode base may be the single counter electrode base 11 described in the acoustic element of the first embodiment, or it may be the split structure of the first counter electrode base 111. second counter electrode base 112. and third counter electrode base 113 described in the acoustic element of the third embodiment. However, the structure shown in FIG. 16 was electrically connected to the split electrodes, the first vibrating electrode base 185, the second vibrating electrode base 186, and the third vibrating electrode base 187, but a single vibrating electrode base is also acceptable.

In the acoustic element of the sixth embodiment, when the first electrode base is the vibrating electrode base 12 or the first vibrating electrode base 185, the second vibrating electrode base 186, and the third vibrating electrode base 187, the second electrode base is the opposing electrode base 11 or the first opposing electrode base 111, the second opposing electrode base 112, and the third opposing electrode base 113. The second electrode base becomes Conversely, if the first electrode base is the opposite electrode base 11, the first opposite electrode base 111, the second opposite electrode base 112, and the third opposite electrode base 113, the second electrode base becomes the vibration electrode base 12, the first vibration electrode base 185, the second vibration electrode base 186, and the third vibration electrode base 187. The voltage applied between the first and second electrode bases causes the first or second electrode base to vibrate in the vibration direction.

Furthermore, as illustrated in FIG. 1, even if the above is applied to an acoustic device integrated circuit in which a plurality of cells, each of which is distributed with a unit number of capacitive acoustic elements, are arranged in two dimensions on the same curved surface, a cell for transmission in which the dielectric constituting the convex part is composed of an almost perfect insulator ($\rho \approx \infty$) is distributed with a specific unit number. It is possible to do this. Each of the plurality of transmitting cells consists of a first electrode base, a convex portion comprising a dielectric having a first step sidewall comprising a plane with an inclination angle inclined within 45° to the vibration direction, a second step sidewall opposite the first electrode base so as to form a capacitor and inclined with the same inclination angle as the first step sidewall The convex part is made of a conductive material having a second step sidewall that is inclined at the same inclination angle as the first step sidewall, and the convex part made of the conductive material is arranged on the second electrode base opposite the first electrode base, but the convex part made of a dielectric material having the first step sidewall may be an almost perfect insulator ($\rho \approx \infty$). In each of the transmitting cells of the acoustic device integrated circuit of the sixth embodiment, the voltage applied between the first and second electrode bases causes the first or second electrode base to vibrate in the direction of vibration.

Other Embodiments

Although the present disclosure has been described above in terms of the first through sixth embodiments, the description and drawings that form part of this disclosure should not be understood as limiting the present disclosure. Various alternative embodiments, examples and operational techniques will be apparent to those skilled in the art from this disclosure.

As shown in FIGS. 2C and 2D, the profile of the deflection shape of the step-type vibrating electrode in the vibration direction is not uniform. Therefore, in the area near the center of the vibration cavity 18, as shown in FIG. 2D, a crossing topology can be realized between the step-type vibration electrode and the step-type counter electrode with a sufficient facing area, but in the peripheral area where the deflection is small, a sufficient facing area cannot be obtained. The "cross-sectional quadratic moment I" is calculated by dividing the cross-section into a myriad of micro-sectional areas dA, multiplying each of them by $y^2$ the square of the distance from a certain axis of rotation and adding them all together ($I=\Sigma(y^2\ dA)$), with a dimension of the fourth power of length. By "a certain axis of rotation," we mean the central axis along which the bar rotates slightly when it is bent. The second-order moment of the cross section represents the resistance to deformation in a geometric sense with respect to bending. As is well known, the second moment of section for a material with a rectangular cross-sectional shape of width b and thickness h is $$I = bh^3/12 \tag{14}$$

and is expressed in a form that is inversely proportional to the cube of the thickness h. On the other hand, Young's modulus Y represents the resistance to deformation in a mechanical sense.

Deflection (bending) in the case of beams can be determined by calculating using the neutral plane radius ρ. The larger the neutral plane radius, the smaller the deflection, so a larger YI means that the beam is less likely to deflect. Therefore, YI is also called the bending stiffness K of the beam.

$$K = YI = Ybh^3/12 \tag{15}$$

which means that the beam is a flat plate. Deformation of a flat plate is classified into deflection (bending), elongation (compression) and shear (torsion). The bending stiffness K for a flat plate is also, using Poisson's ratio σ, $$K = YI = Yh^3/12(1-\sigma^2) \tag{16}$$

and therefore the stiffness K against bending load is proportional to the product of Young's modulus Y and the cube of the plate thickness ($h^3$).

So, if α is a proportionality constant, for various materials, $$k/h^3 = \alpha(Y/(1-\sigma^2)) \tag{17}$$

is established. That is, the main body of the spring constant k of the structure on the step-type vibrating electrode side is the bending stiffness shown in Equation (16). Poisson's ratio σ can only theoretically take a value less than 0.5. As some examples are shown in Table 1, the Poisson's ratio σ of many materials is in the range of 0.3 to 0.4, and squaring the Poisson's ratio σ ($\sigma^2$) gives a value of 0.09 to 0.16. Since the Young's modulus (modulus of longitudinal elasticity) Y=about 66-68 GPa for the silicon oxide film, whereas the Young's modulus Y=about 210-310 GPa for the silicon nitride film, the silicon nitride film shows higher rigidity than the silicon oxide film.

Equation (16) shows that the silicon nitride film ($Si_3N_4$ film) with a large Young's modulus Y has a high bending rigidity K of the flat plate. Therefore, the rigidity can be strengthened by using a silicon nitride film for the protective film 56 on the top surface of the vibrating electrode and increasing the thickness of the central part of the silicon nitride film.

TABLE 1

| Material | Poisson |
|---|---|
| W | 0.28 |
| Al | 0.345 |
| Cu | 0.343 |
| Pb | 0.44 |
| Au | 0.44 |
| Sn | 0.36 |
| $SiO_2$ | 0.2 |
| $Si_3N_4$ | 0.27~0.25 |

Figure 20A:
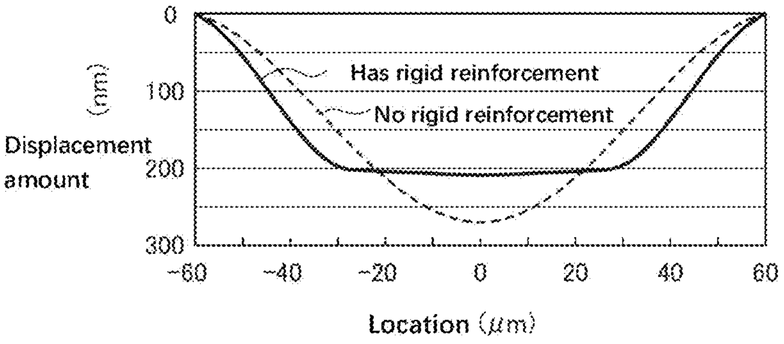
FIGS. 20A-C illustrates the effect of rigidity strengthening of the acoustic element according to other embodiments.
Figure 20B:
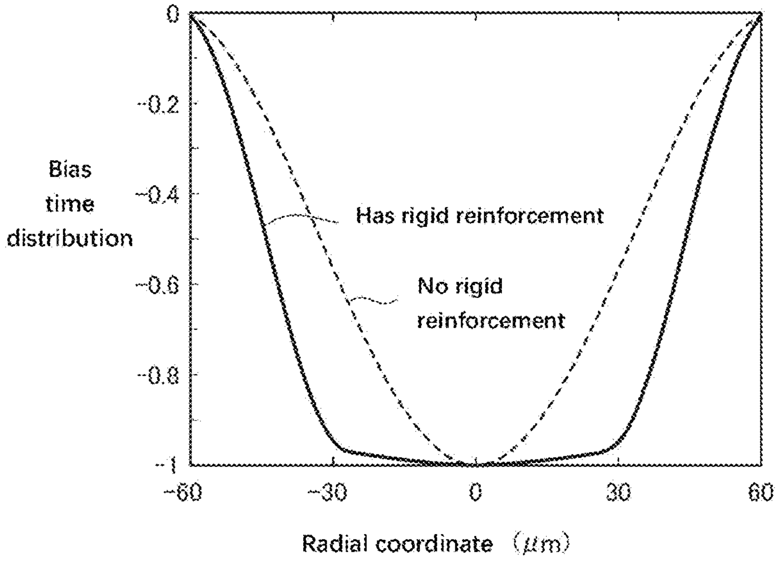
Figure 20C:
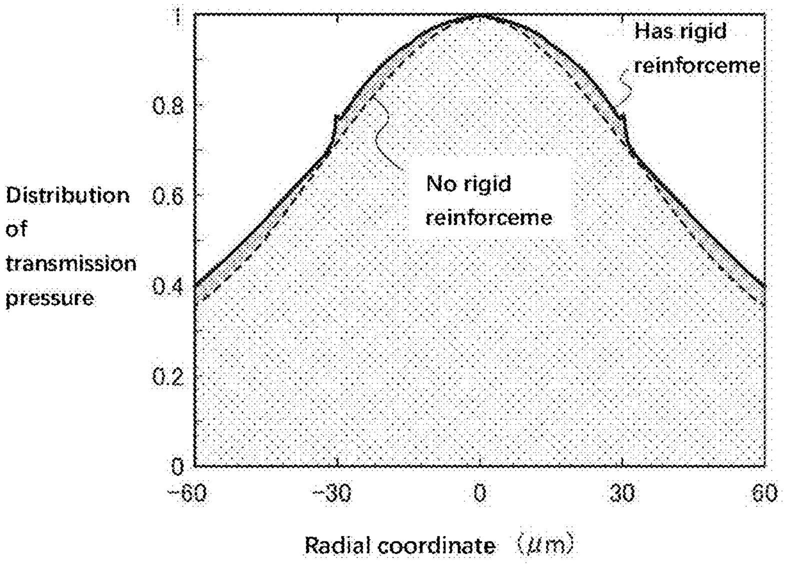

The dashed lines in FIGS. 20(*a*) and 20(*b*) show the profile of the deflection of the vibrating electrode base 12 in the vibration direction similar to FIGS. 2C and 2D. The vertical axis in FIG. 20(*a*) shows the displacement (absolute amount) of the vibrating electrode base 12, and the vertical axis in FIG. 20(*b*) shows the relative value of the displacement of the vibrating electrode base 12 when the maximum displacement in FIG. 20(*a*) is normalized to −1. The horizontal axes in FIGS. 20(*a*) and 20(*b*) are the horizontal position coordinates in the vibrating cavity In the example shown in FIG. 2E, etc. above, the structure in which the protective film 56 on the top surface of the vibrating electrode is composed of a silicon nitride film of uniform plate thickness is also shown, so the rigidity is somewhat reinforced by using the silicon nitride film. However, in FIGS. 20(*a*) and 20(*b*), the structure of the acoustic element with "no rigidity enhancement" indicated by the dashed line means that the protective film 56 on the top surface of the vibrating electrode is composed of a flat silicon nitride film with a uniform plate thickness of about 5 μm. In contrast, the structure of the acoustic element with stiffness enhancement, indicated by solid lines in FIGS. 20(*a*) and 20(*b*), has a structure in which the protective film 56 on the top surface of the vibrating electrode has a thickness variation, with the central part having a silicon nitride film about 13.8 μm thick and the peripheral part having a thin silicon nitride film about 3.8 μm thick surrounding this central part in a concentric manner. The structure has a variation in thickness.

It can be seen that the structure with "stiffening" is able to flatten the deflection profile, as shown by solid lines in FIGS. 20(*a*) and 20(*b*). In the simulation of the transmission capability shown in FIG. 20(*c*), the cavity widths of the structure without stiffening shown in dashed lines in FIGS. 20(*a*) and 20(*b*) and the structure with stiffening shown in solid lines are the same 120 μm. For the structure with stiffening, the width of the thicker plate in the center of the protective film 56 on the top surface of the vibrating electrode was set to 60 μm. The transmitted energy of the acoustic element is given by the integral value of the radial coordinate of the transmitted sound pressure distribution shown in FIG. 20(*c*). That is, the area that the curve of the transmitted sound pressure distribution shown in FIG. 20(*c*) encloses under the curve is the transmitted energy. The area of the acoustic element with stiffening shown by the solid line from FIG. 20(*c*) is larger than that of the acoustic element without stiffening shown by the dashed line. Comparing the area that the curve shown in FIG. 20(*c*) encloses below it, the area of the acoustic element without stiffness enhancement shown by the dashed line is 58% (integral value), while the area of the acoustic element with stiffness enhancement shown by the solid line is 62% (integral value), so that the stiffness of the central part is enhanced in the peripheral structure of the step-type vibrating electrode This indicates that the transmission energy of the acoustic element can be improved by strengthening the rigidity of the central part in the peripheral structure of the stepped vibrating electrode.

There are various other methods to make the profile of the deflection shape on the stepped vibrating electrode side of the acoustic element uniform. For example, since the relative permittivity of silicon nitride film $\varepsilon_r$=7.0 to 7.8 compared to the relative permittivity of silicon oxide film $\varepsilon_r$=3.9 to 4.5, a silicon nitride film may be used as the sidewall material of the vibration cavity 18 to strengthen the electric field in the peripheral area. As the electric field strengthening layer used to strengthen the electric field in the peripheral area, in addition to the silicon nitride film, the high dielectrics introduced at the beginning of this paper, such as $HfSi_xO_y$, can be employed. Furthermore, both the peripheral electric field strengthening structure and the stiffness strengthening structure that thickens the central part of the protective film 56 on the top surface of the vibrating electrode may be used simultaneously.

Figure 21:
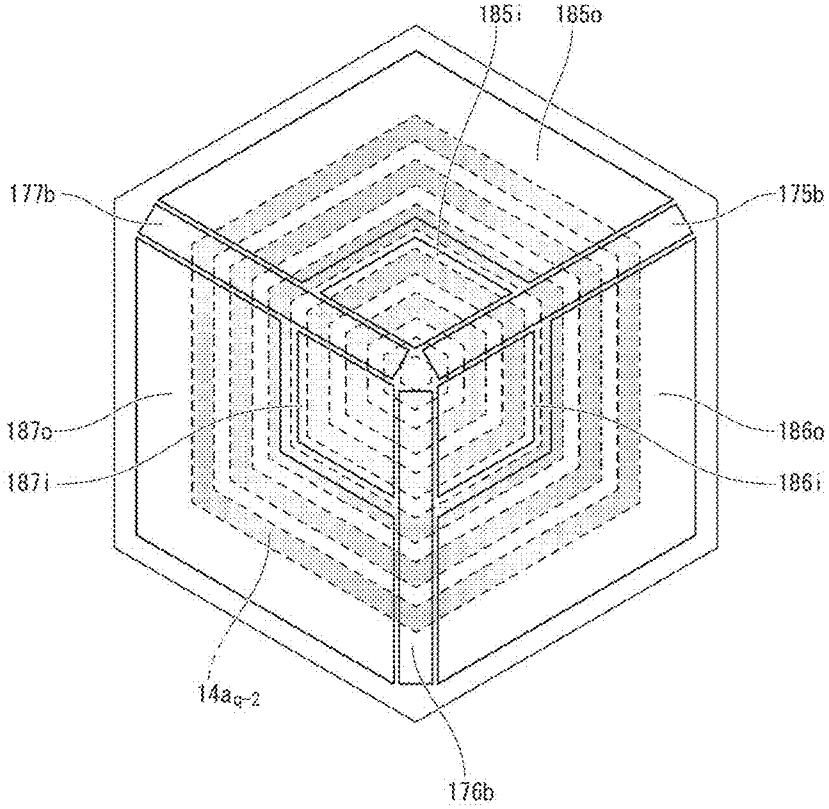
FIG. 21 is a plan view illustrating the six-segmented vibrating electrode base of the acoustic element according to other embodiments.

FIG. 17A shows the structure of the vibrating electrode base divided into three parts: the first vibrating electrode base 185, the second vibrating electrode base 186, and the third vibrating electrode base 187. As shown in FIG. 21, the structure of the vibrating electrode base divided into three parts: the first central vibrating electrode base 185*i*, the second central vibrating electrode base 186*i*, the third central vibrating electrode base 187*i*, the first peripheral vibrating electrode base 185*o*, second peripheral vibrating electrode base 186*o*, and third peripheral vibrating electrode base 187*o*, the six-part structure on the vibrating electrode side is also effective in flattening the deflection profile. That is, if the stiffness of the conductive material used for the first central vibrating electrode base 185*i*, second central vibrating electrode base 186*i* and third central vibrating electrode base 187*i* is stronger than that of the conductive material used for the first peripheral vibrating electrode base 185*o*, second peripheral vibrating electrode base 186*o* and third peripheral vibrating electrode base 187*o*, the deflection profile can be flattened. Alternatively, the drive voltage applied to the first central vibrating electrode base 185*i*, second central vibrating electrode base 186*i*, and third central vibrating electrode base 187*i* sides should be lower than the drive voltage applied to the first peripheral vibrating electrode base 185*o*, second peripheral vibrating electrode base 186*o*, and third peripheral vibrating electrode base 187*o* sides, The deflection profile can also be flattened.

In the acoustic element of the second embodiment, the example of the opposing convexity being connected to the split electrodes, the first opposing electrode base 111. the second opposing electrode base 112, and the third opposing electrode base 113, is described only as an example. As with the acoustic element of the first embodiment, the three split electrodes can be a single, single, continuous counter electrode base, as long as the flow path of the etching medium and other manufacturing technology issues are not questioned. Similarly. in the acoustic element of the third embodiment, the vibrating side convexity was electrically connected to the split electrodes, the first vibrating electrode base 185, the second vibrating electrode base 186, and the third vibrating electrode base 187, but this is only an example. As long as the flow path of the etching medium is not questioned, the three split electrodes can be a single continuous vibrating electrode base, similar to the acoustic element of the first embodiment.

Each of the opposing convexities need not be of uniform height, and the vibrating side convexities need not be of uniform height. For example, in the cross structure in the cross section illustrated in FIG. 2C, the opposing side convexities $\mathbf{11}a_{p-1}$, $\mathbf{11}a_p$, $\mathbf{11}a_{p+1}$, . . . and the vibrating side convexities $\mathbf{12}a_{q-1}$, $\mathbf{12}a_q$, $\mathbf{12}a_{q+1}$, . . . cross in the center of the vibrating cavity but do not intersect at the periphery. In view of the situation illustrated in FIG. 2C, where it is difficult to intersect at the periphery, the height of the opposing convexity or the vibrating convexity can be higher at the periphery than at the center.

Thus, it goes without saying that the present disclosure is not limited to the description of the first through sixth embodiments above, but can be modified in various ways, which are also included within the scope of the present disclosure. Therefore, the technical scope of the present disclosure is defined only by the present disclosure specifics pertaining to the description of the claims that are reasonable from the above description.

EXPLANATION OF SIGNS

11 . . . Opposing electrode base (second electrode base), $\mathbf{11}a_{p-1}$, $\mathbf{11}a_p$, $\mathbf{11}a_{p+1}$, . . . Opposing side convex part (second electrode side convex part), 111 . . . First opposing electrode base, 112 . . . Second opposing electrode base, 113 . . . third opposite electrode base, 12 . . . vibrating electrode base (first electrode base), $\mathbf{12}a_{q-1}$, $\mathbf{12}a_q$, $\mathbf{12}a_{q+1}$, . . . vibrating side convexity (first electrode side convexity), 13*p* . . . dielectric film, 141, 142, 143, 141*b*, 141*b* 142*b*, 143*b*, 144, 145, 146, 147, 171, 172, 173 . . . canal end, 151, 152, 153, 151*b*, 152*b*, 153*b* . . . corrosion medium channel, 16 . . . sacrificial film, 16*a* 16 . . . first sacrificial film, 16*b* . . . second sacrificial film, 16*c* . . . third sacrificial film, 161, 162, 163, 181, 182, 183 . . . holes for forming cavities, 175*b* . . . first corrosive medium channel, 176*b* . . . 176*b* . . . second corrosive medium channel, 177*b* . . . third corrosive medium channel, 18 . . . vibration cavity, 185 . . . first vibration electrode base, 185*i* . . . first central vibration electrode base, 185 *o* . . . first peripheral vibrating electrode base, 186 . . . second vibrating electrode base, 186*i* . . . second central vibrating electrode base, 186*o* . . . second peripheral vibrating electrode base, 187 . . . third vibrating electrode base 187*i* . . . third central vibrating electrode base, 187*o* . . . third peripheral vibrating electrode base, 19 . . . dielectric film, 191 . . . third conductive film, 192 . . . second corrosion medium flow path formation pattern 21 . . . Side wall insulating film base, 22 . . . Side wall insulating film, 23 . . . Cavity sidewall, 25 . . . Counter electrode support layer, 31, 54 . . . Counter side dielectric layer, 31*c* . . . Contact hole, 32 . . . Second conductive film, 33 . . . Film for selective removal, 51 . . . Device substrate, 52 . . . Underlying insulating film, 53 . . . Protective film on bottom surface of opposite electrode 55 . . . Dielectric layer on vibration side, 56 . . . Protective film on top surface of vibration electrode, 59 . . . Groove for second damascene

The invention claimed is:

1. An acoustic device, comprising:

a plate-shaped first electrode base having a flat main surface;

a plate-shaped second electrode base having a flat main surface parallel to and opposed to the first electrode base;

a first electrode side convex portion provided on the first electrode base and having a first step side wall formed by a plane having an inclination angle inclined within 45° with respect to a vibration direction; and a second electrode side convex portion provided on the second electrode base, at least a part of the second electrode side convex portion being opposed to the first electrode side convex portion so as to intersect with the first electrode side convex portion, the second electrode side convex portion having a second step side wall formed by a plane inclined at the same inclination angle as the first step side wall wherein the first electrode base or the second electrode base vibrates in the vibration direction by a voltage applied between the first electrode base and the second electrode base to generate a capacitor at least a part of which depends on an electric line of force between the first step side wall and the second step side wall, and electrostatic energy in a vibration cavity sandwiched by the first electrode base and the second electrode base is increased.

2. The acoustic device according to claim 1, wherein at least one of the first electrode side convex portion and the second electrode side convex portion is an electrical conductor.

3. The acoustic device according to claim 1, wherein at least one of the first electrode side convex portion and the second electrode side convex portion is a dielectric.

4. The acoustic device according to claim 1, wherein the inclination angle is inclined within 100 with respect to the vibration direction.

5. The acoustic device according to claim 1, wherein the inclination angle with respect to the vibration direction is 0°, and an opposing area of the first step side wall and the second step side wall changes in accordance with ta voltage applied between a stepped vibration electrode and a stepped counter electrode.

6. The acoustic device according to claim 1, wherein the electric line of force between the first step side wall and the second step side wall is inclined with respect to a normal direction of a main surface of the first electrode base and a main surface of the second electrode base.

7. The acoustic device according to claim 6, wherein at least one of the first electrode side convex portion and the second electrode side convex portion is an electrical conductor.

8. The acoustic device according to claim 6, wherein at least one of the first electrode side convex portion and the second electrode side convex portion is a dielectric.

9. An acoustic device integrated circuit in which a plurality of cells in which a plurality of capacitive acoustic device are each distributed by a number of units are arranged in two dimensions on the same curved surface, wherein each of the plurality of cells distributed by a specific number of units is a transmission cell comprising:

a plate-shaped first electrode base having a flat main surface;

a plate-shaped second electrode base having a flat main surface parallel to and opposed to the first electrode base;

a first electrode side convex portion provided on the first electrode base and having a first step side wall formed by a plane having an inclination angle inclined within 45° with respect to a vibration direction;

a second electrode side convex portion provided on the second electrode base, at least a part of the second electrode side convex portion being opposed to the first electrode side convex portion so as to intersect with the first electrode side convex portion, the second electrode side convex portion having a second step side wall formed by a plane inclined at the same inclination angle as the first step side wall; and in each of the transmission cells, the first electrode base or the second electrode base vibrates in the vibration direction by a voltage applied between the first electrode base and the second electrode base to generate a capacitor at least a part of which depends on an electric line of force between the first step side wall and the second step side wall, and electrostatic energy in a vibration cavity sandwiched by the first electrode base and the second electrode base is increased.

10. The acoustic device integrated circuit according to claim 9, wherein a plurality of cells distributed in other specific numbers of units are cells for reception.

* * * * *